US012605680B2

(12) United States Patent
Lounder et al.

(10) Patent No.: US 12,605,680 B2
(45) Date of Patent: Apr. 21, 2026

(54) CROSS-LINKABLE ZWITTERIONIC POLYMERS AND THEIR USE IN MEMBRANE FILTERS

(71) Applicant: Trustees of Tufts College, Medford, MA (US)

(72) Inventors: Samuel J. Lounder, Medford, MA (US); Ayse Asatekin Alexiou, Arlington, MA (US)

(73) Assignee: Trustees of Tufts College, Medford, MA (US)

( * ) Notice: Subject to any disclaimer, the term of this patent is extended or adjusted under 35 U.S.C. 154(b) by 753 days.

(21) Appl. No.: 17/924,753

(22) PCT Filed: May 17, 2021

(86) PCT No.: PCT/US2021/032793
§ 371 (c)(1),
(2) Date: Nov. 11, 2022

(87) PCT Pub. No.: WO2021/232018
PCT Pub. Date: Nov. 18, 2021

(65) Prior Publication Data
US 2023/0182091 A1      Jun. 15, 2023

Related U.S. Application Data

(60) Provisional application No. 63/025,559, filed on May 15, 2020.

(51) Int. Cl.
| | |
|---|---|
| *B01D 69/02* | (2006.01) |
| *B01D 69/12* | (2006.01) |
| *B01D 71/26* | (2006.01) |
| *B01D 71/40* | (2006.01) |
| *B01D 71/82* | (2006.01) |

(52) U.S. Cl.
CPC ............. *B01D 71/82* (2013.01); *B01D 69/02* (2013.01); *B01D 69/12* (2013.01); *B01D 69/125* (2013.01); *B01D 71/261* (2022.08); *B01D 71/262* (2022.08); *B01D 71/40* (2013.01); *B01D 2323/30* (2013.01); *B01D 2325/02831* (2022.08); *B01D 2325/02832* (2022.08); *B01D 2325/04* (2013.01); *B01D 2325/18* (2013.01); *B01D 2325/20* (2013.01); *B01D 2325/34* (2013.01); *B01D 2325/38* (2013.01)

(58) Field of Classification Search
CPC ........ B01D 69/02; B01D 69/12; B01D 71/40; B01D 2323/30; C08L 33/14; C09D 133/14
See application file for complete search history.

(56) References Cited

U.S. PATENT DOCUMENTS

| | | | |
|---|---|---|---|
| 6,893,595 | B1 | 5/2005 | Muir et al. |
| 2017/0049801 | A1 | 2/2017 | Prieve et al. |
| 2019/0300653 | A1 | 10/2019 | Green et al. |

FOREIGN PATENT DOCUMENTS

| | | | | |
|---|---|---|---|---|
| CN | 102294176 | A | 12/2011 | |
| CN | 107236143 | A | 10/2017 | |
| CN | 106632830 | B | 12/2018 | |
| CN | 110804144 | A | 2/2020 | |
| CN | 107236143 | B | 5/2020 | |
| EP | 4326426 | A1 | 2/2024 | |
| JP | 2011-052055 | A | 3/2011 | |
| JP | 2015-108141 | A | 6/2015 | |
| WO | WO-01/27209 | A1 | 4/2001 | |
| WO | WO-2015/070004 | A1 | 5/2015 | |
| WO | WO-2016/140259 | A2 | 9/2016 | |
| WO | WO-2016/195916 | A1 | 12/2016 | |
| WO | WO-2018/085057 | A1 | 5/2018 | |
| WO | WO-2019189180 | A1 * | 10/2019 | ............ B01D 69/00 |
| WO | WO-2021/232018 | A1 | 11/2021 | |
| WO | WO-2022/226329 | A1 | 10/2022 | |

OTHER PUBLICATIONS

Yuan, Xiao-yan et al—CN 106632830 A machine translation—May 10, 2017 (Year: 2017).*
Matsumoto, Ryuji et al—WO 2019189180 A1 machine translation—Oct. 3, 2019 (Year: 2019).*
Fei et al., "Facile preparation of crosslinked PAN membranes based on thiol-ene photopolymerization." Polymers 9 (2017): 390.
Willis et al., "A novel phosphorylcholine-coated contact lens for extended wear use." Biomaterials 22 (2001): 3261-3272.
International Search Report and Written Opinion for International Application No. PCT/US2021/032793 mailed Aug. 10, 2021.
Supplementary European Search Report for EP Application No. 21803525.1 dated Jun. 10, 2024.

* cited by examiner

*Primary Examiner* — Bradley R Spies

(74) *Attorney, Agent, or Firm* — Foley Hoag LLP; Dana M. Gordon; David S. Surry

(57) ABSTRACT

Disclosed are copolymers, comprising a plurality of zwitterionic repeat units, and a plurality of hydrophobic repeat units, wherein the hydrophobic repeat units each independently comprises a cross-linkable moiety; the cross-linked copolymer network, comprising such copolymer; as well as thin film composite membrane comprising such cross-linked copolymer network.

20 Claims, 41 Drawing Sheets

CROSS-LINKABLE ZWITTERIONIC POLYMERS AND THEIR USE IN MEMBRANE FILTERS

RELATED APPLICATIONS

This application is the § 371 National Stage of PCT/US2021/032793, filed May 17, 2021; which claims the benefit of priority to U.S. Provisional Application No. 63/025,559, filed May 15, 2020.

GOVERNMENT SUPPORT

This invention was made with government support under grants 1843847 and 1553661 awarded by the National Science Foundation. The government has certain rights in the invention.

BACKGROUND

Membrane filtration is an important and promising method of water purification, reclamation and reuse. Membranes of various pore sizes can be used for a wide range of objectives, from simply removing disease-causing microorganisms to desalination by reverse osmosis (RO). Membranes also serve as an efficient, simple, scalable separation method in various industries, such as food, beverage, dairy, and bio/pharmaceutical industries.

Membranes with improved selectivity, or ability to separate solutes with better precision, offer to improve the economic feasibility and energy efficiency of several other processes. For instance, membranes with improved selectivity between sulfate and chloride anions could alter the composition of seawater and wastewater for use as drilling fluid in offshore oil wells while operating at lower applied pressures. Membranes with extremely small pore sizes but low salt rejection can lead to highly improved effluent quality for challenging wastewater streams, particularly those with high organic content, such as those from the food industry.

All of the aforementioned membrane processes are often severely impacted by fouling, defined as the degradation of membrane performance due to the adsorption and accumulation of feed components on the membrane surface. Severe declines in membrane permeability and changes in membrane selectivity are common. Fouling management is a significant component of costs associated with membrane systems, requiring increased energy use, regular cleanings involving downtime, maintenance and chemical use, and more complex processes.

SUMMARY

Provided herein are polymeric materials designed to create membranes with improved selectivity and fouling resistance, with potential capabilities that include tunable effective pore size that can be reduced to <1 nm, exceptional fouling resistance, improved chemical resistance and thermal stability, and ion selectivity.

In one aspect, disclosed are copolymers, comprising a plurality of zwitterionic repeat units, and a plurality of hydrophobic repeat units; wherein at least some of the hydrophobic repeat units each independently comprise a cross-linkable moiety. In certain embodiments, the plurality of hydrophobic repeat units comprises (i) hydrophobic repeat units comprising a cross-linkable moiety, and (ii) hydrophobic repeat units that do not comprise a cross-linkable moiety.

In another aspect, disclosed are cross-linked copolymer network, comprising the copolymer disclosed herein.

In yet another aspect, disclosed are thin film composite membranes, comprising a porous substrate, and a selective layer comprising the cross-linked copolymer network disclosed herein, wherein the average effective pore size of the porous substrate is larger than the average effective pore size of the selective layer; and the selective layer is disposed on top of the porous substrate.

Figure 6A:
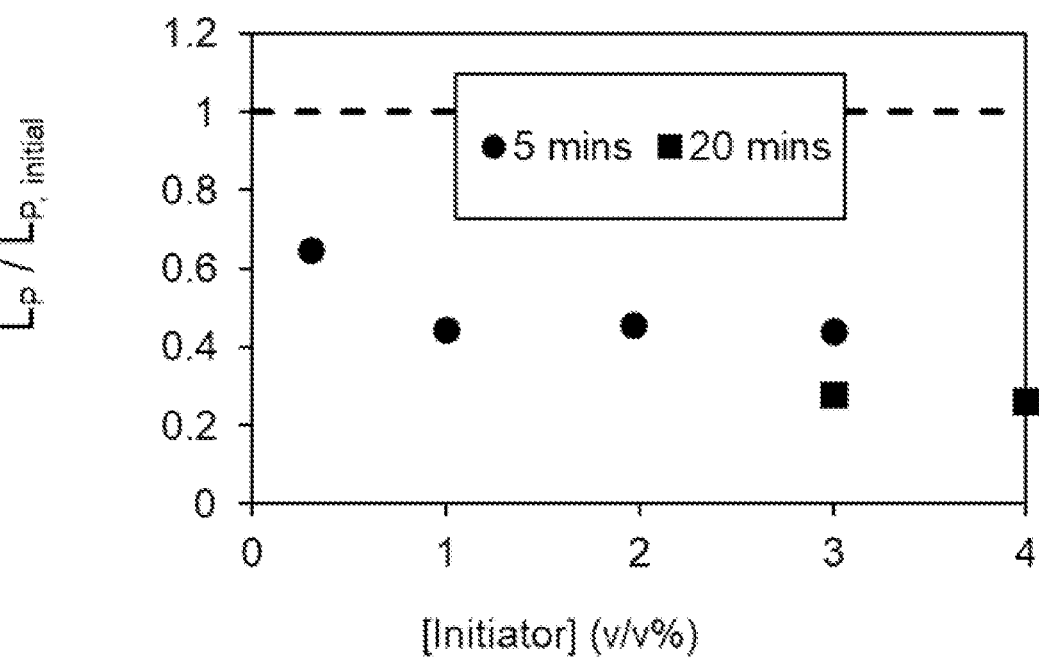
FIG. 6A is a graph that depicts permeance of cross-linked membranes ($L_p$) normalized by the permeance before cross-linking versus photoinitiator concentration for cure times of 5 minutes and 20 minutes. Membranes were cross-linked as described by Method 1 of Example 3A. The average initial permeance was 1.5 L m$^{-2}$ hr$^{-1}$ bar$^{-1}$.

3 ranged from 0.3-4 wt % and the cure time ranged from 5-20 minutes (see FIG. 6A). The average initial permeance was 1.5 L m$^{-2}$ hr$^{-1}$ bar$^{-1}$.

Figure 8A:
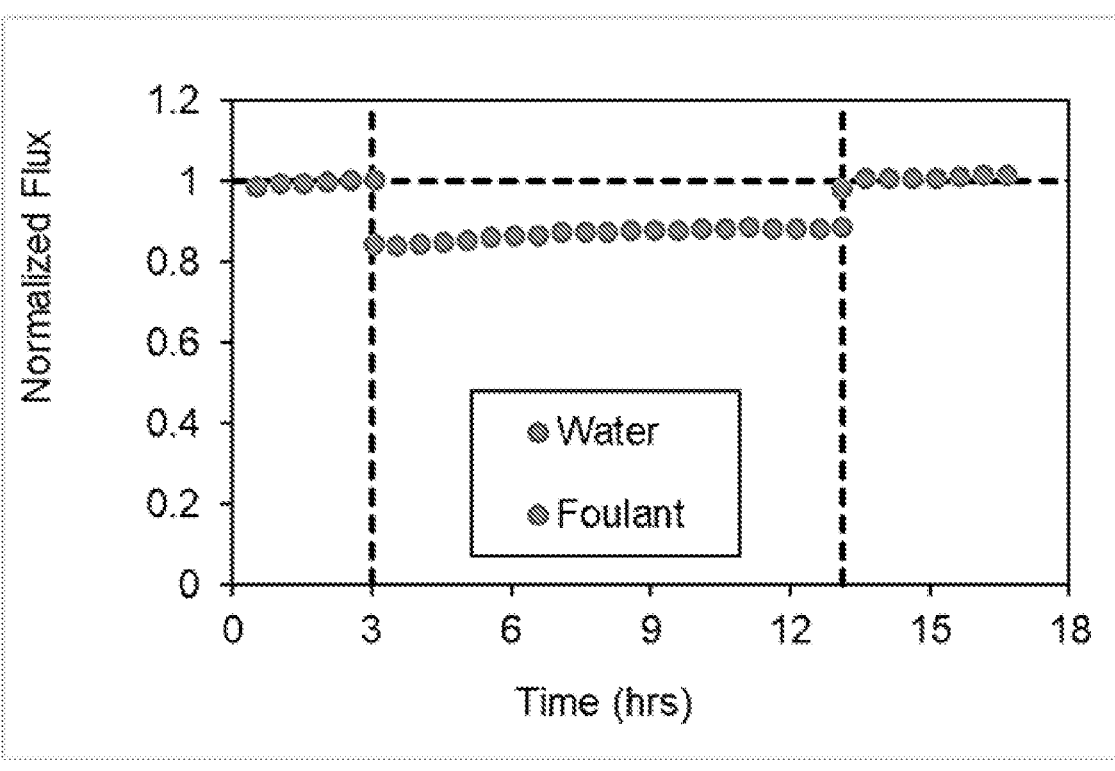

FIG. 8A is a graph depicting fouling by organics (50 ppm humic acid, 50 ppm sodium alginate, 10 mM NaCl, 1 mM CaCl$_2$). Membranes were prepared as described in Example 2A and crosslinked as described in Method 1 of Example 3A. Photo-initiator concentration 3 w/v %, cure time 20 minutes.

Figure 8B:
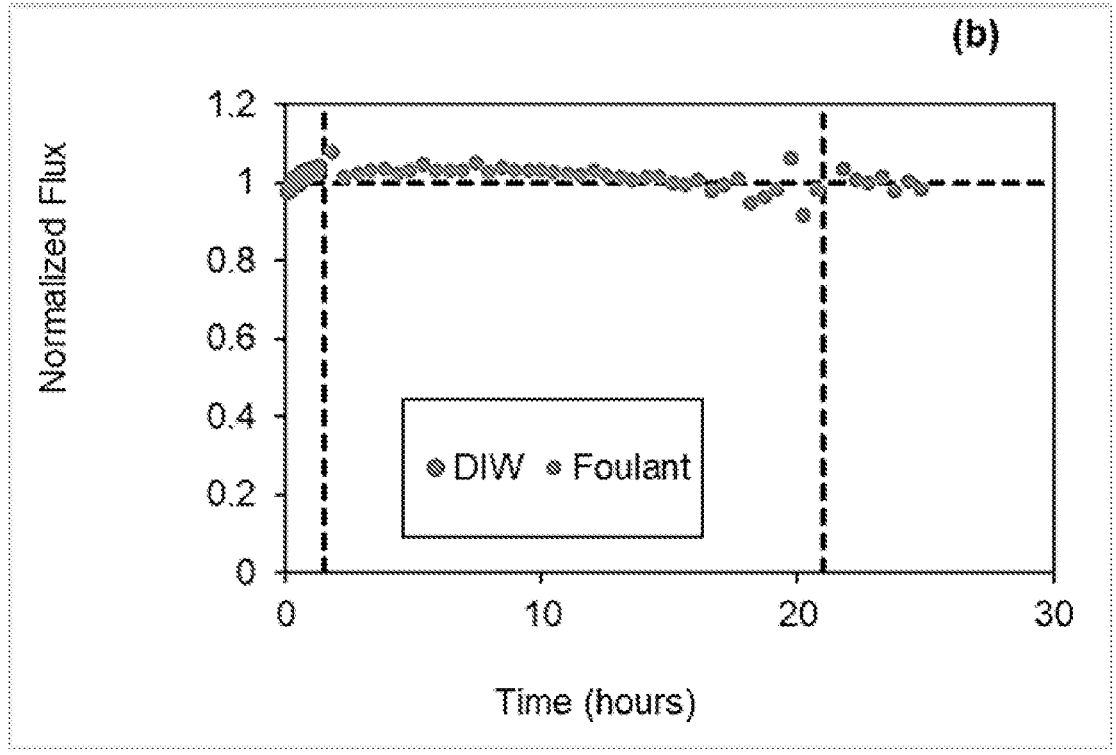

FIG. 8B is a graph depicting fouling by proteins (1000 ppm bovine serum albumin with 10 mM phosphate buffer saline). Membranes were prepared as described in Example 2A and crosslinked as described in Method 2 of Example 3A. Photo-initiator concentration 3 w/v %, cure time 5 minutes.

Figure 9:
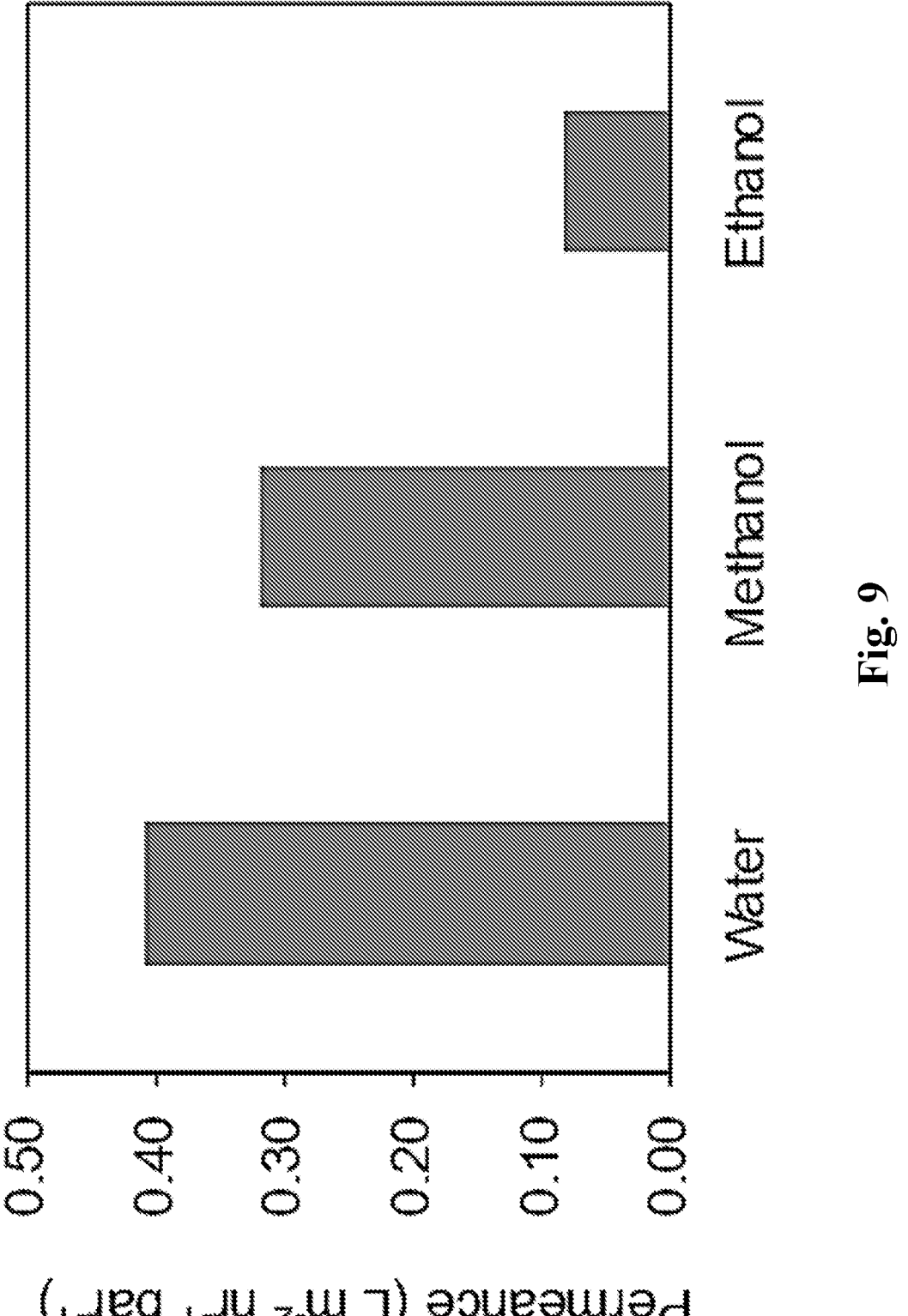
Figure 10A:
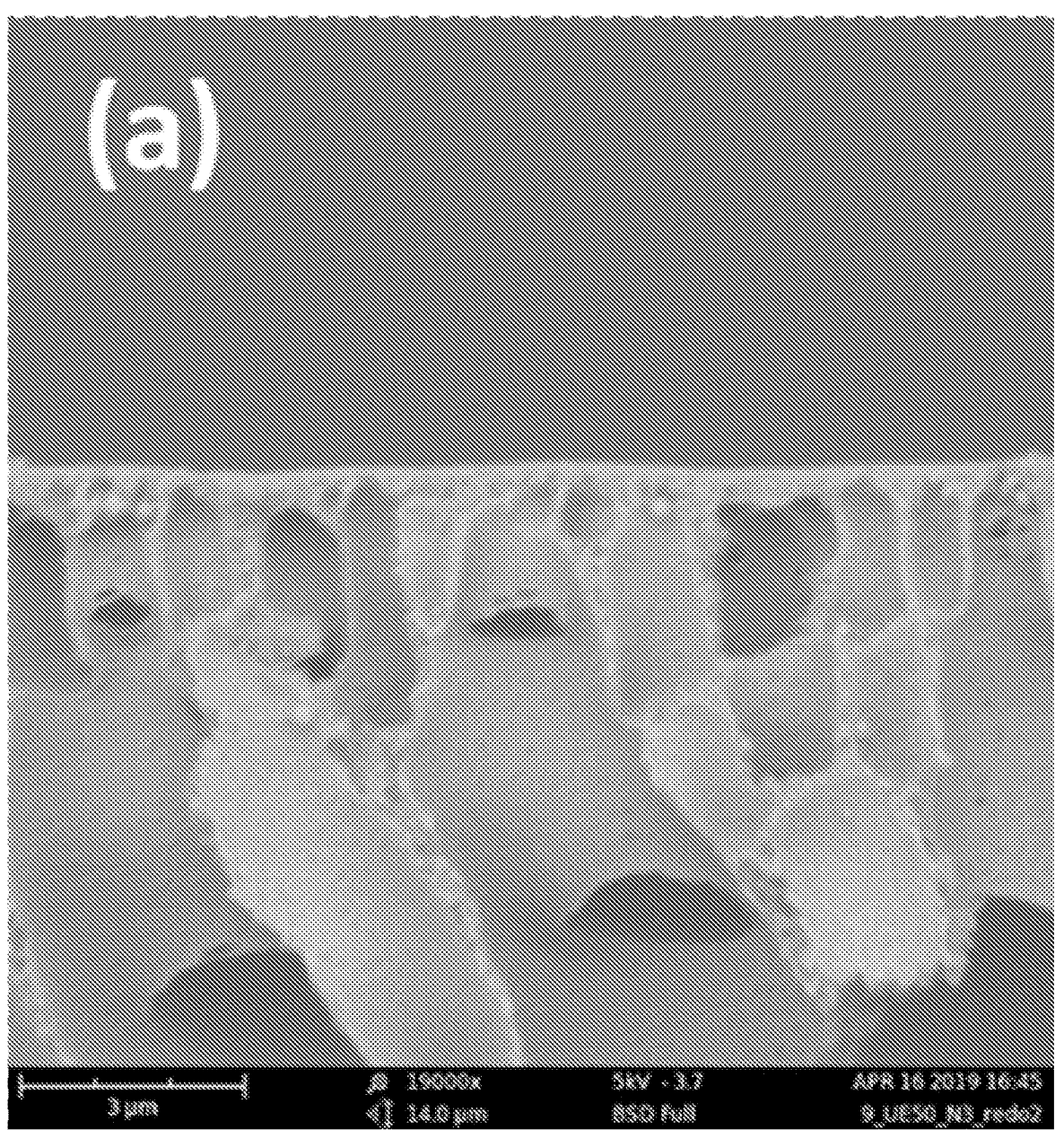
Figure 10B:
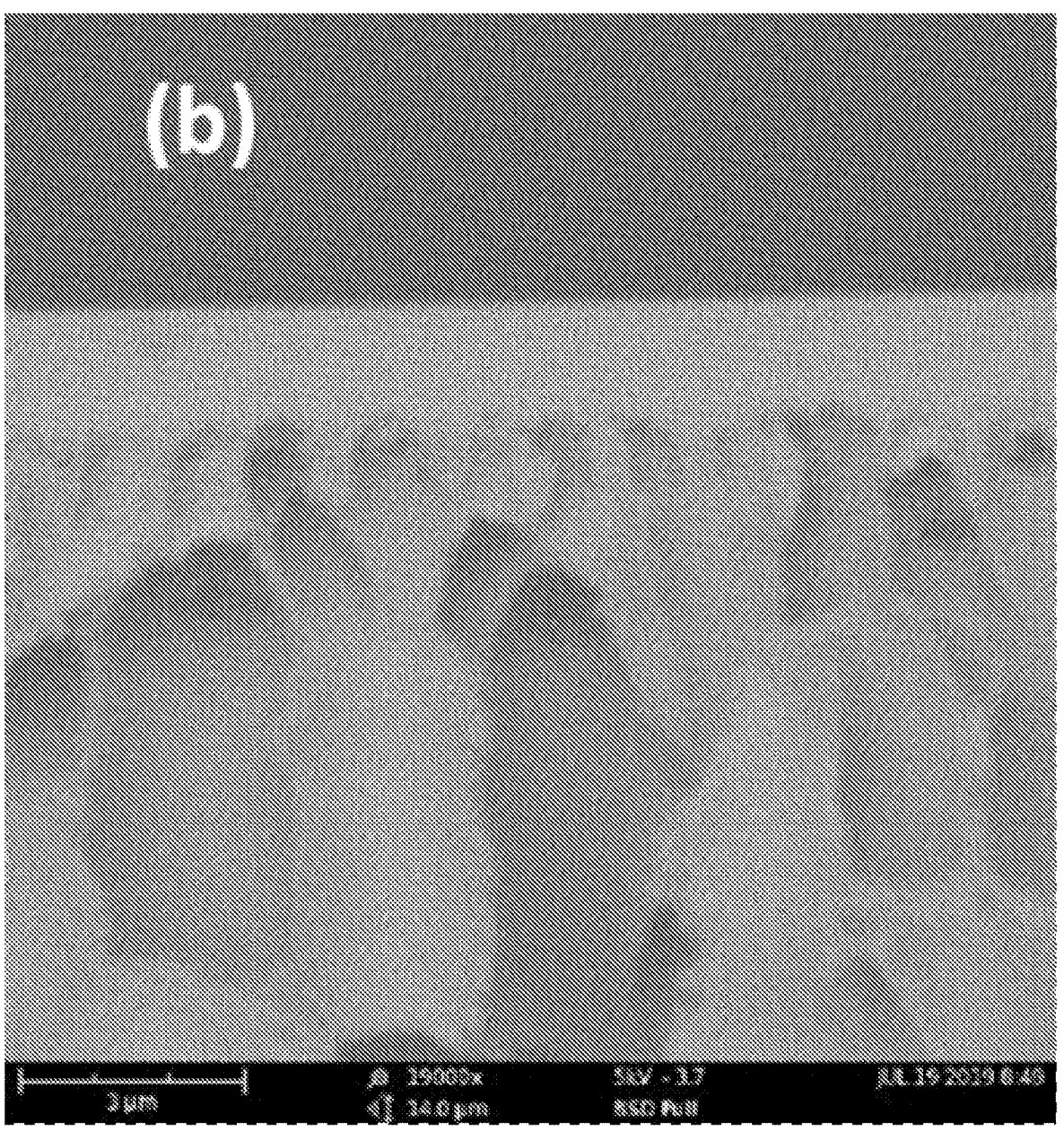
Figure 10C:
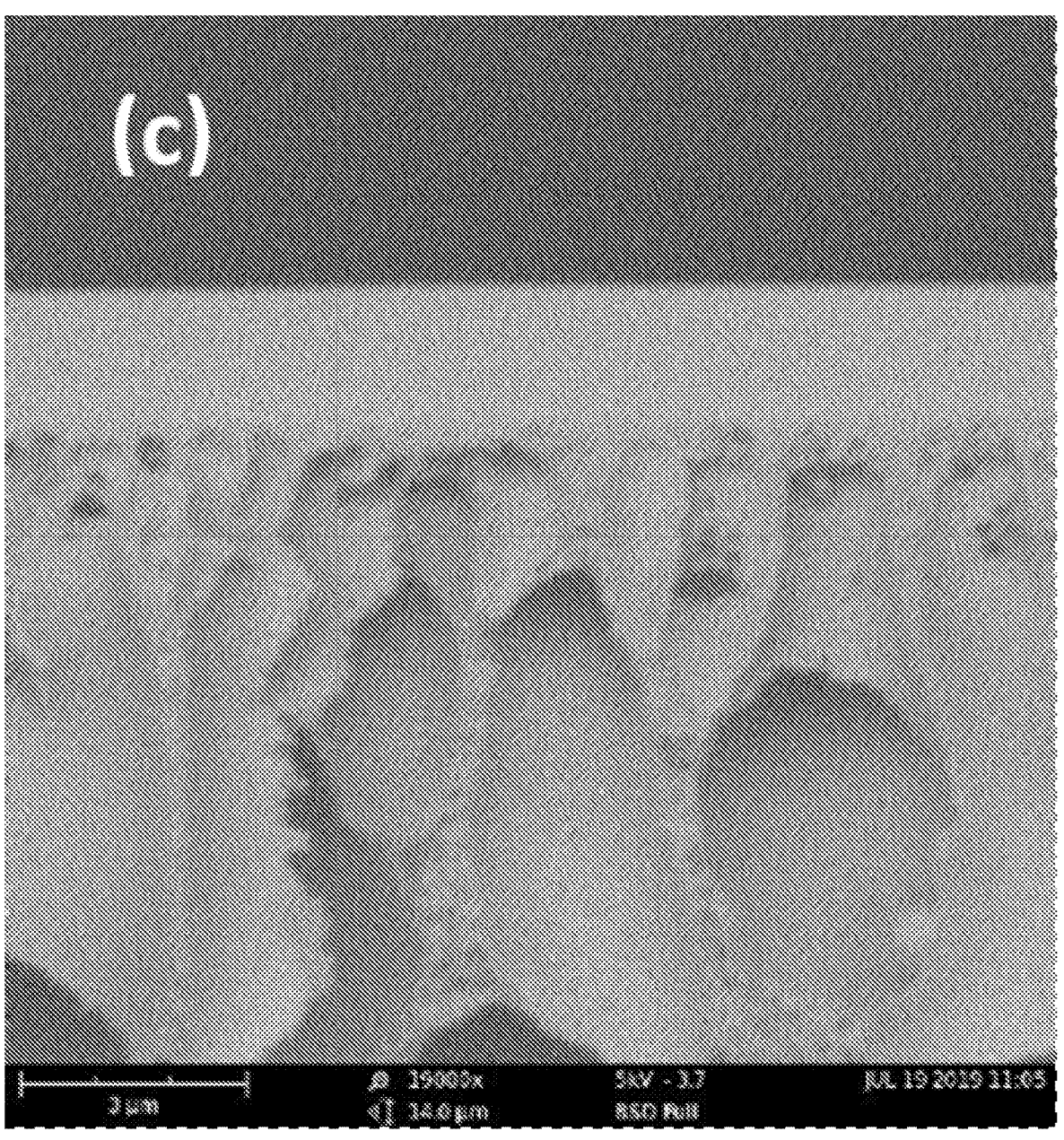
Figure 10D:
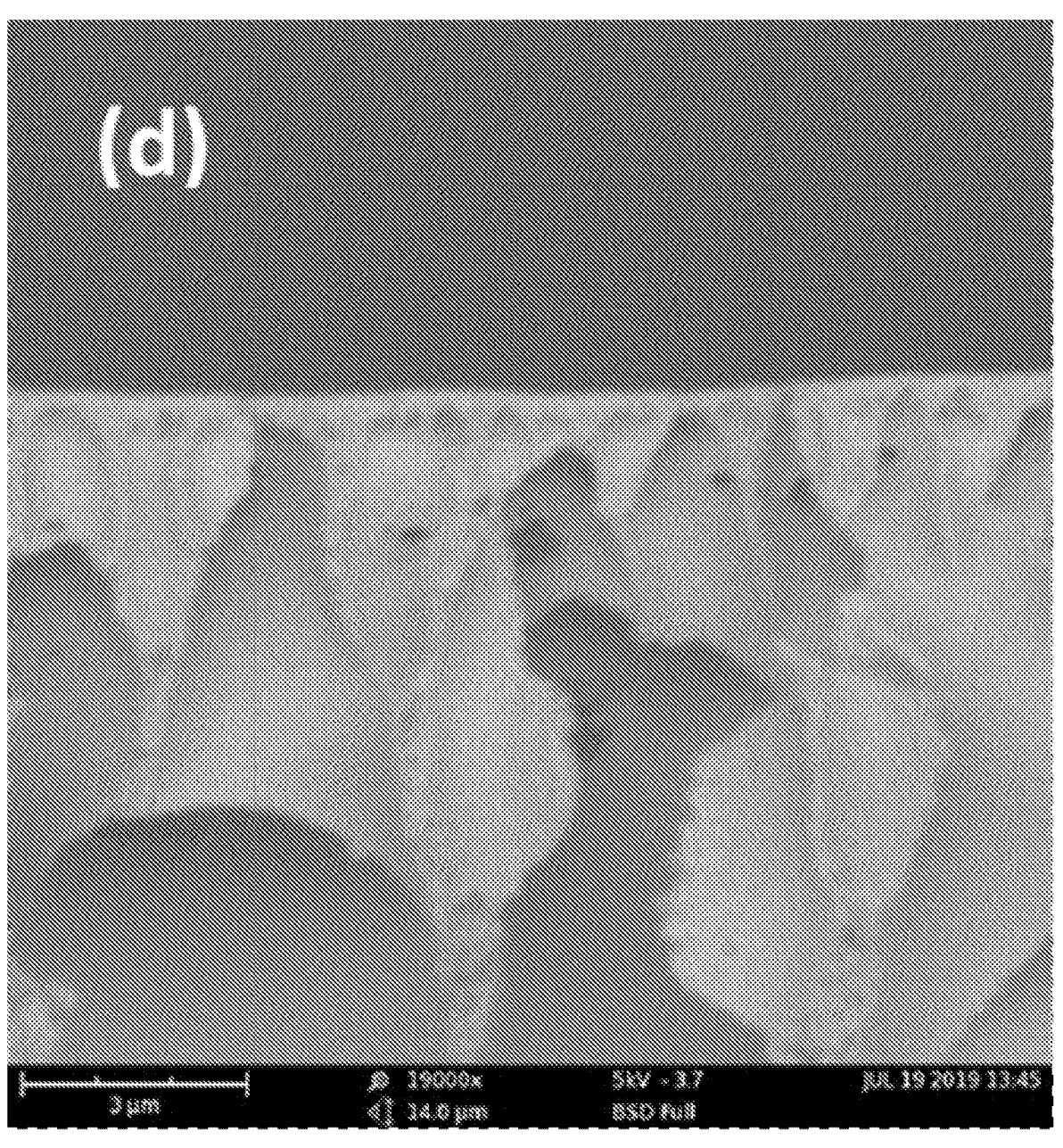
Figure 10E:
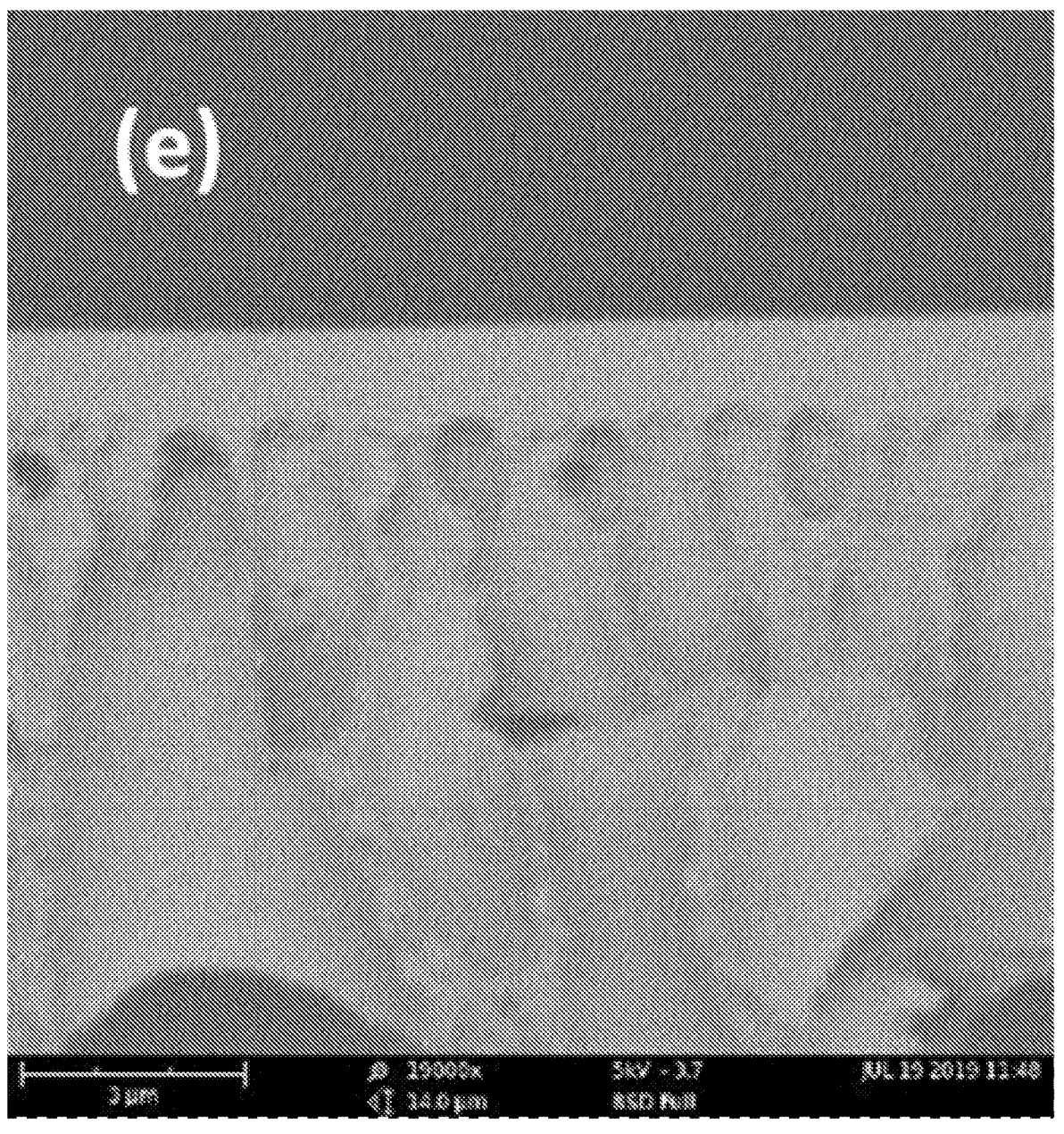

FIG. 9 is a bar graph depicting organic solvent permeance for crosslinked P(AMA-r-SBMA) membranes. Membranes were prepared as described in Example 2A and crosslinked as described in Method 2 of Example 3A. Photo-initiator concentration 3 w/v %, cure time 5-20 minutes.

FIGS. 10A-10E are cross-sectional SEM images of (10A) UE50 support membrane; (10B) Un-cross-linked TFC membrane; (10C) Cross-linked TFC membrane; (10D) Un-cross-linked TFC membrane after being soaked in methanol, indicating that the selective layer is fully dissolved; (10E) Cross-linked TFC membrane after being soaked in methanol, indicating that the selective layer is not dissolved. The membrane the was prepared as described in Example 3B.

Figure 11:
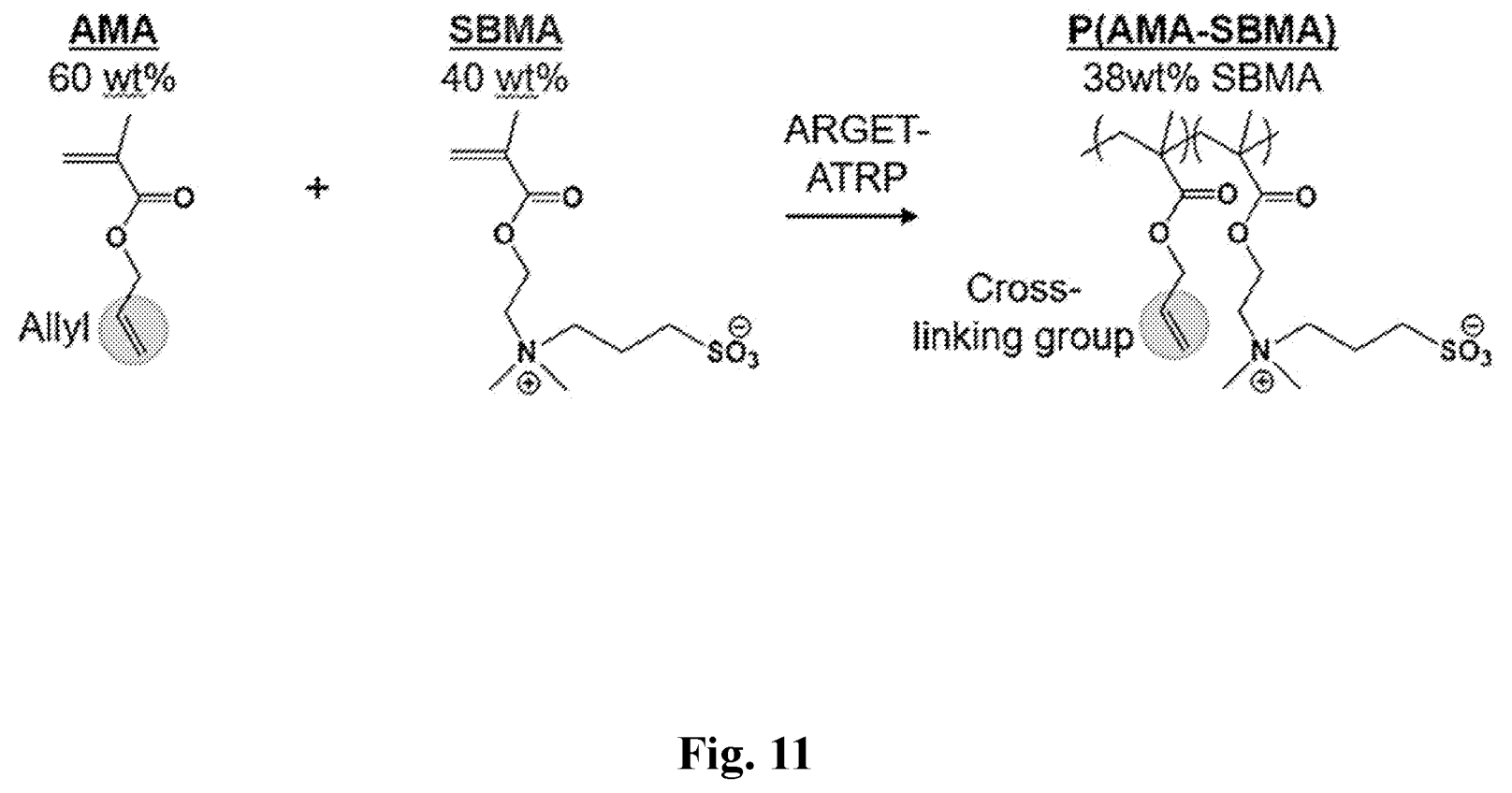

FIG. 11 is a scheme that depicts the synthesis of poly ((allyl methacrylate)-random-(sulfobetaine methacrylate)).

Figure 12:
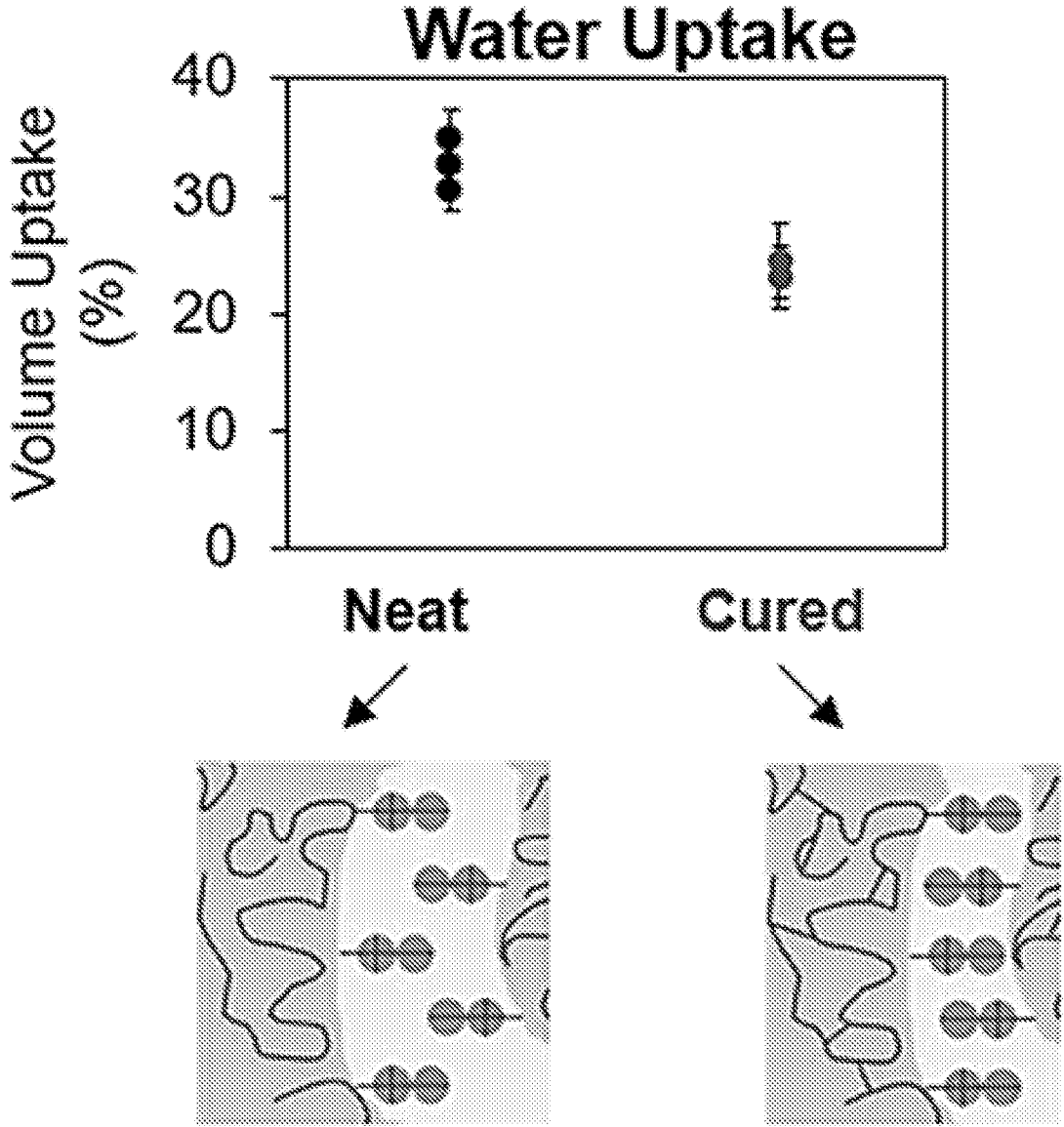

FIG. 12 is a graph that depicts the water uptake before and after cross-linking.

Figure 13:
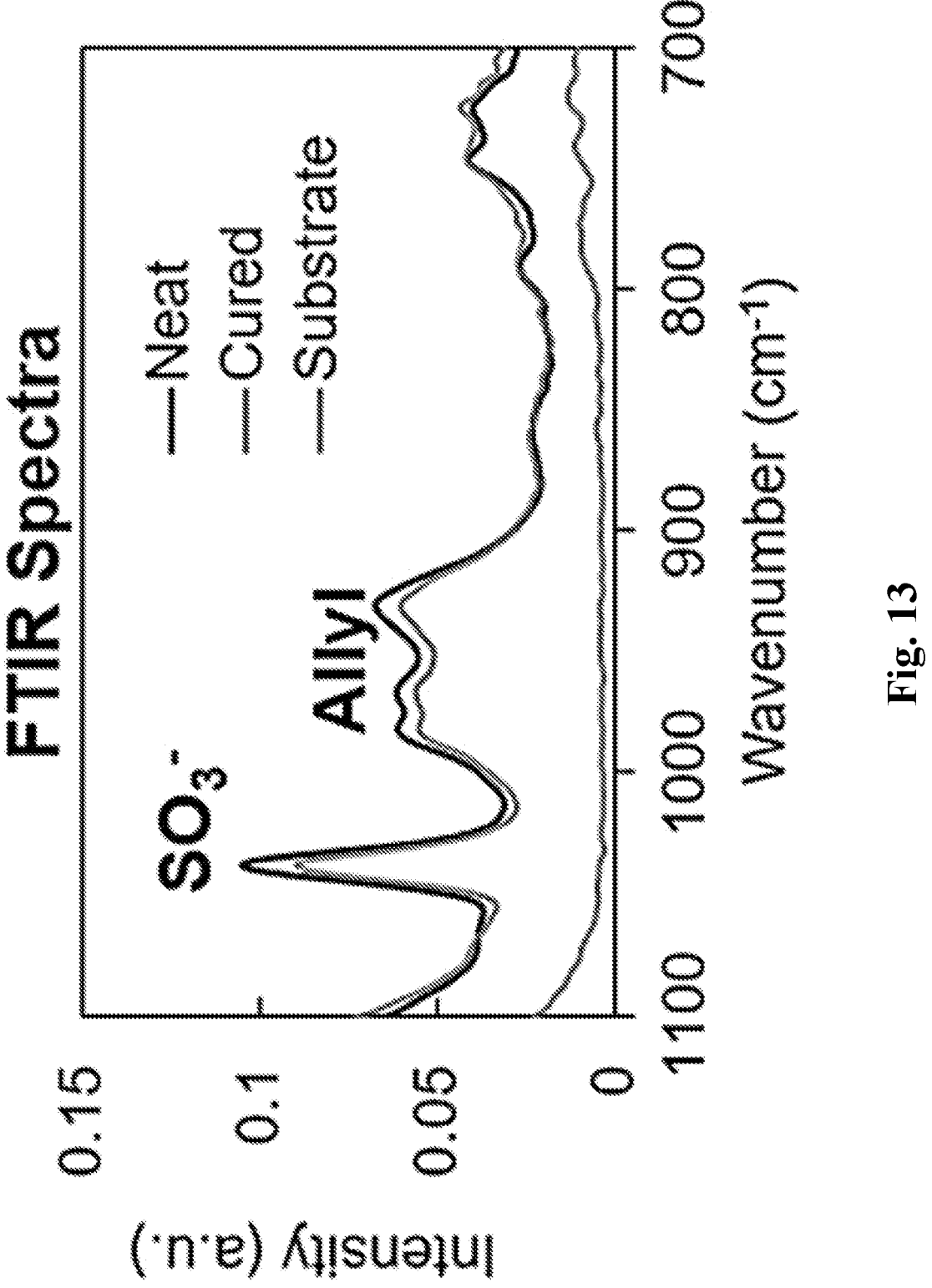

FIG. 13 is the FTIR spectra of the copolymer before and after cross-linking.

Figure 14:
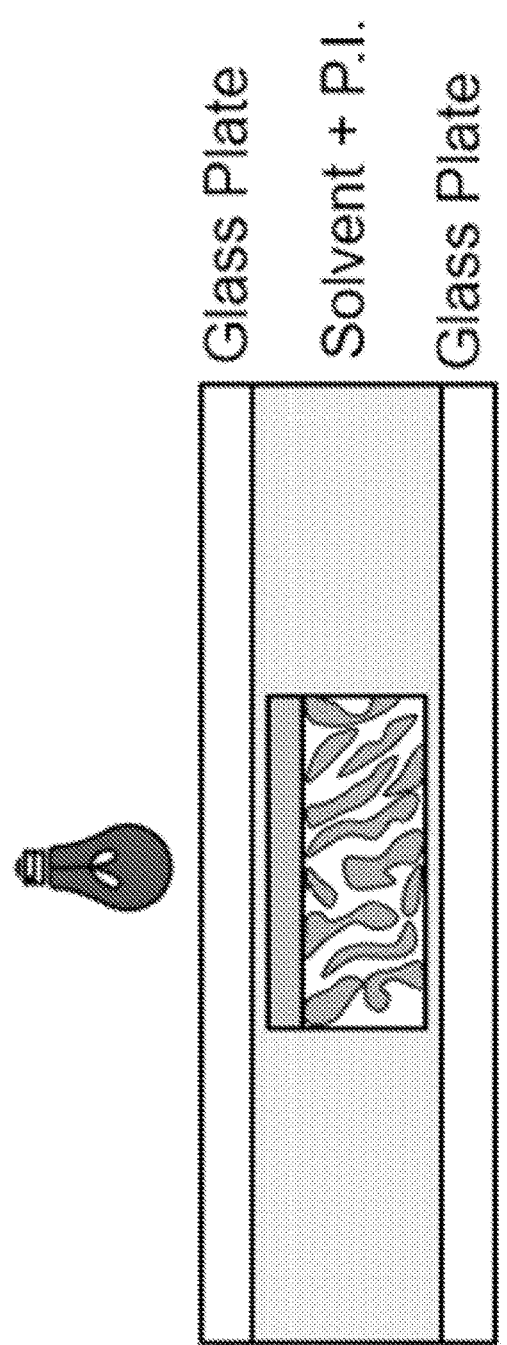
Figure 14:
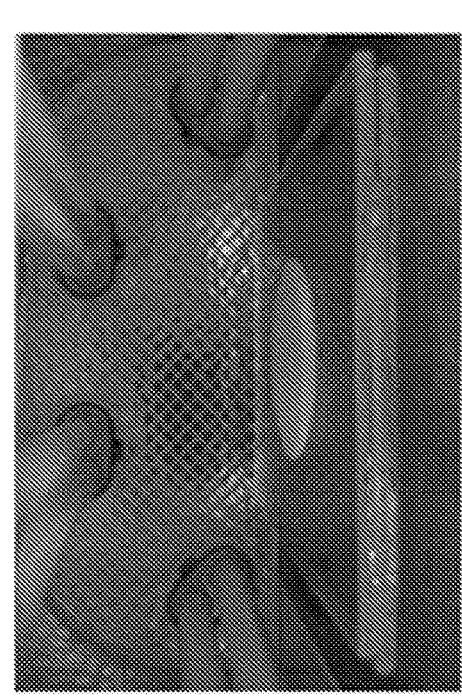

FIG. 14 is a illustration as well as an image that depict the cross-linking setup.

Figure 15A:
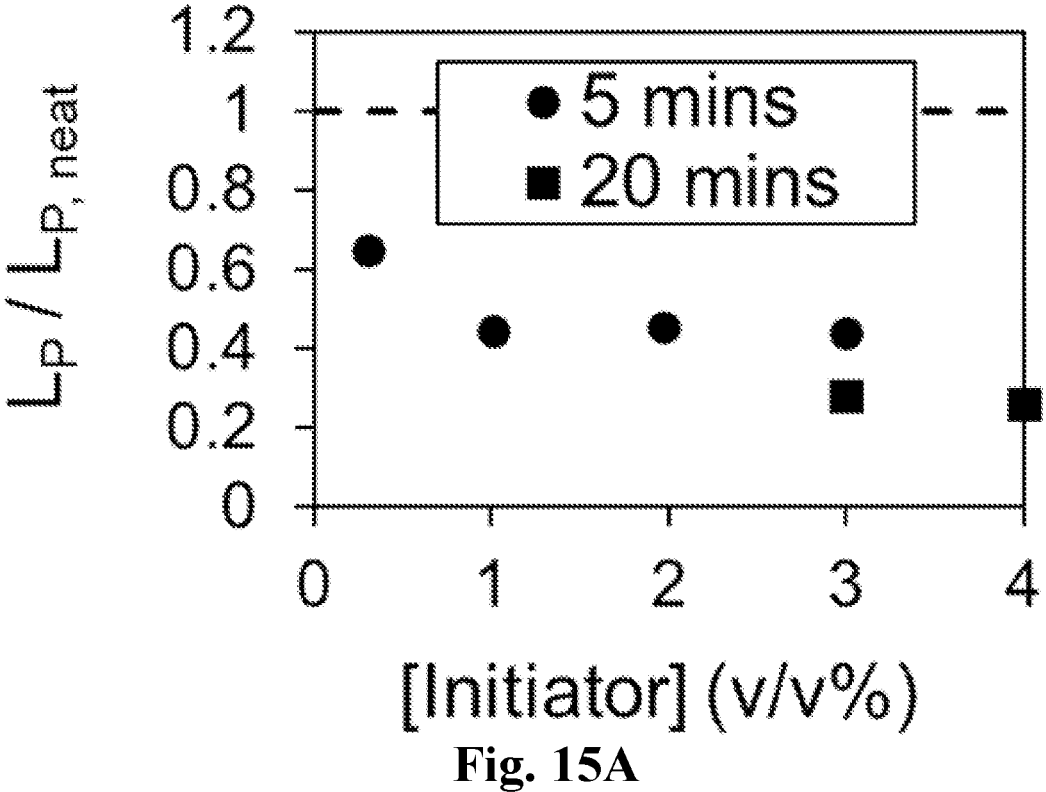

FIG. 15A is a graph that depicts the permeance change versus initiator percentage at different times.

Figure 15B:
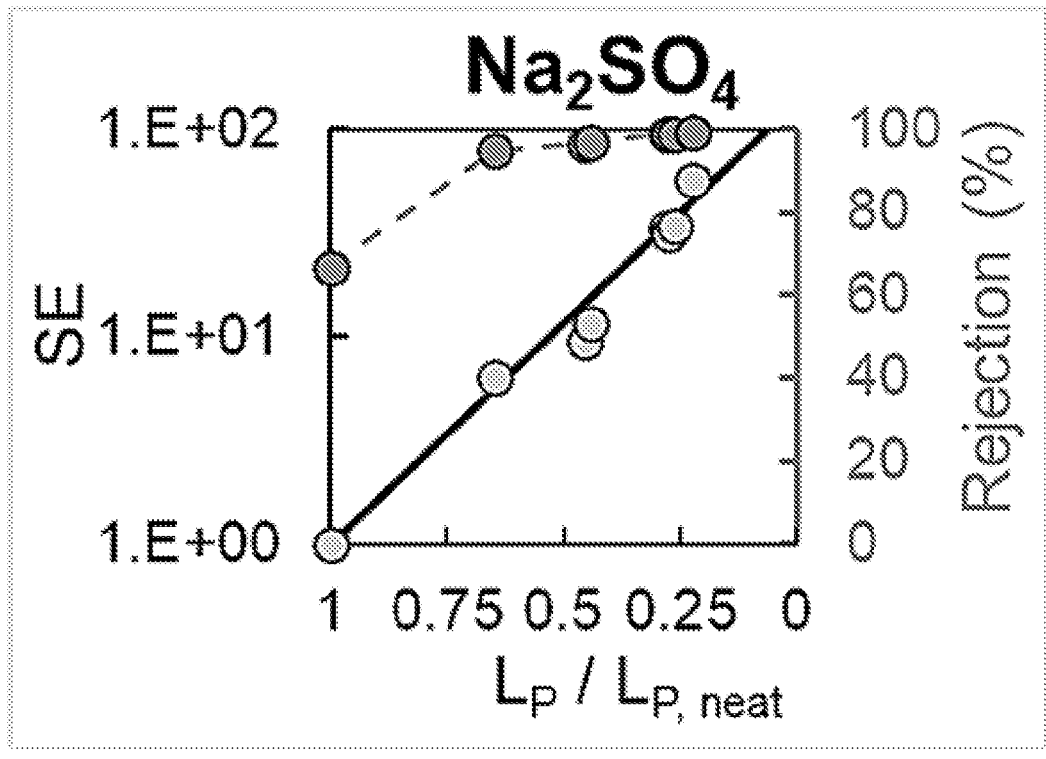

FIG. 15B is a graph that depicts the selectivity enhancement for Na$_2$SO$_4$ before and after cross-linking.

Figure 15C:
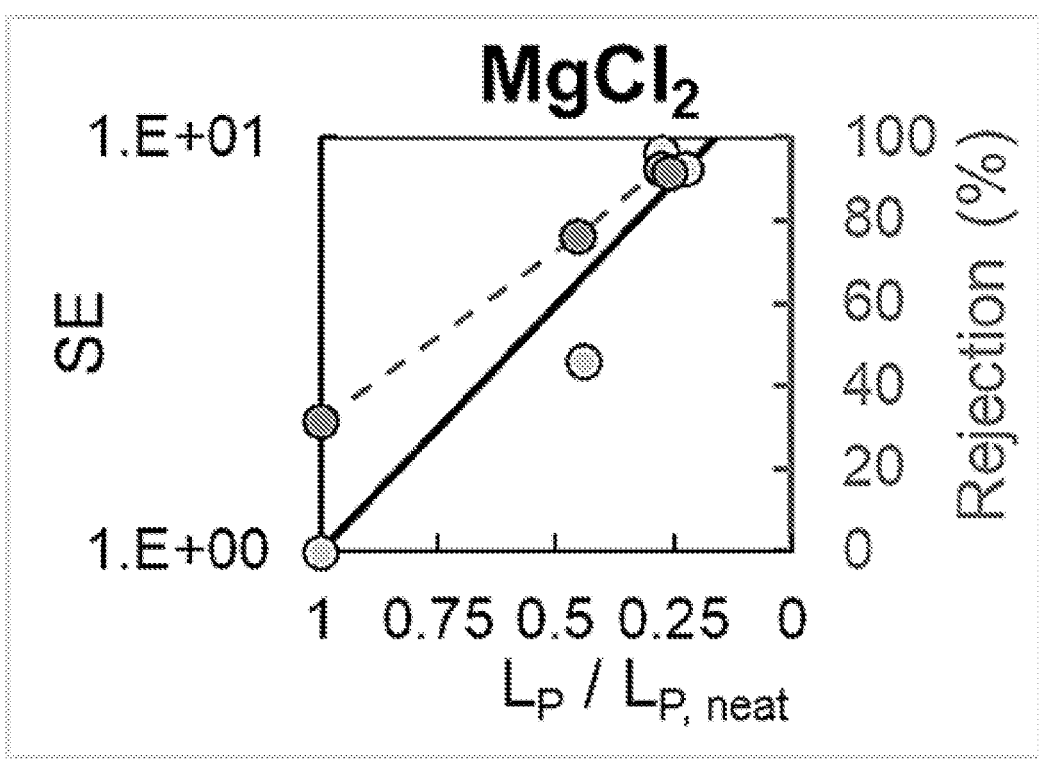

FIG. 15C is a graph that depicts the selectivity enhancement for MgCl$_2$ before and after cross-linking.

Figure 15D:
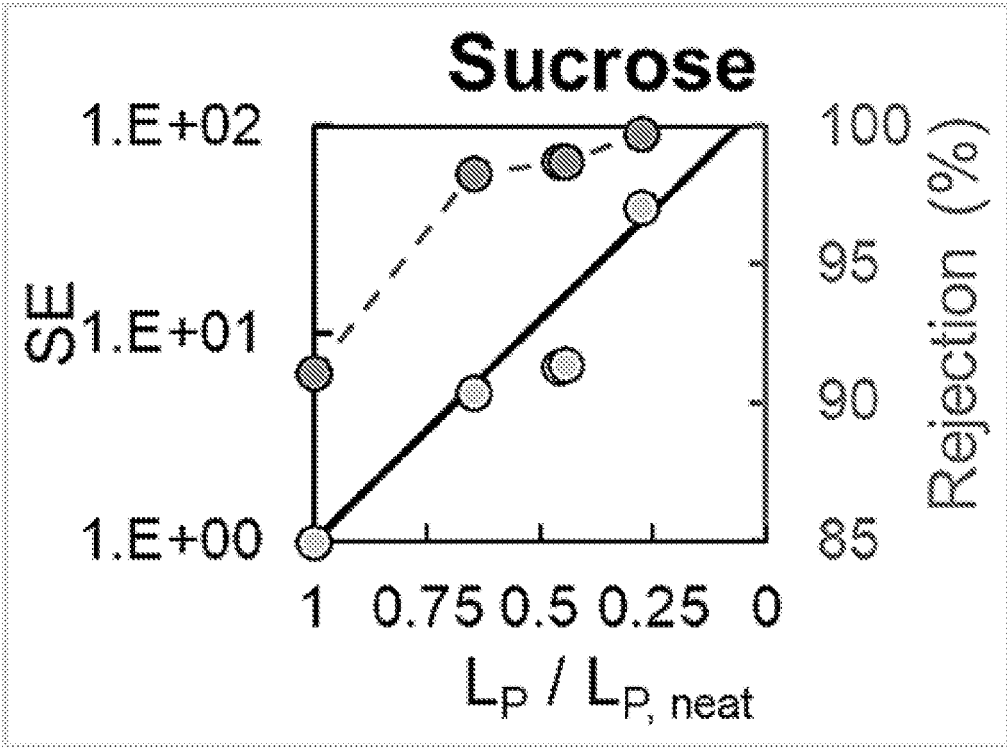

FIG. 15D is a graph that depicts the selectivity enhancement for sucrose before and after cross-linking.

Figure 15E:
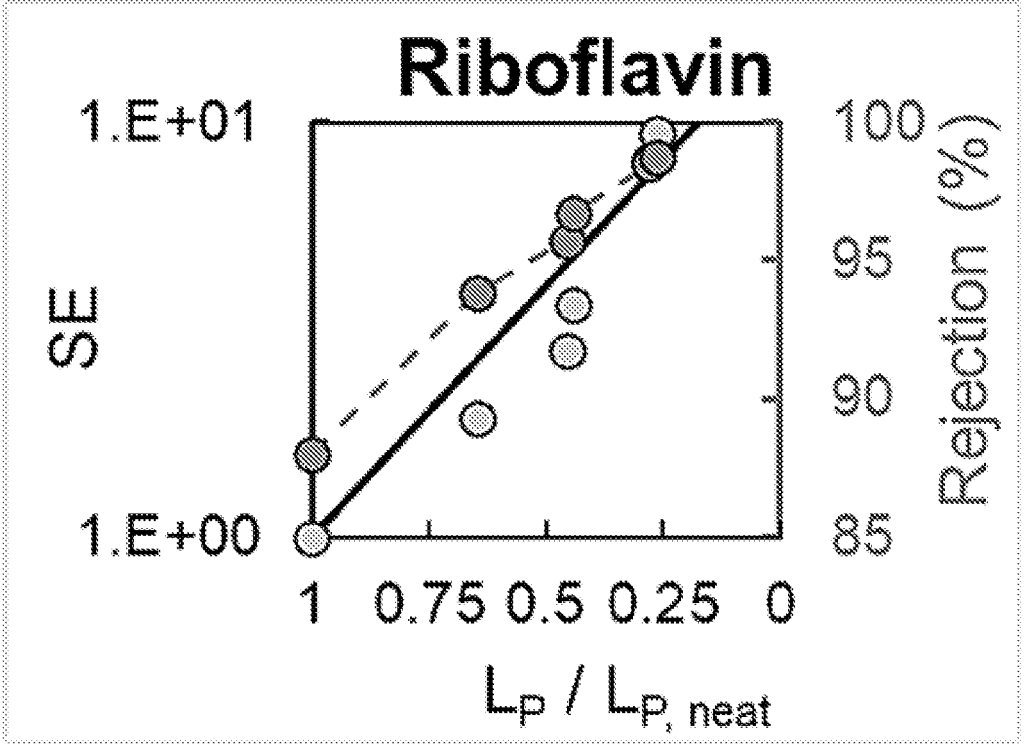

FIG. 15E is a graph that depicts the selectivity enhancement for riboflavin before and after cross-linking.

Figure 16:
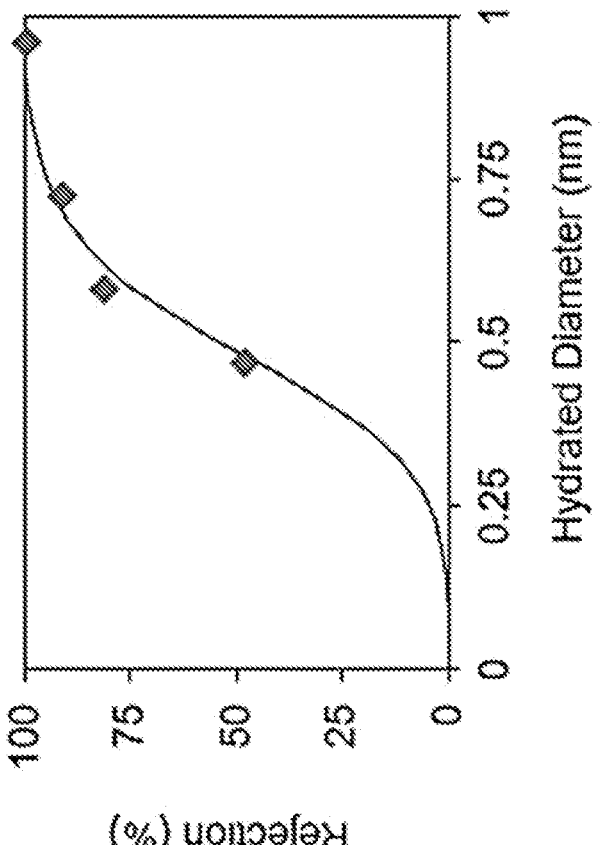

FIG. 16 is a graph that depicts the size-based selectivity of the cross-linked copolymer selective layer for neutral organic molecule.

Figure 17:
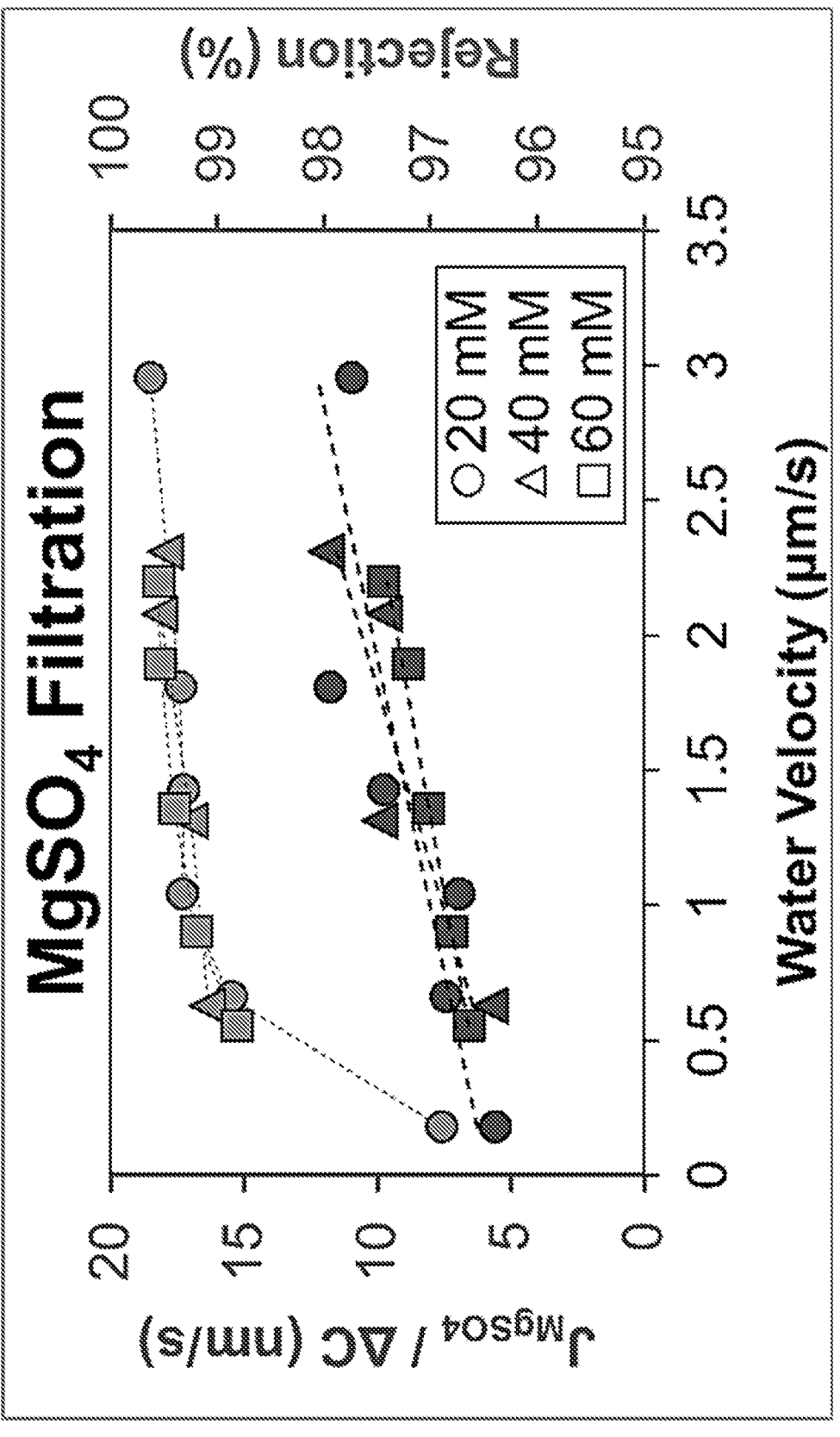

FIG. 17 is a graph that depicts the ion selective in MgSO4 filtration.

Figure 18:
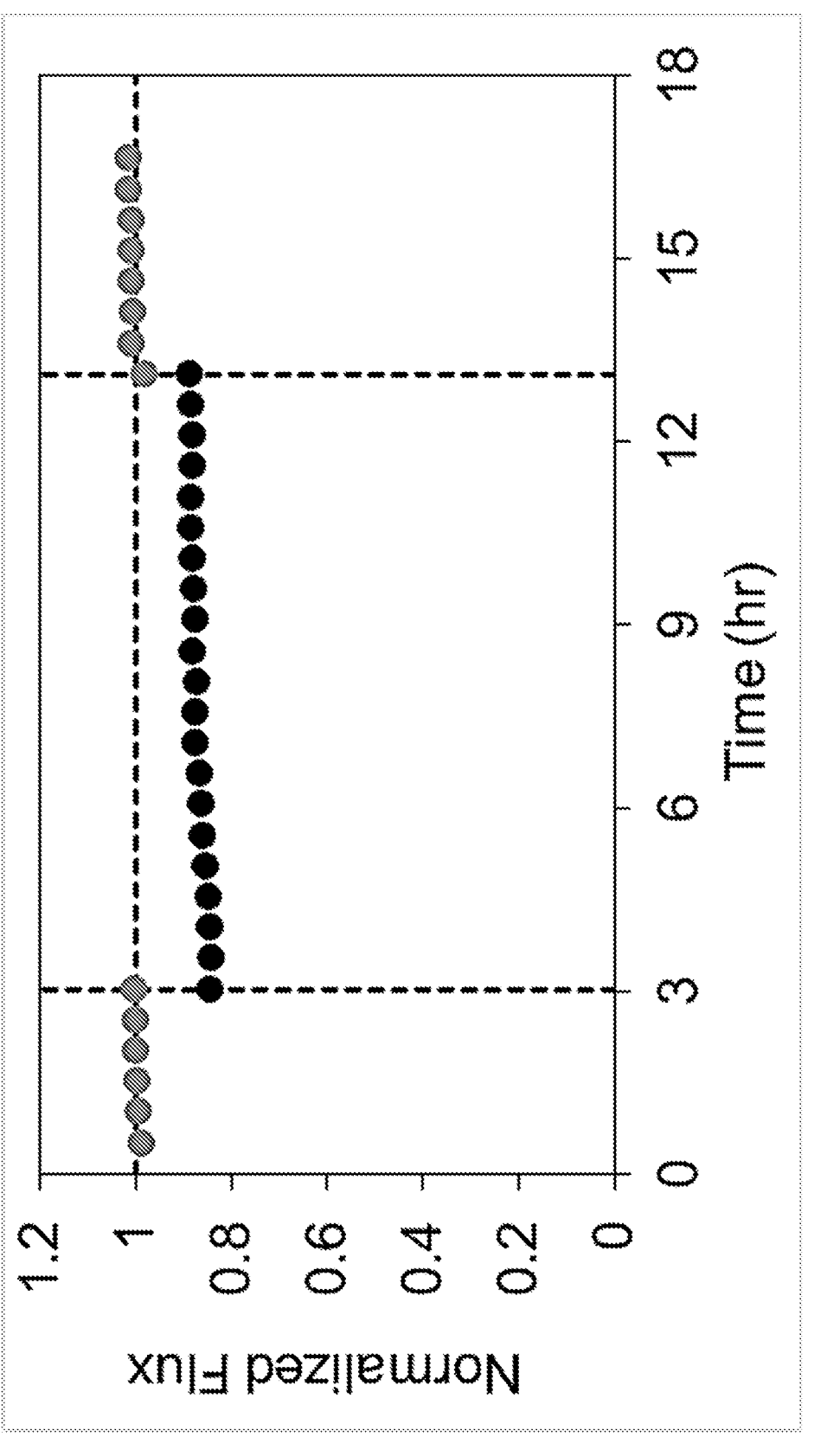

FIG. 18 is a graph that depicts the fouling resistance with the selective layer of cross-linked copolymer is subject to 50 ppm humic acid, 50 ppm sodium alginate, 1 mM CaC$_2$, pH=7.5, J$_0$=8 L m$^{-2}$ hr$^{-1}$ bar$^{-1}$.

Figure 19:
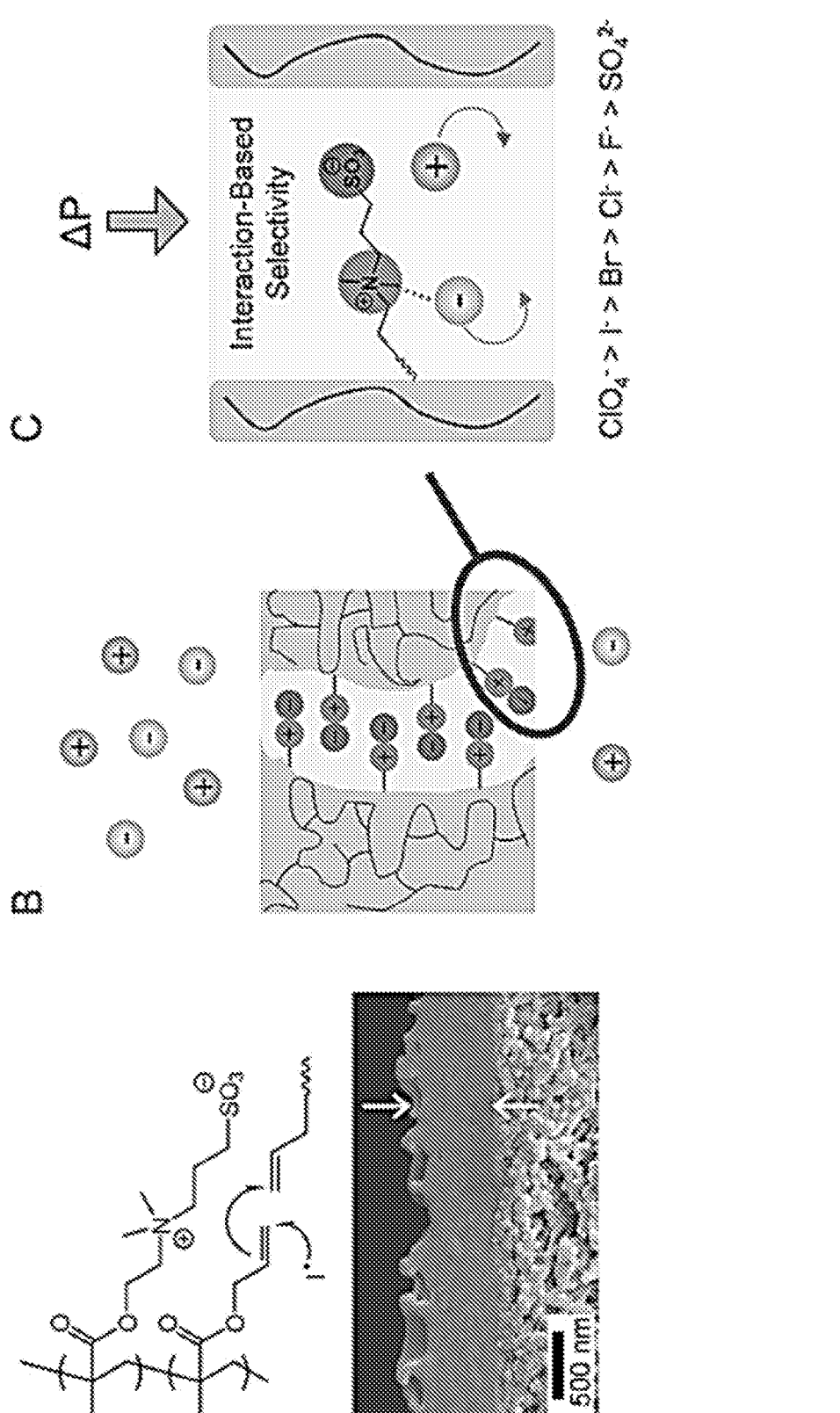

FIG. 19A is the chemical structure of the cross-linkable r-ZAC, poly(allyl methacrylate-r-sulfobetaine methacrylate) (P(AMA-r-SBMA)) (top) and a field emission scanning electron microscope (FESEM) cross-sectional image of a TFC membrane. The dense top layer is the cross-linkable r-ZAC on the support (bottom).

FIG. 19B is an illustration of cross-linked r-ZAC nanostructure. The hydrophobic domain (red) surrounds the zwitterionic nanochannels (blue), which permeate water and certain ions. The hydrophobic domain is chemically cross-linked to reduce the effective pore size to <1.0 nm.

FIG. 19C is a scheme showing the ZI-ion interactions occurring during pressure-driven filtration within the zwitterionic nanochannel. Favorable ZI-anion interactions enable faster diffusion rates. These membranes enable selective separations in during pressure-driven filtration, a highly scalable mode of operation.

FIG. 20A is a bar graph showing rejection of NaX with various anions at 250 psi pressure. Rejection increases with increasing anion hydration strength (left to right), which correlates closely with SB-anion interaction propensity.

FIG. 20B is a bar graph showing rejection of MCl with various cations at 250 psi pressure. Rejection is not determined by cation hydration strength (increasing left to right). Higher rejections are observed for divalent cations than monovalent cations.

Figure 21:
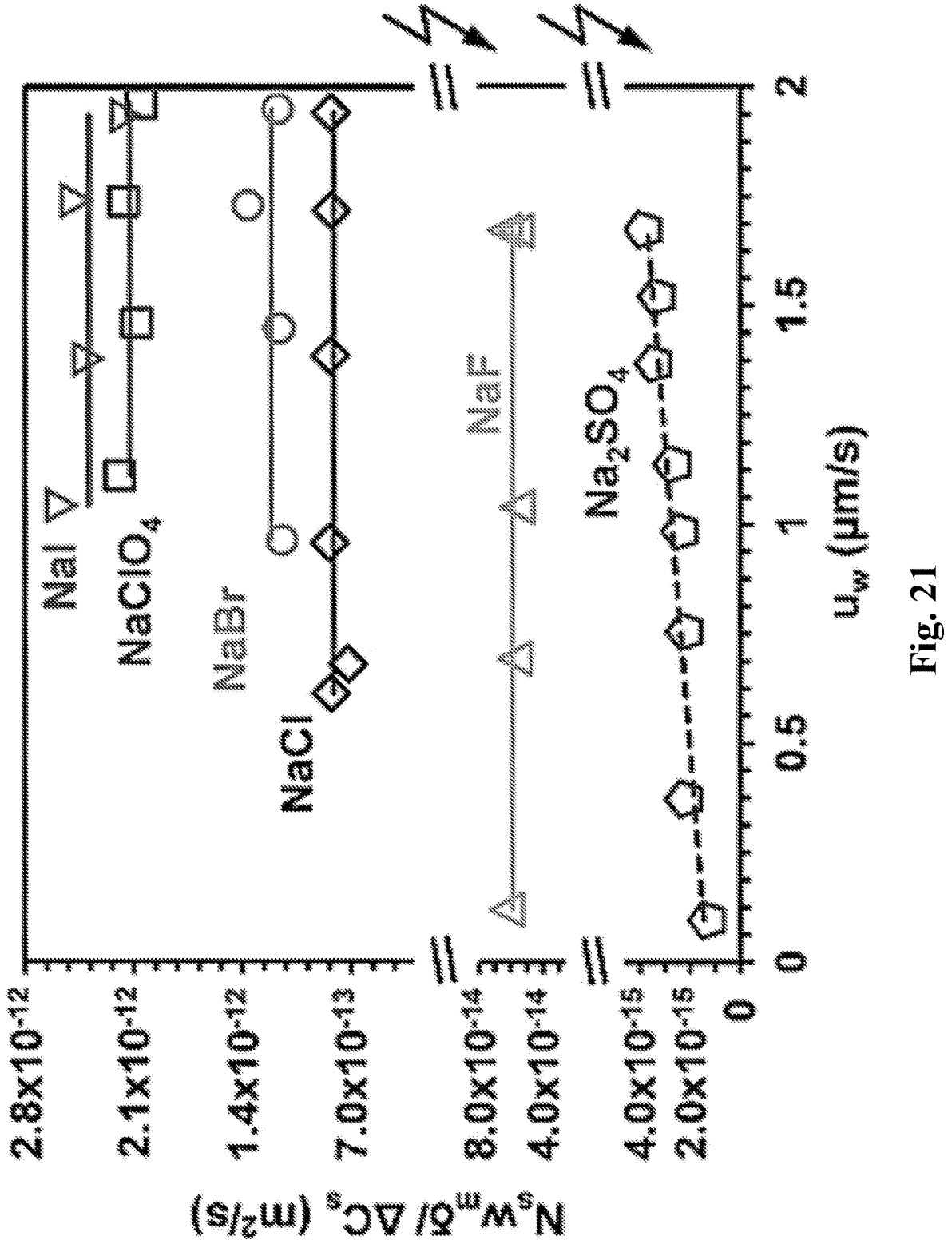

FIG. 21 is a graph showing normalized salt flux (N$_s$w$_m$δ/ΔC$_s$) vs. water velocity (u$_w$) for NaClO$_4$, NaI, NaBr, NaCl, NaF, and Na$_2$SO$_4$ at 20 mM feed concentration. Model fit (Eq. 1) reveals that convection is negligible for all salts except Na$_2$SO$_4$, which had important contributions from both diffusion and convection.

Figure 22:
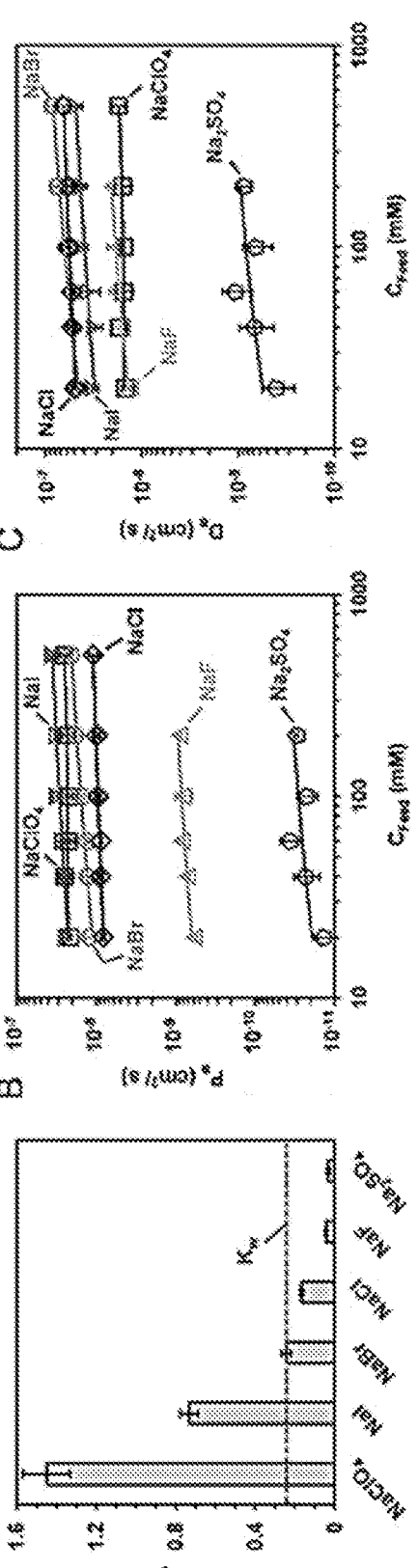

FIGS. 22A-22C are the partition coefficient (K$_s$, FIG. 22A), permeability (P$_s$, FIG. 22B), and diffusivity (D$_s$, FIG. 22C) of sodium salts. The water sorption coefficient (K$_w$) is also included in FIG. 22A. Greater partitioning and permeability generally corresponded to more favorable ZI-anion interactions, while diffusivity depended on interaction strength as well as anion size.

Figure 23:
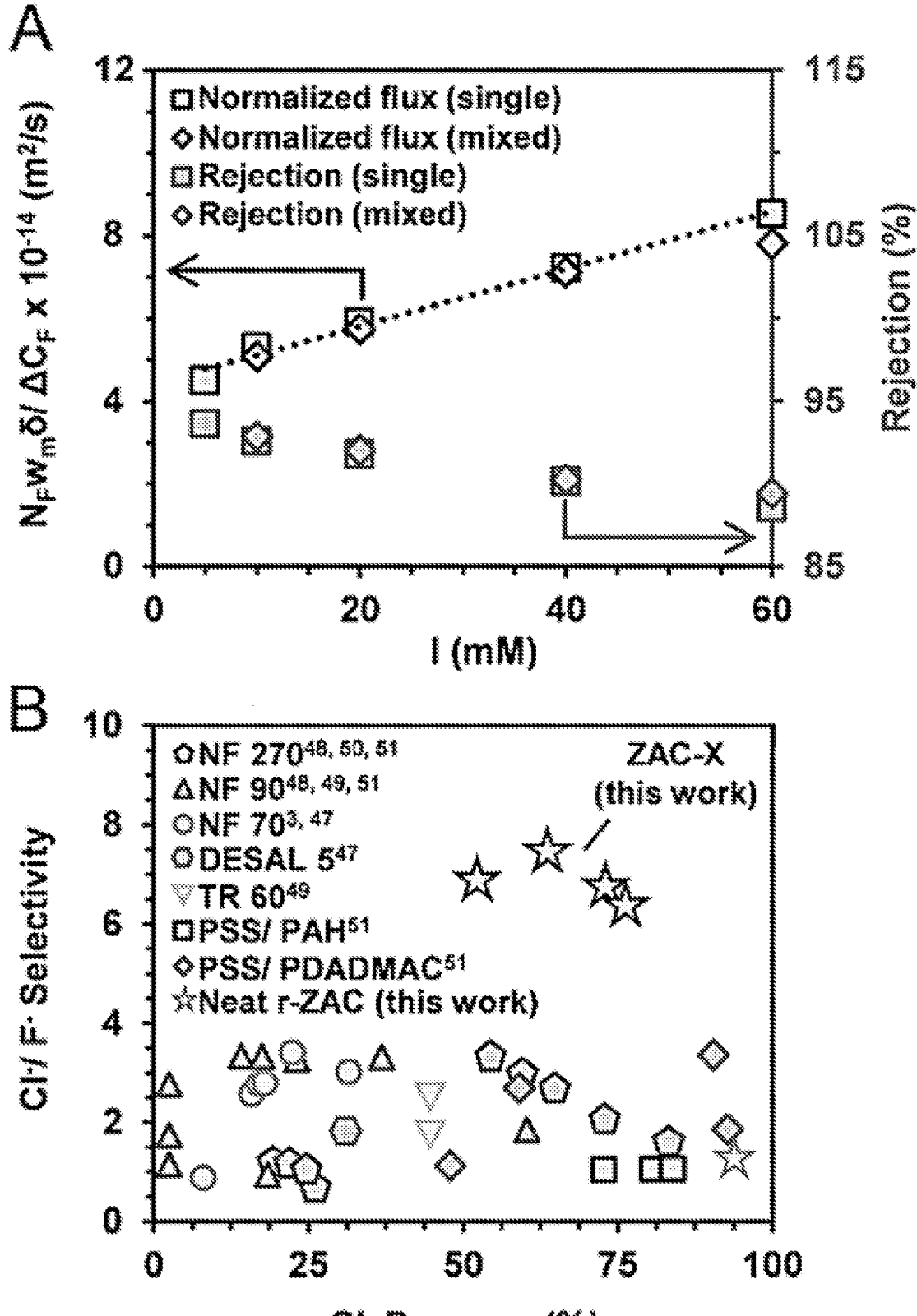

FIG. 23A is a graph showing normalized fluoride flux (N$_F$w$_m$δ/ΔC$_F$, left axis) and fluoride rejection (right axis) for NaF solutions and equimolar mixtures of NaCl/NaF vs. ionic strength (1). Pressure was adjusted to maintain 6-7 L m$^{-2}$ hr$^{-1}$ bar$^{-1}$ operating flux.

FIG. 23B is a graph showing Cl$^-$/F$^-$ selectivity vs. CP passage for ZAC-X, commercial NF, and layer-by-layer membranes. Chloride passage is a critical performance parameter for fluoride removal from drinking water. ZAC-X nearly doubled the highest Cl$^-$/F$^-$ selectivity set by state-of-the-art membrane technologies.

Figure 24:
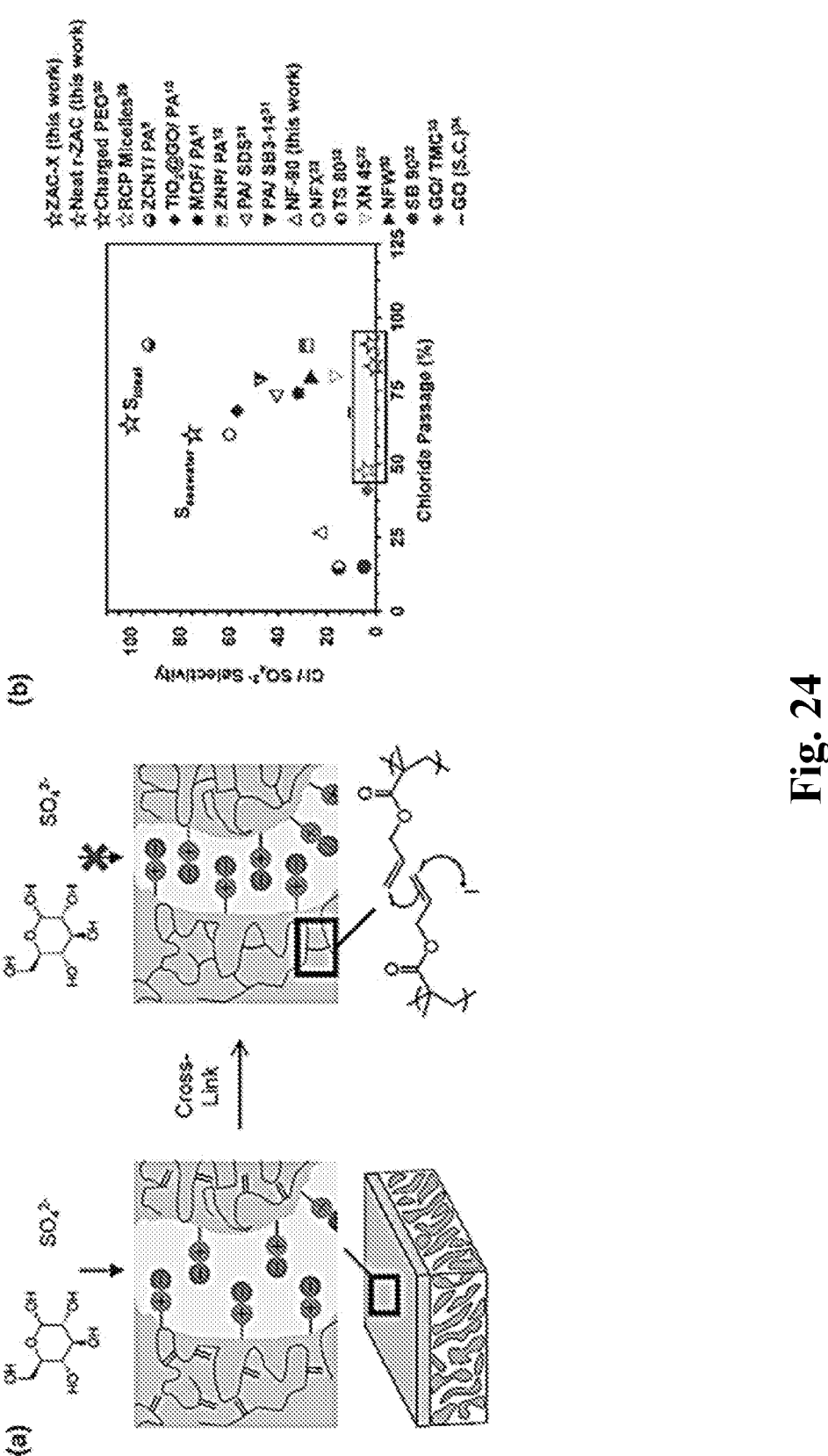

FIG. 24A is a scheme showing a cross-linkable r-ZAC TFC membrane and the tuning of its selectivity. The red pore walls represent the hydrophobic/cross-linkable domains, while the blue channels represent the hydrophilic/zwitterionic domains through which water and small solutes permeate. Selectivity is tuned by cross-linking the hydrophobic domain through allylic double bonds, arresting the zwitterionic nanochannels in a state of limited swelling. This reduces the pore size and enables the rejection of sub-nanometer solutes.

FIG. 24B is a graph showing performance comparison of highly cross-linked r-ZAC membranes (ZAC-X) against state-of-the-art membranes featuring nanostructured copolymer selective layers (star symbols, marked with gold region), polyamide TFNs, polyamide TFCs, and inorganic selective layers. ZAC-X demonstrated exceptional Cl$^-$/SO$_4$$^{2-}$ selectivity, surpassing the performance of other membrane technologies even when challenged with artificial seawater.

Figure 25:
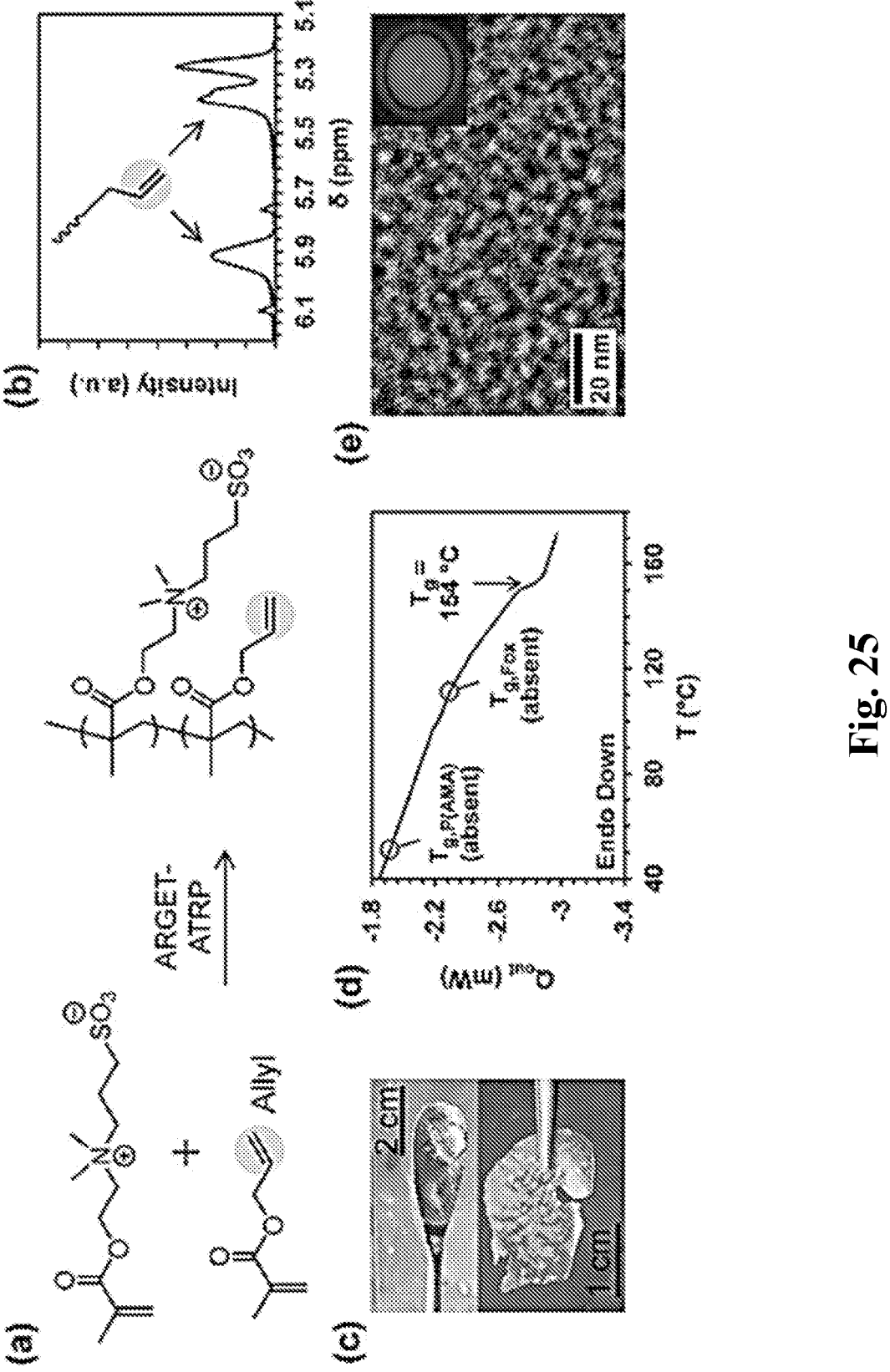

FIG. 25A shows the synthesis scheme for P(AMA-r-SBMA) via ARGET-ATRP.

FIG. 25B is a copolymer $^1$H-NMR spectra for 6.2-5.1 ppm (500 MHz, d$_6$-DMSO), showing broad allyl peaks indicating the preservation of AMA units.

FIG. 25C is a set of images of the gel formed by exposing a solution of copolymer (3 wt %) and photo-initiator (5 wt %) to UV light (top) and a cross-linked copolymer film after several weeks of immersion in TFE (bottom). No discernable change in swelling, color, or opacity was observed, whereas un-cross-linked polymer films readily dissolve in TFE.

FIG. 25D is a DSC thermogram for un-cross-linked copolymer (second run, 30° C./min heating rate).

FIG. 25E is a TEM brightfield image for un-cross-linked copolymer showing a bicontinuous network of zwitterionic nanochannels (dark) surrounded by the hydrophobic phase (light). The insert shows the FFT of the image, with the dark ring corresponding to the spatial frequency of the zwitterionic domains.

Figure 26:
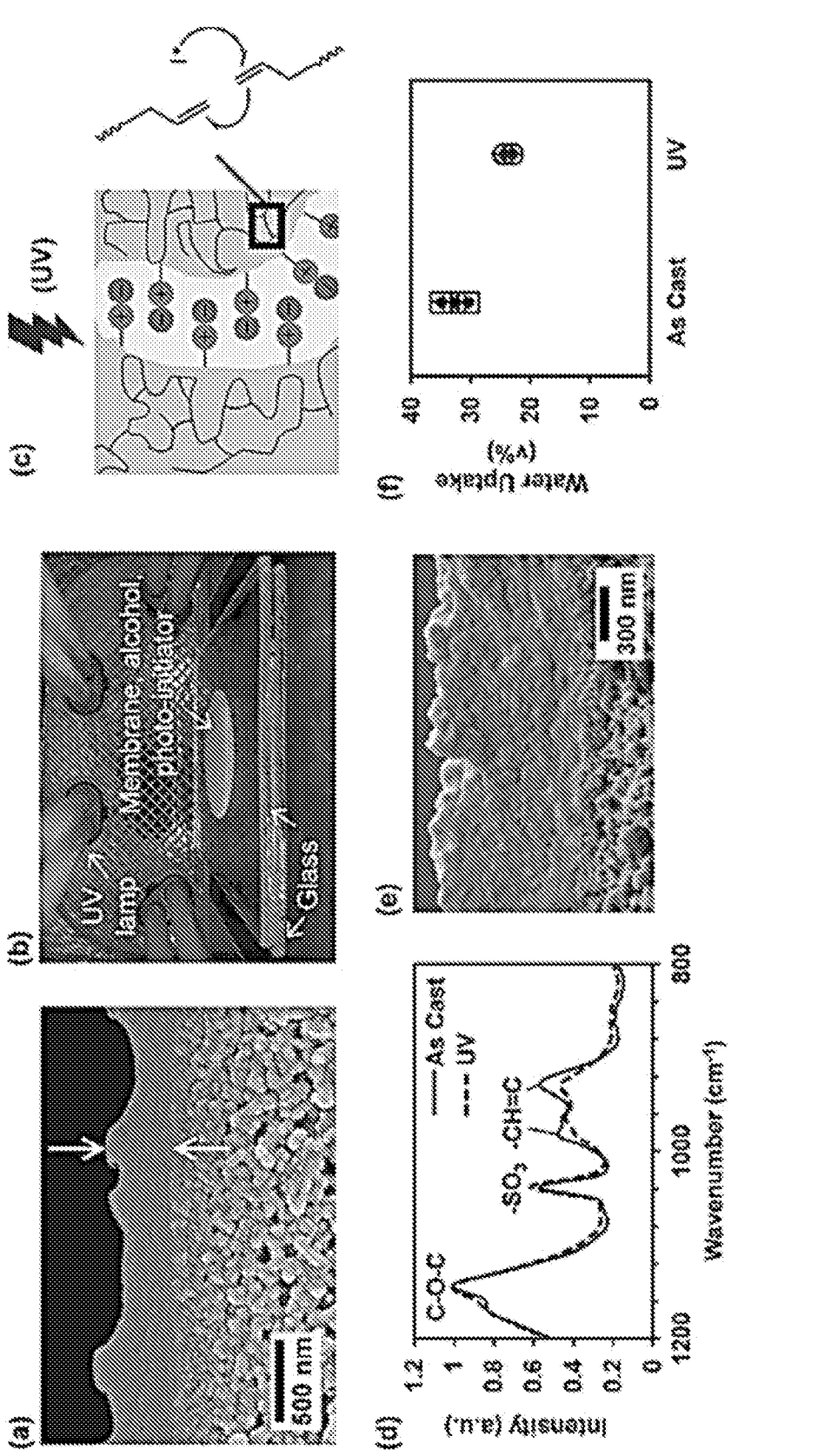

FIG. 26A is an image showing the cross-sectional field emission scanning electron microscope (FESEM) image of TFC membranes featuring an ~300-500 nm P(AMA-r-SBMA) selective layer covering the support.

FIG. 26B is a diagram showing a membrane disk prepared for cross-linking.

FIG. 26C is a scheme showing cross-linking of the hydrophobic domains of P(AMA-r-SBMA) via photo-polymerization.

FIG. 26D is an ATR-FTIR spectra of as cast and cross-linked films of P(AMA-r-SBMA) (20 minutes UV-cure with 3.0 w/v % photo-initiator).

FIG. 26E is a cross-sectional SEM image of a cross-linked TFC membrane that was immersed in TFE, a good solvent for P(AMA-r-SBMA), for several weeks. The selective layer did not dissolve, confirming that it was cross-linked.

FIG. 26F is a graph showing the water uptake for un-cross-linked (As cast) and cross-linked (UV, 5 minutes cure time, 3.0 w/v % photo-initiator) films of P(AMA-r-SBMA).

Figure 27:
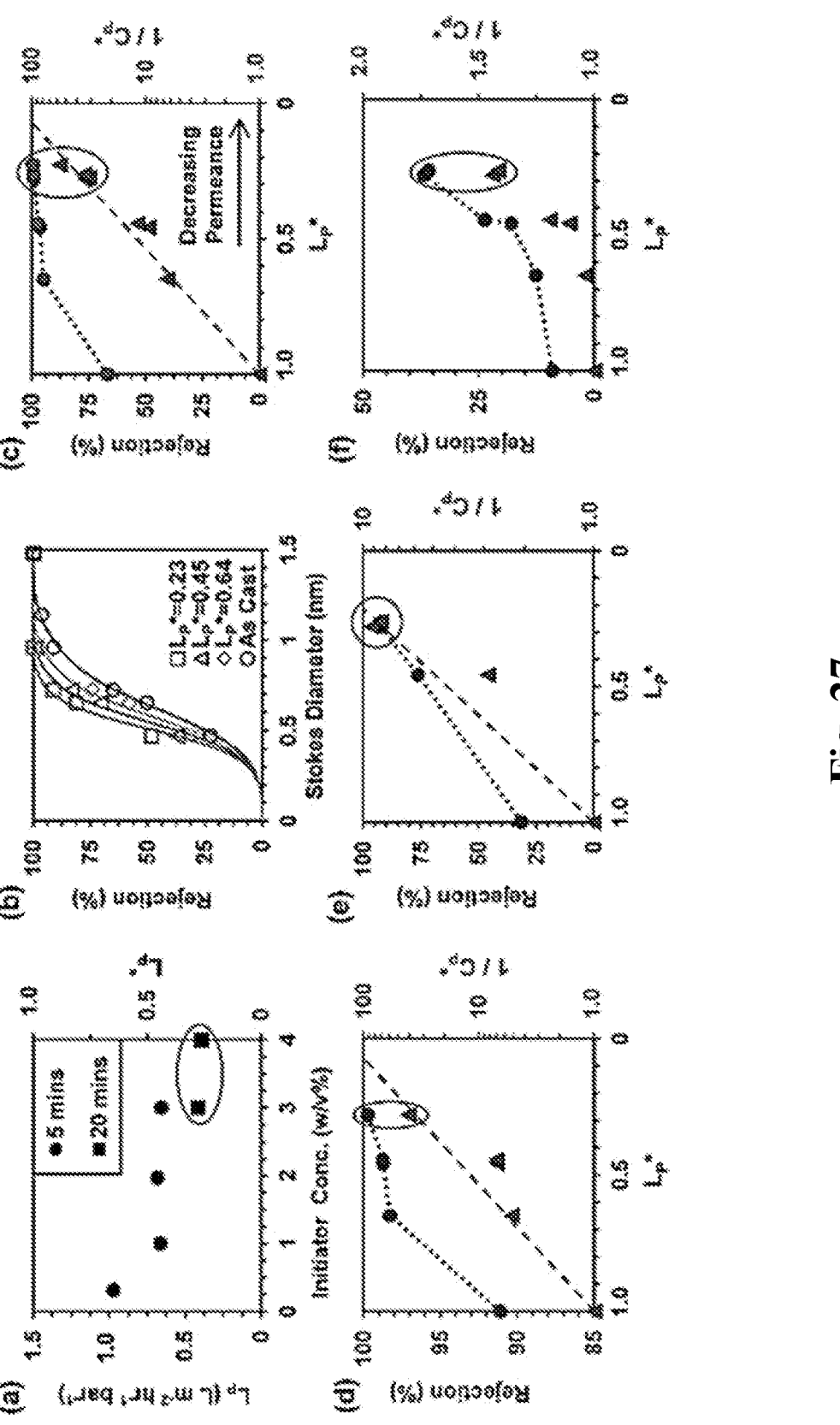

FIG. 27A is a graph showing $L_P$ (left axis) and $L_P^*$ (right axis) versus photo-initiator concentration for different cure times.

FIG. 27B is a graph showing rejection of neutral solutes vs. Stokes diameter for membranes cross-linked to different extents. Greater reductions in permeance resulted in progressively smaller pores. The solid lines are fits to the DSPM for uniform pore diameters of 0.94 nm, 1.06 nm, 1.17 nm, and 1.36 nm for $L_p^*$=0.23, $L_P^*$=0.45, $L_p^*$=0.64, and As Cast, respectively (Table S3).

FIGS. 27C-27F are graphs showing rejection (left axis, ●) and $1/C_P^*$ (right axis, ▲) versus $L_P^*$ for $Na_2SO_4$ (FIG. 27C), sucrose (FIG. 27D), $MgCl_2$ (FIG. 27E), and NaCl (FIG. 27F). Rejection and $1/C_P^*$ increased with decreasing $L_P^*$, indicating progressively smaller pores. Performance of the most highly cross-linked membranes selected for further study, ZAC-X, is circled in red. The pressure was 250 psi.

Figure 28:
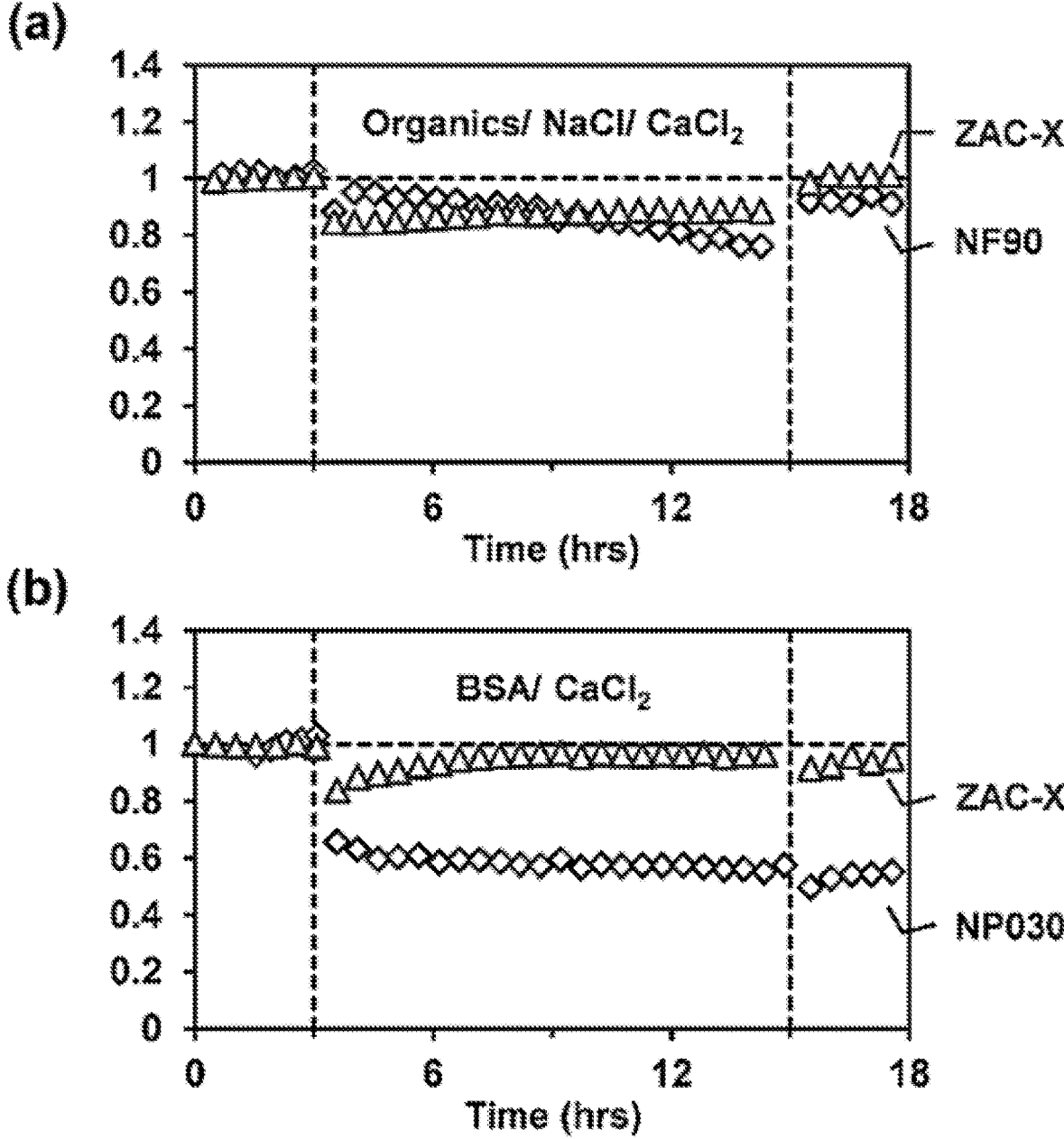

FIG. 28A is a graph showing fouling by a solution containing common foulants in surface water (50 ppm humic acid, 50 ppm sodium alginate, 1 mM $CaCl_2$, 10 mM NaCl, pH=7, $J_0$=8.7 L m$^{-2}$ hr$^{-1}$).

FIG. 28B is a graph showing fouling by a protein solution (1,000 ppm bovine serum albumin (BSA), 10 mM $CaCl_2$, pH=6.3, $J_0$=10.0 L m$^{-2}$ hr$^{-1}$). Initial flux was completely recovered after a simple water rinse.

Figure 29:
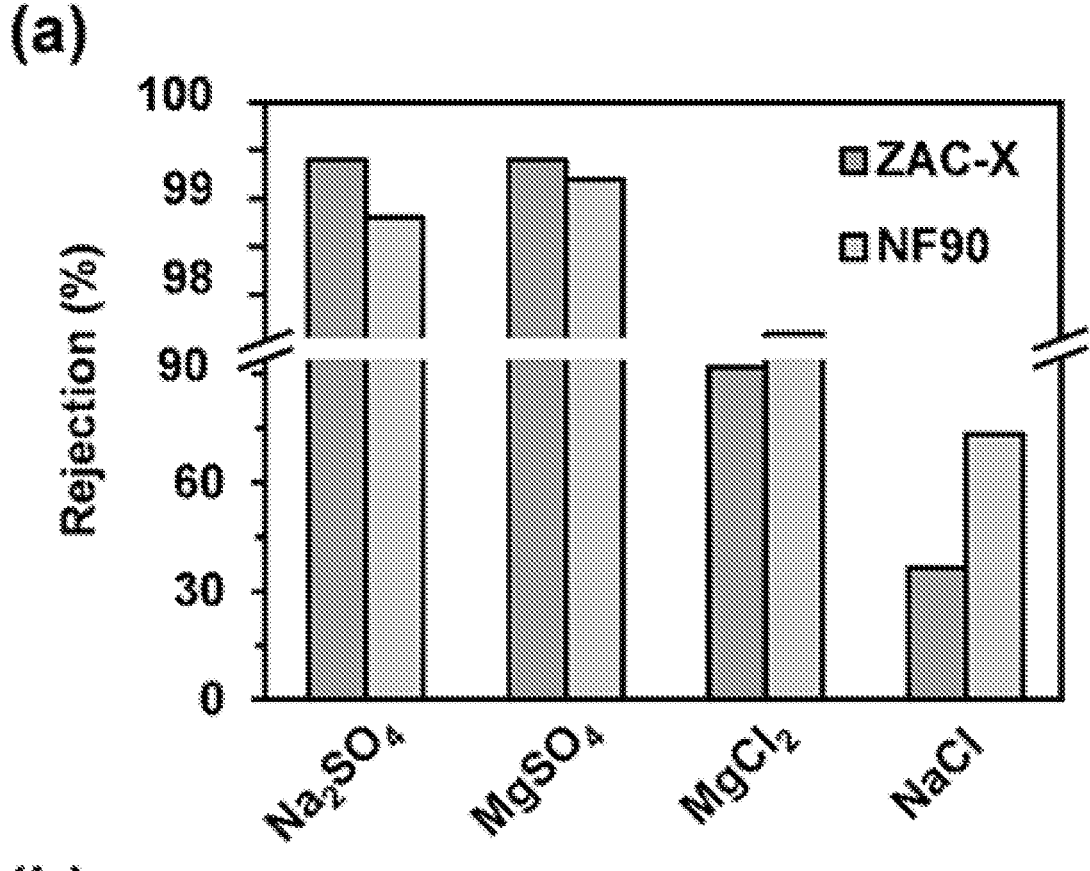
Figure 29:
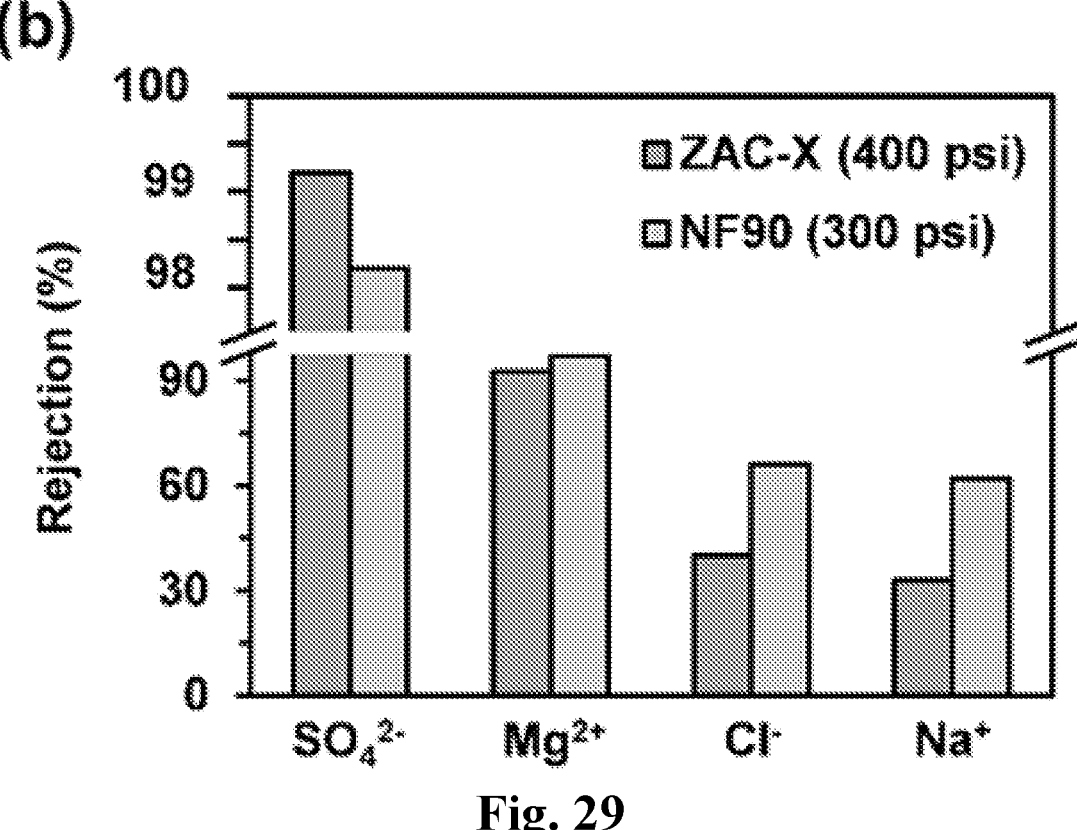

FIG. 29A is a bar graph showing rejection of single salts (20 mM) by ZAC-X and NF90. The operating flux was 6.3-6.9 L m$^{-2}$ hr$^{-1}$.

FIG. 29B is a bar graph showing rejection of various ions from artificial seawater by ZAC-X and NF90. The composition was $C_{SO4}$=28.2 mmol/kg, $C_{Mg}$=63.1 mmol/kg, $C_{Cl}$=549 mmol/kg, and $C_{Na}$=479 mmol/kg. The operating flux was 6 L m$^{-2}$ hr$^{-1}$.

Figure 30:
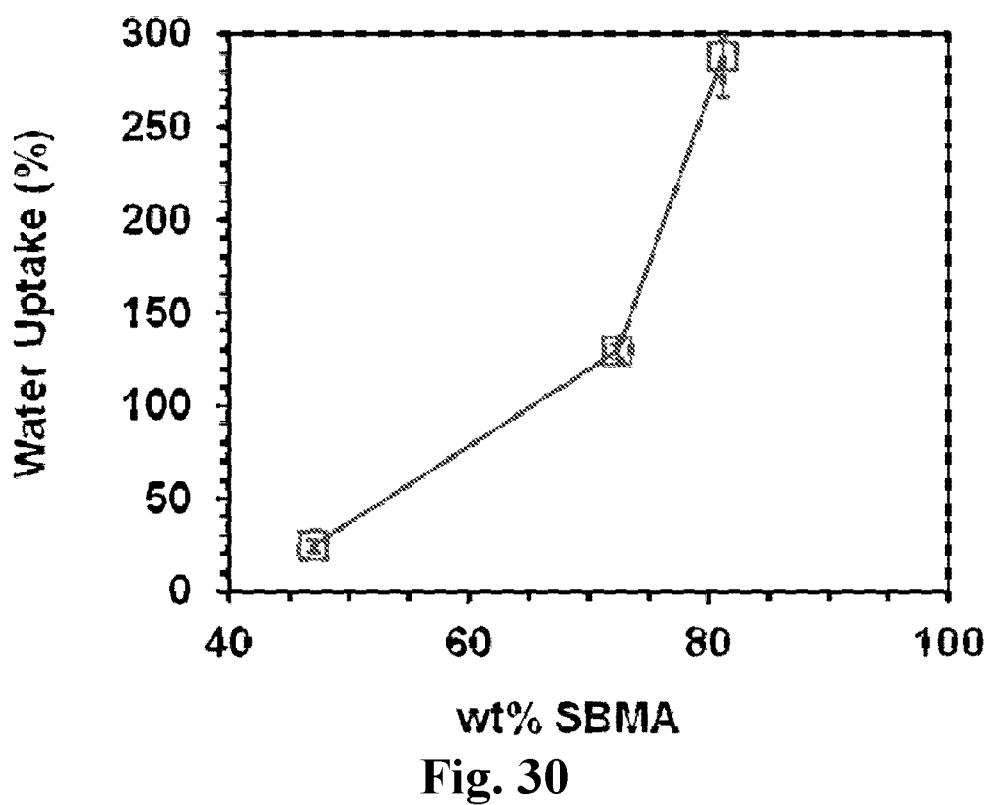

FIG. 30 is a graph showing water uptake versus zwitterion content for P-40, P-60, and P-70.

Figure 31:
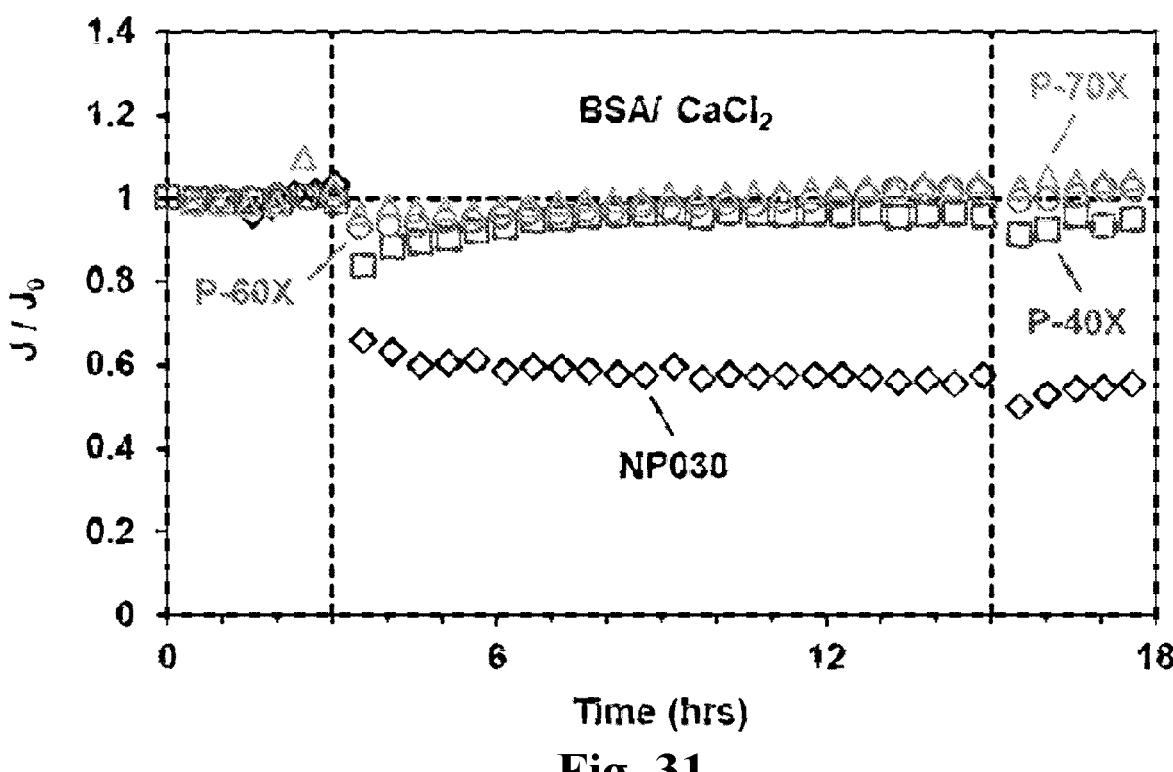

FIG. 31 is a graph showing fouling resistance of cross-linked r-ZAC membranes of different zwitterion composition.

Figure 32:
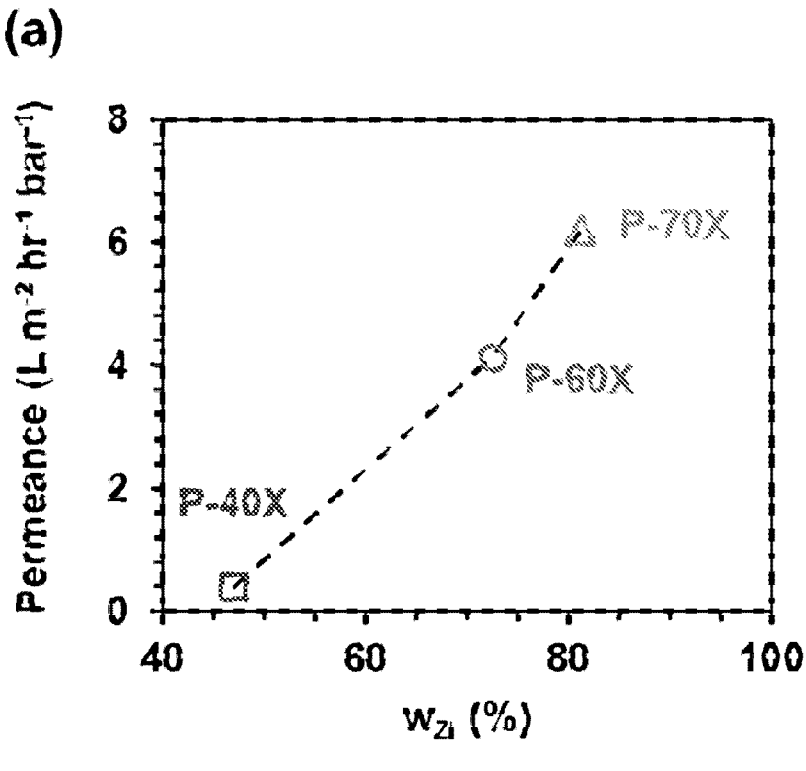

FIG. 32 is a graph showing permeance versus zwitterion content for cross-linked r-ZAC membranes.

Figure 33:
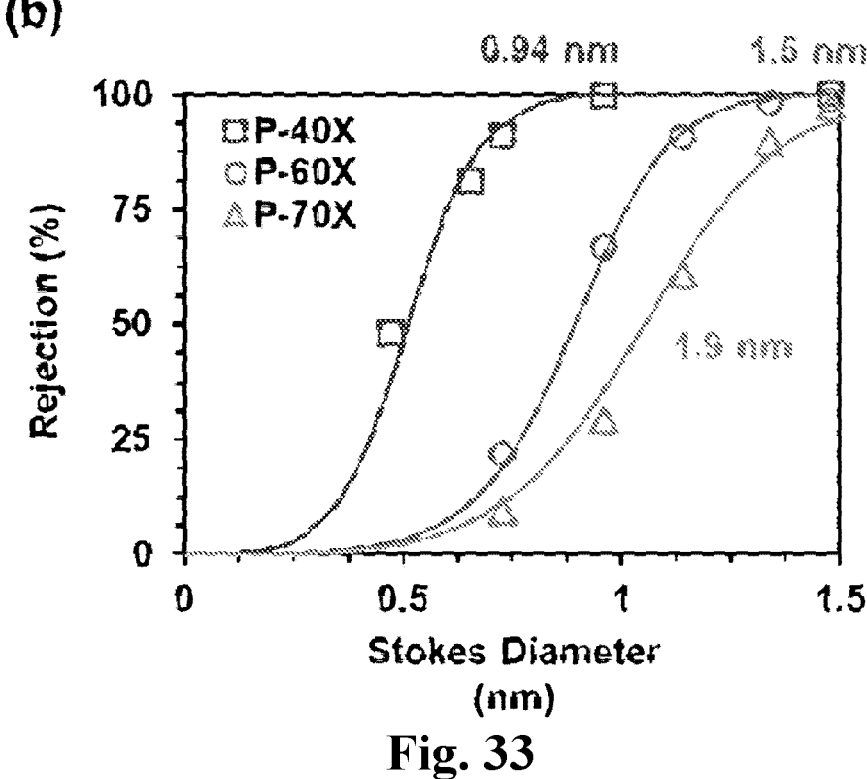

FIG. 33 is a graph showing rejection of neutral organics versus Stokes diameter for cross-linked r-ZAC membranes.

Figure 34:
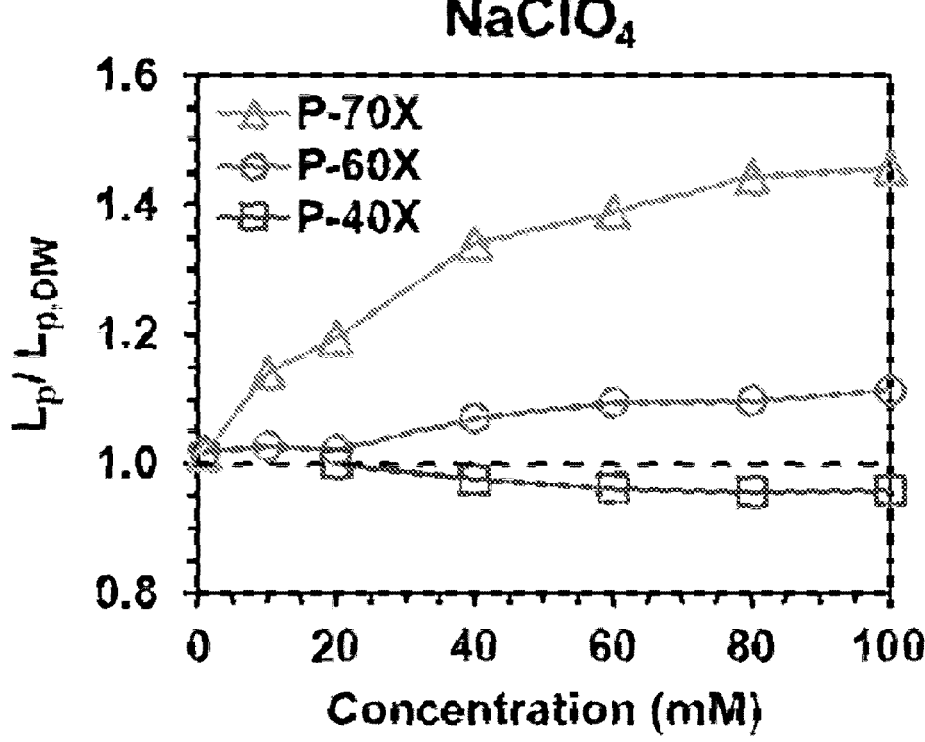

FIG. 34 is a graph showing tuning of water permeance using different salt solutions.

DETAILED DESCRIPTION

Disclosed are a family of polymeric materials that comprise at least two types of repeat units:

1. A zwitterionic repeat unit, which serves to impart water permeability and fouling resistance to the membrane selective layer; and 2. A relatively hydrophobic repeat unit that comprises a functional group that can further polymerize upon additional processing. This repeat unit prevents the dissolution of the coating in water, also imparts selectivity by preventing the swelling of zwitterion containing nanodomains formed by self-assembly, and can be further modified by methods including radical polymerization. A typical cross-linkable moiety is a C=C double bond, which can be polymerized upon exposure to a free radical photoinitiator, including one activated by ultraviolet (UV) light. It may also be possible to do this using thermal methods (i.e. using an initiator activated at higher temperatures), or through a redox reaction. It may also be possible to polymerize these groups by exposure to UV light, even without any photoinitiator.

The material can also include an additional hydrophobic repeat unit that is not cross-linkable.

These copolymers are synthesized by methods well-known in polymer science. If the cross-linkable group includes a C=C double bond, such as a vinyl or allyl group, this copolymer may be synthesized using controlled free radical methods that interact only with more reactive polymerizable groups, e.g. atom transfer radical polymerization (ATRP) and its modified versions such as atom regeneration transfer ATRP (ARGET-ATRP), nitroxide-mediated polymerization (NMP), or reversible addition fragmentation transfer (RAFT) polymerization. It may also be possible to prepare these polymers using regular free radical polymerization while carefully controlling polymerization conditions (e.g. highly dilute solution, low conversion).

The copolymers are statistical copolymers. It is preferable for the copolymers to incorporate these two types of repeat units in roughly random order (as opposed to blocks).

It is preferable for the copolymers to be of mostly linear architecture. In certain embodiments, the copolymers are linear. In certain embodiments, the copolymers are branched.

It is preferable for these copolymers to have a molecular weight above 5.000 g/mol, preferably above 30.000 g/mol, even more preferably above 100,000 g/mol.

It is preferable for these copolymers to contain zwitterionic repeat units at a concentration between 10-90 wt %, more preferably 20-80 wt %, and even more preferably between 25-75 wt %.

In one embodiment, all hydrophobic repeat units are cross-linkable. In another embodiment, three monomers are used: a cross-linkable monomer, a non-crosslinkable hydrophobic monomer, and a zwitterionic monomer.

We have used allyl methacrylate (AMA) as the cross-linkable monomer. Other acrylate, methacrylate, acrylamide, methacrylamide, and styrene derivatives that include an allyl ($CH_2$—CH=$CH_2$), vinyl (—CH=$CH_2$ or —CH=CH—), vinyl ether (—O—CH=$CH_2$), and vinyl ester (—CO—O—CH=$CH_2$) groups in their side-groups are also amenable to similar treatment. These functional groups are polymerizable by free radical polymerization, but significantly less reactive than acrylate, methacrylate, styrene, acrylamide and methacrylamide groups listed above, particularly in the controlled free radical polymerization methods described. Some possible cross-linkable monomers include (but are not limited to): allyl acrylate, allyl acrylamide, allyl methacrylamide, vinyl methacrylate, vinyl methacrylamide, vinyl acrylamide, allyl vinyl benzene (styrene derivative), other alkenyl acrylates/methacrylates/acrylamides/styrenes (e.g. undecenyl acrylate), and monomers with other double bond containing side-groups (e.g. ethylene glycol dicyclopentenyl ether methacrylate, ethylene glycol dicyclopentenyl ether acrylate).

Work to date has focused on sulfobetaine methacrylate (SBMA) and methacryloxy phosphorylcholine (MPC) as the zwitterionic monomers. However, there is a wide swath of zwitterionic monomers that will be viable. Monomers that include sulfobetaine, phosphorylcholine, and carboxybetaine groups attached to acrylate, methacrylate, acrylamide, methacrylamide, vinyl pyridine, vinyl imidazole, and many other polymerizable groups are viable options.

If used, the non-crosslinkable hydrophobic monomer can be selected among a broad range. Homopolymers formed from preferred monomers are insoluble in water under operating conditions. Fluoralkyl and alkyl-, and fluoroaryl and aryl-substituted acrylates, methacrylates, acrylamides and methacrylamides, styrene and its derivatives, acrylonitrile and methacrylonitrile are all viable options for this hydrophobic monomer. In some embodiments, the homopolymer of this hydrophobic monomer has a glass transition temperature above 0° C., but this is not required. We have used trifluoromethyl methacrylate (TFEMA) for this purpose.

Then, these copolymers are coated onto a porous support by methods well-understood in the membrane industry (e.g., doctor blade coating, spray coating). Upon deposition, the zwitterionic groups are expected to form clusters due to Coulombic interactions.

After this membrane is formed, the cross-linkable groups on the copolymer chains are activated to form additional bonds between them. In one preferred embodiment, this is done by first immersing the membrane into a solvent containing a free radical photoinitiator, then exposing the membrane to ultraviolet light. This activates the double bonds on the copolymer, creating bonds between polymer chains. While this approach is described in detail (in part to leverage advantages from solvent use, described below), other possible cross-linking approaches include:

No use of solvent during cross-linking. The photoinitiator can be added to the solution from which the copolymer is coated onto the support. The coated membrane can then be exposed to UV light.

Use of a thermal free radical initiator in place of the photoinitiator, and cross-linking by exposure to high temperatures.

Use of high intensity UV with no photoinitiator.

Thermal cross-linking without an initiator.

Use of a redox initiator in place of the photoinitiator.

Upon cross-linking, the membrane selective layer has enhanced chemical and physical stability. The performance of the layer would be expected to remain stable through a wider operating window, enabling its use at higher temperatures and/or with more complex feeds containing higher salt concentrations, some solvents, etc.

The cross-linking process may also be used to adjust and improve the selectivity of the membrane. Specifically, if during cross-linking, the membrane is exposed to a solvent that preferentially swells the hydrophobic domains as opposed to the zwitterionic domains, our data indicates that the effective pore size of the membrane can be decreased to <1 nm, as low as 0.74 nm by our experiments (and possibly even lower) measured using sugar molecule rejections. This results in membranes with highly tunable selectivity, which can be adjusted to the desired value for each application.

Specifically, membranes with the tightest pores have exceptional rejection of small organic compounds (including sugars, dyes, etc) and significant selectivity between $SO_4^{2-}$ and $Cl^-$ ions. These features are highly promising for applications that include sulfate removal in offshore oil extraction, treating wastewaters with high concentration of small molecule organics such as sugars, and other demanding water treatment processes.

In all cases, these membranes display exceptional fouling resistance, retaining their performance during the filtration of water samples containing proteins and oil. This quality arises from the choice of the zwitterionic functional group.

In one aspect, disclosed are copolymers, comprising a plurality of zwitterionic repeat units, and a plurality of hydrophobic repeat units; wherein at least some of the hydrophobic repeat units each independently comprise a cross-linkable moiety. In certain embodiments, the plurality of hydrophobic repeat units comprises (i) hydrophobic repeat units comprising a cross-linkable moiety, and (ii) hydrophobic repeat units that do not comprise a cross-linkable moiety In certain embodiments, each of the zwitterionic repeat units independently comprises sulfobetaine, carboxybetaine, phosphorylcholine, imidazolium alkyl sulfonate, or pyridinium alkyl sulfonate.

In certain embodiments, each of the zwitterionic repeat units is independently formed from sulfobetaine acrylate, sulfobetaine acrylamide, carboxybetaine acrylate, carboxybetaine methacrylate, 2-methacryloyloxyethyl phosphorylcholine, acryloxy phosphorylcholine, phosphorylcholine acrylamide, phosphorylcholine methacrylamide, carboxybetaine acrylamide, 3-(2-vinylpyridinium-1-yl)propane-1-sulfonate, 3-(4-vinylpyridinium-1-yl)propane-1-sulfonate, or sulfobetaine methacrylate.

In certain embodiments, each of the hydrophobic repeat units is independently formed from a styrene, an alkyl acrylate, an alkyl methacrylate, an alkyl acrylamide, an acrylonitrile, an aryl acrylate, an aryl methacrylate, and an aryl acrylamide.

In certain embodiments, the cross-linkable moiety comprises a carbon-carbon double bond. In certain embodiments, the cross-linkable moiety comprises an allyl ($CH_2$—CH=$CH_2$), a vinyl (—CH=$CH_2$ or —CH=CH—), a vinyl ether (—O—CH=$CH_2$), or a vinyl ester (—CO—O—CH=$CH_2$).

In certain embodiments, the copolymer is poly((allyl methacrylate)-random-(sulfobetaine methacrylate)) or poly((allyl methacrylate)-random-(2-methacryloyloxyethyl phosphorylcholine)).

In certain embodiments, the copolymer disclosed herein further comprising a plurality of a second type of hydrophobic repeat units, wherein the second type of hydrophobic repeat units are each independently formed from an alkyl acrylate, a alkyl methacrylate, an alkyl acrylamide, an acrylonitrile, an aryl acrylate, an aryl methacrylate, and an aryl acrylamide.

In certain embodiments, the second type of hydrophobic repeat units are formed from 2,2,2-trifluoroethyl methacrylate.

In certain embodiments, the copolymer is poly(allyl methacrylate-random-trifluoroethyl methacrylate-random-2-methacryloyloxyethyl phosphorylcholine).

In certain embodiments, the copolymer has a molecular weight of about 10,000 to about 10,000,000 Dalton. In certain embodiments, the copolymer has a molecular weight of about 20,000 to about 500,000 Dalton.

In certain embodiments, the zwitterionic repeat units and the hydrophobic repeat units each constitute 20-80% by weight of the copolymer. In certain embodiments, the zwitterionic repeat units constitute 25-75% by weight of the copolymer, and the hydrophobic repeat units constitute 25-75% by weight of the copolymer.

In certain embodiments, the copolymer is poly((allyl methacrylate)-random-(sulfobetaine methacrylate)), the zwitterionic repeat units constitute 25-75% by weight of the copolymer, and the copolymer has a molecular weight of about 20,000 to about 100,000 Dalton.

In another aspect, disclosed are cross-linked copolymer network, comprising the copolymer disclosed herein.

In yet another aspect, disclosed are thin film composite membranes, comprising a porous substrate, and a selective layer comprising the cross-linked copolymer network disclosed herein, wherein the average effective pore size of the porous substrate is larger than the average effective pore size of the selective layer, and the selective layer is disposed on top of the porous substrate.

In certain embodiments, the selective layer has an average effective pore size of about 0.1 nm to about 2.0 nm. In certain embodiments, the selective layer has an average effective pore size of about 0.1 nm to about 1.2 nm. In certain embodiments, the selective layer has an average effective pore size of about 0.5 nm to about 1.0 nm.

In certain embodiments, the selective layer has a thickness of about 10 nm to about 10 um. In certain embodiments, the selective layer has a thickness of about 100 nm to about 2 um.

In certain embodiments, the thin film composite membrane rejects charged solutes and salts. In certain embodiments, the selective layer exhibits sulfonate ($SO_4^{2-}$) rejection of greater than >99%.

In certain embodiments, the selective layer exhibits sulfonate ($SO_4^{2-}$)/chloride ($Cl^-$) separation factor of greater than >50. In certain embodiments, the selective layer exhibits sulfonate ($SO_4^{2-}$)/chloride ($Cl^-$) separation factor of about 75. Separation factor is defined as flux of $Cl^-$ divided by flux of $SO_4^{2-}$.

In certain embodiments, the thin film composite rejects salts of anions of the same charge to different extents, enabling their separation or enrichment by a filtration process. For instance, the membrane exhibits different rejections for NaF, NaCl, NaBr, NaI, NaClO$_4$, NaNO$_3$, etc. to different extents under the same testing conditions. In a similar vein, if a mixture of two of more such salts are filtered through this thin film composite membrane, the ratio of the corresponding anions is significantly different in the feed and the permeate.

In certain embodiments, the selective layer exhibits fluoride ($F^-$)/chloride ($Cl^-$) separation factor greater than 5. In certain embodiments, the selective layer exhibits $F^-/Cl^-$ separation factor of about 8. Separation factor is defined as flux of $Cl^-$ divided by flux of $F^-$.

In certain embodiments, the selective layer rejects neutral solutes (e.g., sugars) to different extents based on their size, enabling fractionation.

In certain embodiments, the selective layer exhibits selectivity between monosaccharides (e.g. glucose, xylose) and disaccharides (e.g. sucrose), enabling their separation. In certain embodiments, the selective layer exhibits a glucose/sucrose separation factor greater than 10, and a xylose/sucrose separation factor greater than 15.

In certain embodiments, the selective layer exhibits resistance to fouling by an oil emulsion.

In certain embodiments, the selective layer is stable upon exposure to chlorine bleach (e.g., at pH 4).

In certain embodiments, the selective layer exhibits size-based selectivity between uncharged organic molecules. In certain embodiments, the selective layer exhibits rejection of >99% for neutral molecule with hydrated diameter of about or greater than 1 nm.

EXAMPLES

In order that the invention described herein may be more fully understood, the following examples are set forth. The examples described in this application are offered to illustrate the compounds, compositions, materials, device, and methods provided herein and are not to be construed in any way as limiting their scope.

Example 1. Synthesis of Cross-Linkable Random Zwitterionic Amphiphilic Copolymers (r-ZACs)

Example 1A: Synthesis of Poly(Allyl Methacrylate-Random-Sulfobetaine Methacrylate), P(AMA-r-SBMA)

In this example, the synthesis of P(AMA-r-SBMA) was performed by Atom ReGEnration Transfer Atom Transfer Radical Polymerization (ARGET-ATRP). We first added sulfobetaine methacrylate (SBMA, 12.40 g), allyl methacrylate (AMA, 18.4 g), ethyl α-bromoisobutyrate (EBIB; 70.4 μL), methanol (124 mL), and acetonitrile (124 mL solvent) to a 500 mL round bottom (RB) flask. The flask was then sealed with a rubber septum and purged with nitrogen for 30 minutes. In a separate container, we dissolved copper (II) bromide (0.0211 g), ascorbic acid (0.170 g), and N,N,N', N'',N''-Pentamethyldiethylenetriamine (PMDETA; 200 μL) in a mixture of methanol (25.0 mL) and acetonitrile (25.1 mL). A small portion (8.01 g) of this catalyst solution was then added to a 25 mL RB flask, sealed with a rubber septum, and purged with nitrogen for 15 minutes.

To initiate ARGET-ATRP, we discharged the contents of the 25 mL RB flask into the 500 mL RB flask using a canula and pressurized nitrogen. The reaction was carried out for 20 hours at room temperature and under stirring. Little to no gelling occurred, indicating that the ally groups were preserved during the reaction. To terminate, the solution was exposed to oxygen by removing the rubber septum from the 500 mL flask. The solution was then concentrated using a rotary evaporator (no measurements were made, but it is estimated the solution was concentrated by a factor of approximately 3-4). The copolymer was precipitated by slowly pouring the solution into 700 mL of a mixture of hexane and ethanol (5:3 volume ratio). The copolymer was left overnight, and then washed multiple times in pure hexane. The powder product was collected with a separatory funnel and filter paper, and then dried under vacuum at 35° C. for 3 days. The collected product weighed 4.45 g, indicating a yield of 14.4%. Peak integration confirmed that all allyl groups were preserved.

A wider composition range for cross-linkable r-ZACs was explored, now from 47-81 wt % zwitterion. These membranes have higher permeance than the previous cross-linked r-ZAC membranes. Their permeance and selectivity suggests then could be used in OF applications. They are very fouling resistant. They could also potentially filter small organic molecules (e.g. micropollutants).

TABLE 1

Summary of composition range for P(AMA-r-SBMA) copolymers.

| Copolymer | wt % ZI in monomer solution | wt % ZI in product ($^1$H-NMR) |
|---|---|---|
| P-40 | 40 | 47 |
| P-60 | 60 | 72.4 |
| P-70 | 70 | 81.2 |

P-40. This was described above.

P-60. 4.1 g SBMA, 6.0 g AMA, and 19.5 µL of ethyl α-bromoisobutyrate was dissolved in 75 mL of 50:50 methanol:acetonitrile. After purging the mixture with nitrogen, ARGET-ATRP was initiated by adding 5.3 µmol CuBr₂, 53 µmol ascorbic acid, and 53 µmol N,N,N',N'',N''-pentamethyldiethylenetriamine (PMDETA) dissolved in 3.4 g 50:50 methanol:acetonitrile. The reaction was conducted for 20 hours at 30-50° C. and terminated by exposure to air. The copolymer was precipitated and washed prior to drying under vacuum at room temperature.

P-70. 14 g SBMA, 6.0 g AMA, and 35.8 µL of ethyl α-bromoisobutyrate was dissolved in 150 mL of 50:50 methanol:acetonitrile. After purging the mixture with nitrogen, ARGET-ATRP was initiated by adding 9.7 µmol CuBr2, 98 µmol ascorbic acid, and 98 µmol N,N,N',N'',N''-pentamethyldiethylenetriamine (PMDETA) dissolved in 6.3 g 50:50 methanol:acetonitrile. The reaction was conducted for 20 hours at 30-50° C. and terminated by exposure to air. The copolymer was precipitated and washed prior to drying under vacuum at room temperature.

Water Uptake Vs. Zwitterion Content for P-40, P-60, and P-70

Copolymer films of ~300 µm thickness were prepared by drop casting copolymer/trifluoroethanol solutions onto polymeric substrates (oftentimes Teflon, polyethylene, or polypropylene). The solvent was allowed to aerially dry. The copolymer films were then equilibrated with a 3 wt % solution of 2-hydroxy-2-methyl propiophenone/isopropanol for 6-18 hours prior to shining UV light for 20 minutes. The films were then washed in isopropyl alcohol and equilibrated with distilled water overnight. To measure water uptake ($w_{up}$), the water-swollen copolymer films was removed, dried the outside with a Kim wipe, and then measured the water-swollen mass ($m_{wet}$). The films was allowed to aerially dry for several hours prior to measuring the dry mass ($m_{dry}$). The equation $w_{up}=100\%*(m_{wet}-m_{dry})/m_{dry}$ was used. See FIG. 30.

The result shows that varying the zwitterion content enables facile tuning of the physical properties of cross-linkable r-ZACs. From a physical standpoint, higher water uptake is indicative of larger pores.

Fouling Resistance of Cross-Linked r-ZAC Membranes of Different Zwitterion Composition.

Membrane prepared by coating a 3 wt % solution of P(AMA-r-SBMA) onto a porous support (PS35). Convective air flow was then used to quickly dry the solvent, leaving behind the dense selective layer. P-60 and P-70 membranes were stored in isopropyl alcohol prior to cross-linking to prevent dissolution in water. Cross-linking was performed by equilibrating with 3 w/v % 2-hydroxy-2-methyl propiophenone/isopropanol solution for >20 minutes and then shining UV light for 20 minutes. The solution was bovine serum albumin (BSA)/CaCl₂) (1,000 ppm/10 mM). The initial flux was 10 L m$^{-2}$ hr$^{-1}$. The NP030 is a commercial NF control. See FIG. 31.

This shows high zwitterion content cross-linked r-ZAC membranes are highly fouling resistant.

Permeance Vs. Zwitterion Content for Cross-Linked r-ZAC Membranes.

Water flux vs. time was tracked at a known pressure to calculate permeance. Membrane prepared by coating a 3 wt % solution of P(AMA-r-SBMA) onto a porous support (PS35). Convective air flow was then used to quickly dry the solvent, leaving behind the dense selective layer. P-60 and P-70 membranes were stored in isopropyl alcohol prior to cross-linking to prevent dissolution in water. Cross-linking was performed by equilibrating with 3 w/v % 2-hydroxy-2-methyl propiophenone/isopropanol solution for >20 minutes and then shining UV light for 20 minutes. See FIG. 32.

The permeance of cross-linkable r-ZAC membranes can be greatly enhanced by increasing zwitterion content.

Rejection of Neutral Organics Vs. Stokes Diameter for Cross-Linked r-ZAC Membranes.

Membranes operated at 6-7 L m$^{-2}$ hr$^{-1}$ flux. The solutes filtered by each membrane in order of increasing size were as follows. P-40X: glycerol, xylose, glucose, and sucrose; P-60X: glucose, sucrose, raffinose, a-cyclodextrin, and vitamin B12; P-70X: glucose, sucrose, raffinose, a-cyclodextrin, and vitamin B12. Membrane prepared by coating a 3 wt % solution of P(AMA-r-SBMA) onto a porous support (PS35). Convective air flow was then used to quickly dry the solvent, leaving behind the dense selective layer. P-60 and P-70 membranes were stored in isopropyl alcohol prior to cross-linking to prevent dissolution in water. Cross-linking was performed by equilibrating with 3 w/v % 2-hydroxy-2-methyl propiophenone/isopropanol solution for >20 minutes and then shining UV light for 20 minutes. See FIG. 33.

In addition to permeance, the effective pore size can be tuned by varying zwitterionic content. The membranes also show good selectivity towards different organics.

Tuning of Water Permeance Using Different Salt Solutions.

Permeance measured while filtering different salt solutions for several hours in stirred stainless steel cells Membrane prepared by coating a 3 wt % solution of P(AMA-r-SBMA) onto a porous support (PS35). Convective air flow was then used to quickly dry the solvent, leaving behind the dense selective layer. P-60 and P-70 membranes were stored in isopropyl alcohol prior to cross-linking to prevent dissolution in water. Cross-linking was performed by equilibrating with 3 w/v % 2-hydroxy-2-methyl propiophenone/isopropanol solution for >20 minutes and then shining UV light for 20 minutes. See FIG. 34.

Permeance can be tuned by filtering salt solutions of varying salinity with P-60X and P-70X membranes. This is unlike previous r-ZAC membranes or cross-linked r-ZAC membranes, and due to the high IT content.

Example 1B: Synthesis of poly(allyl methacrylate-random-methacryloxy phosphorylcholine), P(AMA-r-MPC)

In this example, the synthesis of P(AMA-r-MPC) was performed by ARGET-ATRP. We first added MPC (8.00 g), AMA (12.0 g). EBIB (44.8 µL), and methanol (150.6 mL) to a 250 mL RB flask. The flask was then sealed with a rubber septum and purged with nitrogen for 25 minutes. In a separate container, we dissolved copper (II) bromide (0.0229 g), ascorbic acid (0.182 g), and PMDETA (215 µL) in methanol (100 mL). A small portion (9.38 g) of this catalyst solution was then added to a 25 mL RB flask, sealed with a rubber septum, and purged with nitrogen for 15 minutes.

To initiate ARGET-ATRP, we discharged the contents of the 25 mL RB flask into the 250 mL RB flask using a canula and pressurized nitrogen. The reaction was carried out for 24 hours at room temperature and under stirring. Little to no gelling occurred, indicating that the allyl groups were preserved during the reaction. To terminate, the solution was exposed to oxygen by removing the rubber septum from the 500 mL flask. The copolymer was precipitated by slowly pouring the solution into 1600 mL of a mixture of hexane and isopropyl alcohol (5:3 volume ratio). The copolymer was then dissolved 150 mL of methanol and reprecipitated into a fresh 1600 mL of a mixture of hexane and isopropyl alcohol (5:3 volume ratio). The copolymer pieces and washed in pure hexane for 4 hours under stirring. The copolymer was then collected with filter paper and dried under vacuum at room temperature for 20 hours. The collected product weighed 6.35 g, which represented a yield of 31.8%. Peak integration confirmed that all allyl groups were preserved.

Example 1C: Synthesis of poly(allyl methacrylate-random-trifluoroethyl methacrylate-random-methacryloxy phosphorylcholine), P(AMA-r-TFEMA-r-MPC)

In this example, the synthesis of P(AMA-r-TFEMA-r-MPC) was performed by ARGET-ATRP. We first added MPC (11.8 g), AMA (11.0 g), 2,2,2-trifluoroethyl methacrylate (TFEMA, 11.1 g), EBIB (70.6 µL), and methanol (260 mL) to a 500 mL RB flask. The flask was then sealed with a rubber septum and purged with nitrogen for 25 minutes. In a separate container, we dissolved copper (II) bromide (0.0212 g), ascorbic acid (0.170 g), and PMDETA (200.4 µL) in methanol 50 mL). A small portion of this catalyst solution (7.92 g) was then added to a 25 mL RB flask, sealed with a rubber septum, and purged with nitrogen for 15 minutes.

To initiate ARGET-ATRP, we discharged the contents of the 25 mL RB flask into the 500 mL RB flask using a canula and pressurized nitrogen. The reaction was carried out for 20 hours at room temperature and under stirring. Little to no gelling occurred, indicating that the allyl groups were preserved during the reaction. To terminate, the solution was exposed to oxygen by removing the rubber septum from the 500 mL flask. The copolymer was precipitated by slowly pouring the solution into 2800 mL of a mixture of hexane and isopropyl alcohol (1:1 volume ratio). The copolymer was then dissolved 500 mL of ethanol and reprecipitated into a fresh 3600 mL of fresh hexane. The copolymer was then purified by multiple 24 hours hexane washes, collected with filter paper, and dried under vacuum at room temperature for 3 days. The collected product weighed 8.22 g, which represented a yield of 24.2%. Peak integration confirmed that all allyl groups were preserved.

Example 2. Formation of Thin Film Composite (TFC) Membranes from Cross-Linkable Zwitterionic Amphiphilic Copolymers (ZACs)

Example 2A: Formation of TFC Membranes from P(AMA-r-SBMA)

In this example, membranes were prepared using the polymer described in Example 1A. The copolymer was first dissolved in trifluoroethanol (TFE) at 3-10 w/v %. After degassing, we cast the solution onto a PS ultrafiltration support membrane (PS35; Nanostone) using a wire-wound coating rod (wire size 10; Gardco). We then precipitated the copolymer onto the support membrane using one of the following four precipitation techniques: (1) Plunging the coated membrane into a non-solvent bath of isopropyl alcohol; (2) Leaving the coated membrane untouched in a chemical hood for 10-60 minutes to evaporate TFE; (3) Placing the coated membrane in an 80° C. vacuum oven to achieve rapid TFE evaporation; (4) Blowing hot air across the coated membrane surface for 30 seconds with a heat gun to achieve rapid TFE evaporation. For all precipitation techniques, the membrane was stored in DI water prior to further testing.

Figure 1:
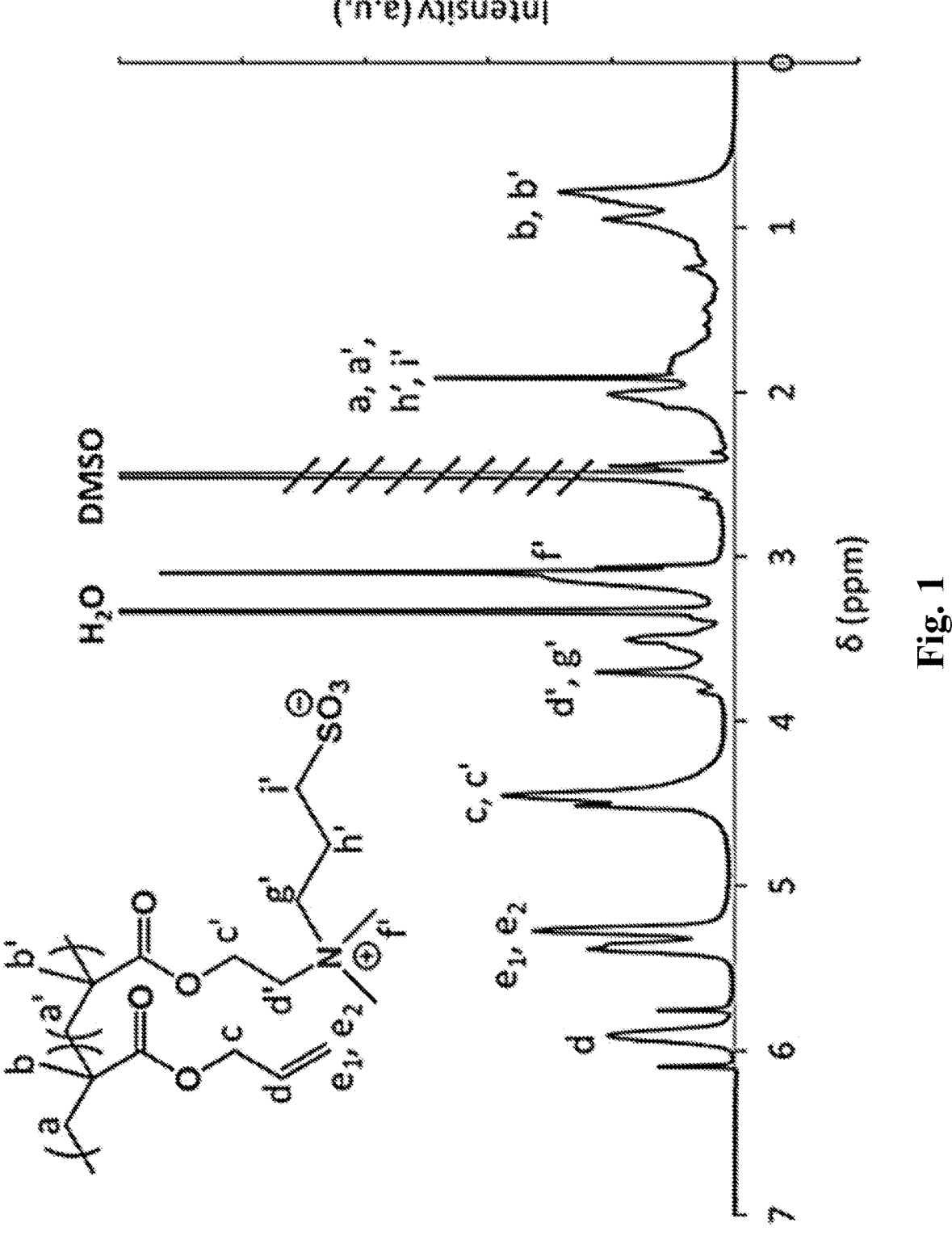
FIG. 1 is a $^1$H-NMR spectrum of P(AMA-r-SBMA), indicating successful copolymerization. The presence of broad peaks at the d, $e_1$, and $e_2$ positions indicates that the copolymer has abundant allyl groups.
Figure 2:
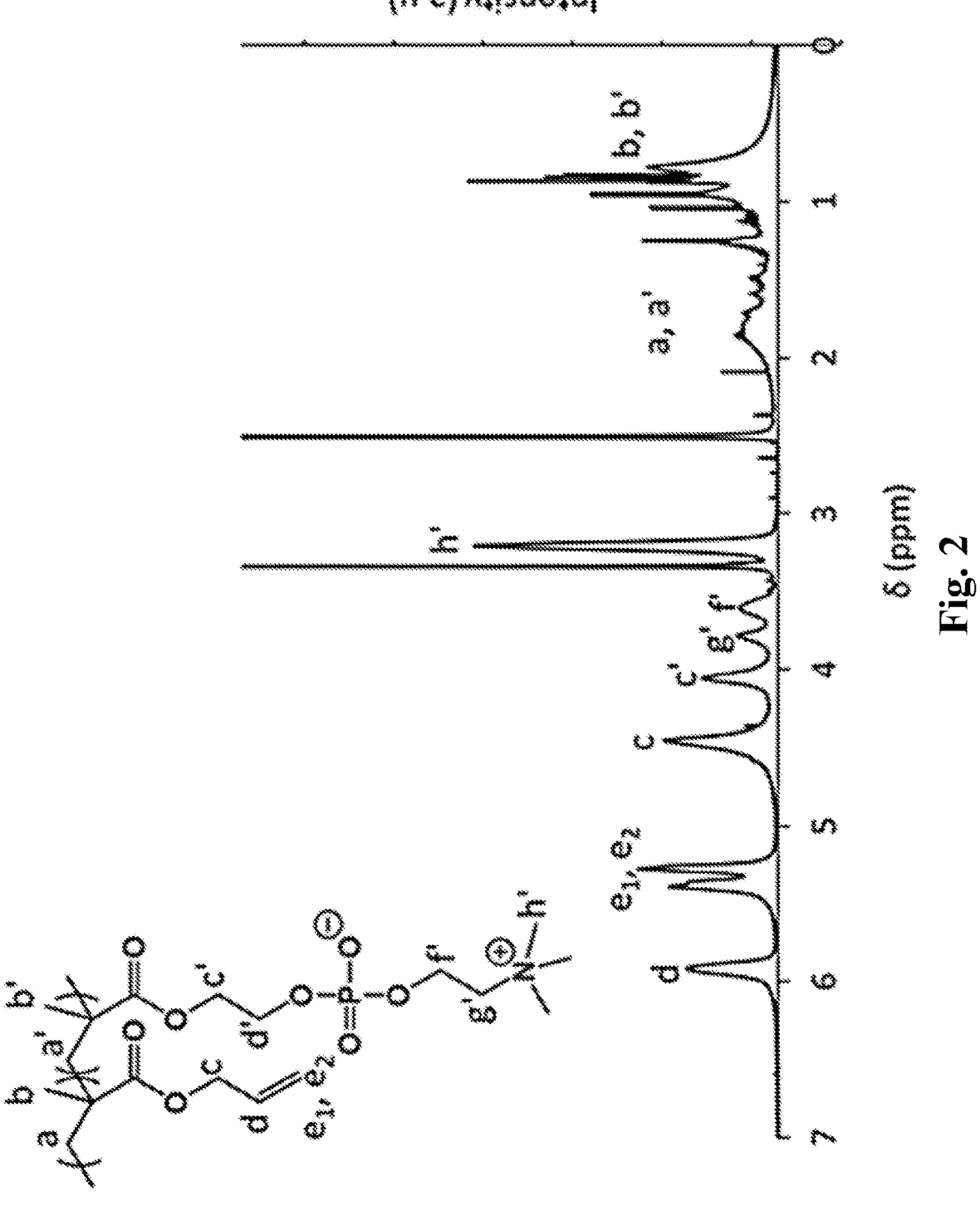
FIG. 2 is a $^1$H-NMR spectrum of P(AMA-r-MPC), indicating successful copolymerization. The presence of broad peaks at the d, $e_1$, and $e_2$ positions indicates that the copolymer has abundant allyl groups.
Figure 3A:
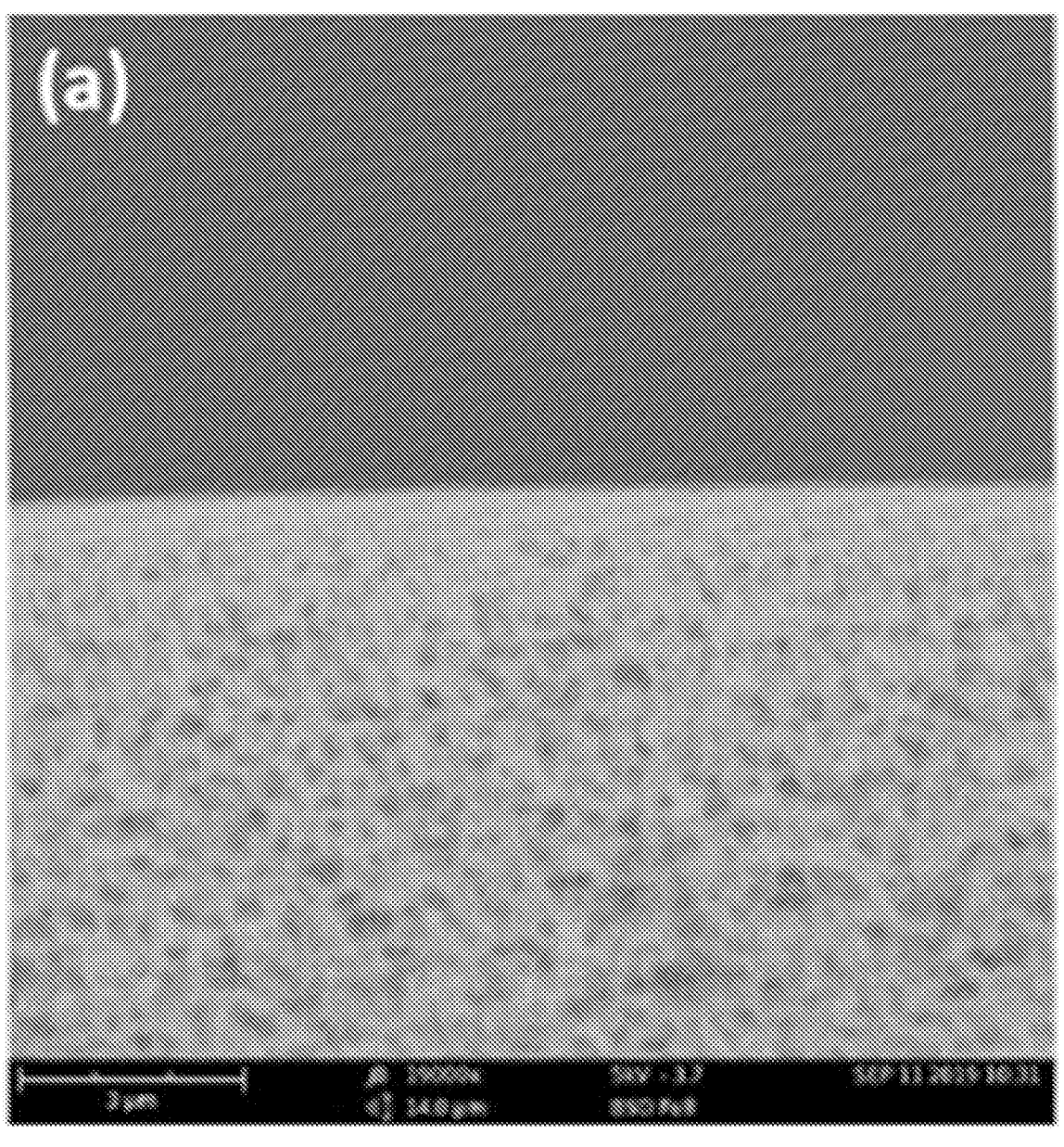
FIG. 3A is a SEM cross-sectional image of the support membrane. Scale bar is 3 μm.
Figure 3B:
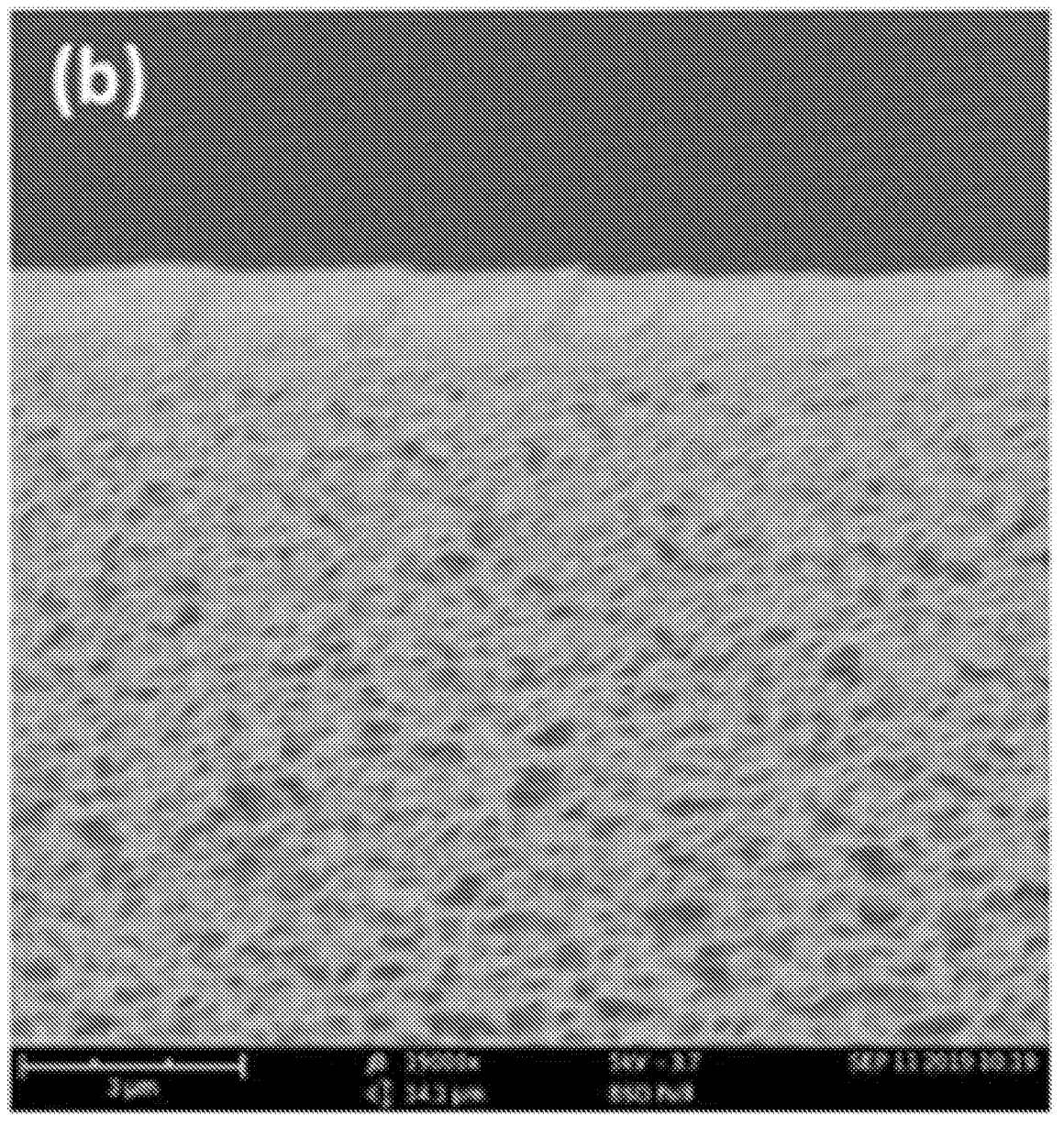
FIG. 3B is a SEM cross-sectional image of one of the TFC membranes prepared using first precipitation technique described in Example 2A. Scale bar is 3 μm.

Scanning electron microscopy (SEM) was used to collect cross-sectional images of the resultant TFC membranes. Images were collected using a Phenom G2 pure tabletop SEM at a 5 kV setting. Samples were prepared by freeze fracturing in liquid nitrogen, and sputter coated with Au/Pd alloy to prevent charging and beam damage. FIG. 3(a) shows a cross-sectional micrograph of the support membrane, and FIG. 3(b) shows that of a TFC membrane prepared by the first precipitation technique described in Example 2A, where an isopropanol bath was used to precipitate the copolymer after coating. The selective layer is observed to be a non-porous and ~1 µm in thickness.

Example 2B: Formation of TFC Membranes from P(AMA-r-MPC) Containing Photoinitiator In this example, membranes were prepared using the polymer described in Example 1B, blended with a photoinitiator that will later be used for cross-linking. The copolymer was first dissolved in methanol at 10 w/v %. We then added a photo-initiator (2-hydroxymethyl propiophenone. HOMP) at a ratio of 1 g photo-initiator/10 g copolymer. This was done to cross-link the TFC immediately after fabrication (see Example 3B for the description). After degassing, we coated the solution onto a PES ultrafiltration support membrane (UE50; Trisep) using a wire-wound rod (wire size 10; Gardco). We then left the coated membrane untouched for 10-15 minutes to evaporate the methanol and thereby precipitate the copolymer onto the support membrane. The membranes were then either stored in DI water or cross-linked as will be described in Example 3B.

Figure 4A:
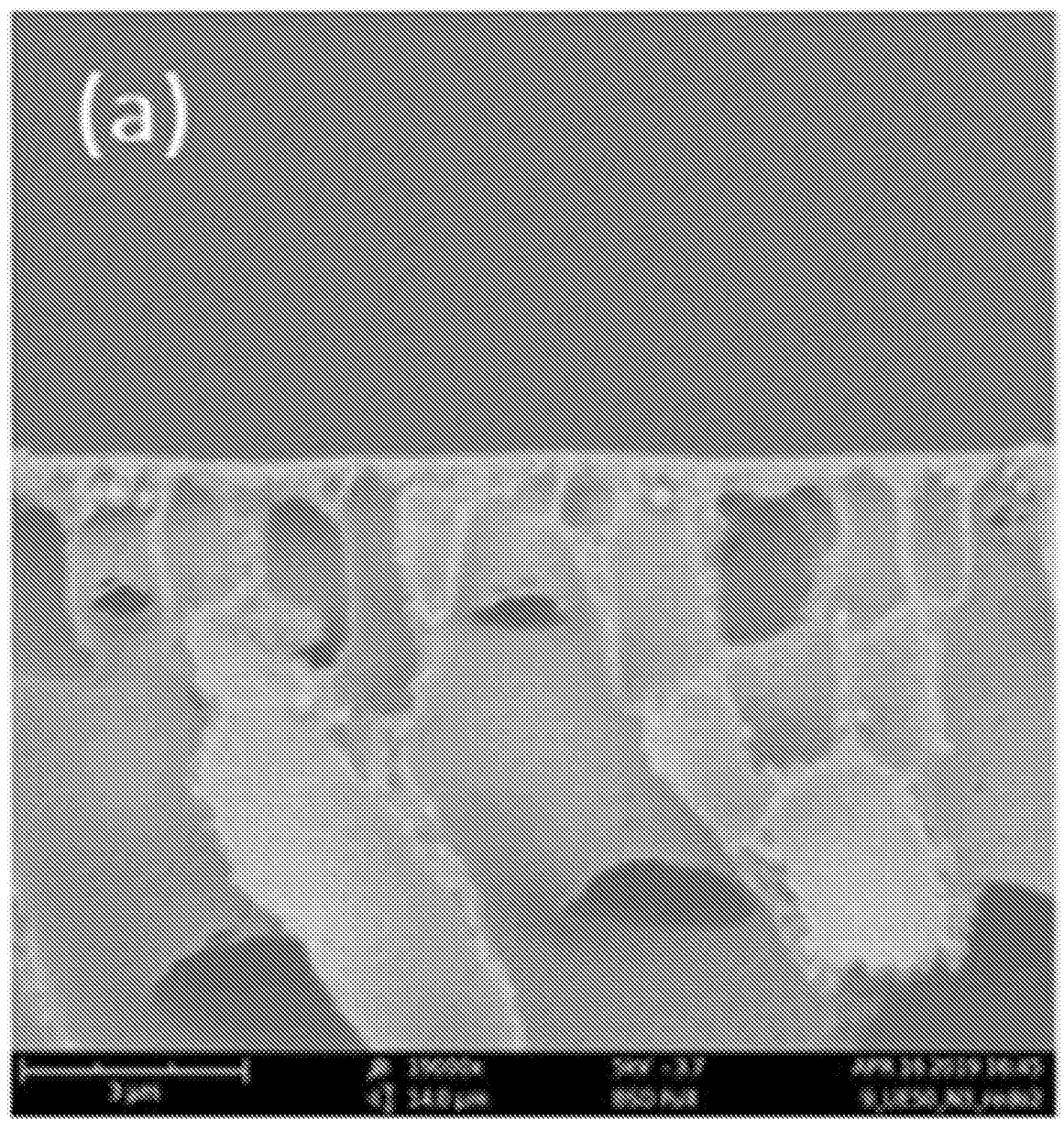
FIG. 4A is a SEM cross-sectional image of the support membrane. Scale bar is 3 μm.
Figure 4B:
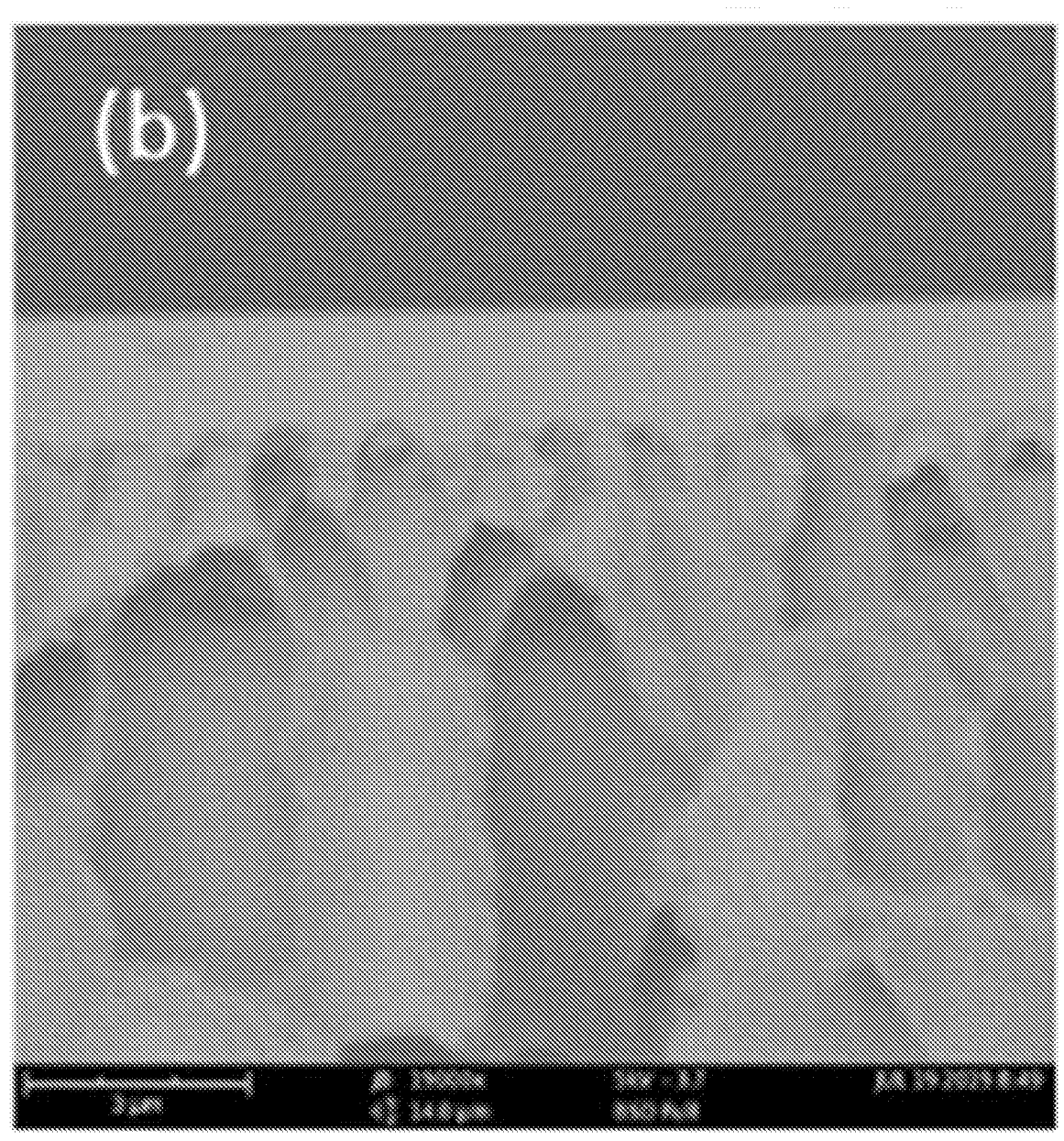
FIG. 4B is a SEM cross-sectional image of one of the TFCs prepared by the method described in Example 2B.

Scanning electron microscopy (SEM) was used to collect cross-sectional images of the resultant TFC membranes using methods similar to those described in Example 2A. FIG. 4(a) shows the support membrane, and FIG. 4(b) shows a TFC prepared as described in this example. The selective layer is observed to be a non-porous and ~2 µm in thickness.

Example 2C: Formation of TFC Membranes from P(AMA-r-TFEMA-r-SBMA)

In this example, membranes were prepared using the polymer described in Example 1C. The copolymer was first dissolved in either TFE or methanol at 10 w/v %. After degassing, we cast the solution onto a PS ultrafiltration support membrane (PS35; Nanostone) using a wire wound rod (wire size 10; Gardco). We then placed the coated membrane in an 80° C. vacuum oven to rapidly evaporate the solvent and thereby precipitate the copolymer onto the support membrane. The membrane was stored in DI water prior to further testing.

Example 3. Various Methods for Cross-Linking the Copolymer

Example 3A: Cross-Linking of P(AMA-r-SBMA) Membranes or Copolymer

The following six cross-linking methods were developed to cross-link the allyl groups. Methods 1-5 were used to cross-link the selective layer of membranes prepared as described in Example 2A, and Method 6 was used to cross-link the copolymer described in Example 1A.

Method 1: Photo-Initiated Radical Cross-Linking in the Presence of a Selective Solvent—1

A membrane disk (4.3 cm diameter) cut from a membrane sheet was first soaked in a solution of photo-initiator (HOMP) in isopropyl alcohol at a concentration ranging from 0.3-4 wt % for 20 minutes. The membrane disk was then pressed flat onto a glass plate (8 cm*8 cm*0.5 cm), with the membrane top facing up and the membrane bottom in contact with the glass plate. An additional 8 mL of photo-initiator solution in isopropyl alcohol was then added to cover the membrane and plate, held together by surface tension. A second glass plate of the same size was then pressed down, thereby sealing the membrane between two glass plates. A thin liquid film remained between the membrane top and second glass plate. The membrane and glass plates were then placed inside of a UV light curing chamber (365 nm, 9 W/bulb, four bulbs) with the membrane top facing the incoming UV light. The membrane was then cured for 5-30 minutes. The membrane was removed from the UV chamber, rinsed with isopropanol and stored in deionized (DI) water until later use.

Method 2: Photo-Initiated Radical Cross-Linking in the Presence of a Selective Solvent—2

A membrane disk (4.3 cm diameter) cut from a membrane sheet was first soaked in pure isopropyl alcohol for 20 minutes. The membrane was then pressed flat onto a glass plate (8 cm*8 cm*0.5 cm), with the membrane top facing up and the membrane bottom in contact with the glass plate. A custom-made Teflon washer (outer diameter 4.3 cm, inner diameter 4.2 cm, height 0.5 cm) was then placed on top of the membrane, thereby covering the outer edge of the membrane. This configuration left an empty space between the top of the membrane and the inner face of the Teflon washer with a volume equal to 7.3 mL. This empty space was then filled with slightly more than 7.3 mL of photo-initiator (HOMP) in isopropyl alcohol (concentration ranging from 1-14 wt %). This was the first time that the membrane was contacted with photo-initiator/isopropyl alcohol solution, with the intention being to cross-link only the very top of the membrane selective layer. A second glass plate was then placed on top of the washer, thereby sealing the 7.3 mL of HOMP/isopropyl alcohol from the outside air. The membrane, Teflon washer, and glass plates were then placed beneath a UV light curing lamp (365 nm, 9 W/bulb, one bulb) with the membrane top facing the incoming UV light. The membrane was then cured for 6-60 minutes. The membrane was removed from the UV chamber, rinsed with isopropanol and stored in DI water until later use.

Method 3: Thermally Initiated Radical Cross-Linking

A membrane disk (4.3 cm diameter) cut from a membrane sheet was first soaked in a solution of azobisisobutyronitrile (AIBN)/isopropyl alcohol (0.01 g/80 mL) inside of a sealed container. The temperature was increased to 70° C. overnight. The membrane was stored in DI water prior to further testing.

Method 4: Redox Initiated Radical Cross-Linking

A membrane disk (4.3 cm diameter) cut from a membrane sheet was first loaded into a stainless steel filtration cell (Sterlitech HP 4750). It should be noted that the stainless steel cell was used as a convenient reaction vessel only, and that the system was not pressurized. Next, 75 g of an aqueous solution of tetramethylethylenediamine (TEMED; 3.9 wt %) was added to the stainless steel cell. The cell was then purged with nitrogen for 2 minutes. The cell was then briefly opened to quickly add 75 g of an aqueous solution of ammonium persulfate (APS; 3.9 wt %). Mixing occurred upon addition of the APS solution. The stainless steel cell was then quickly closed and flushed with $N_2$ for an additional 2 minutes. The redox initiated radial cross-linking reaction was carried out for 16 minutes. The TEMED/APS solution was then emptied, and the membrane rinsed with DI water prior to further testing.

Method 5: Thermally Initiated Radical Cross-Linking of Selective Layers Containing Initiator The copolymer described in Example 1A was first dissolved in trifluoroethanol (TFE) at 0.05 g copolymer/mL TFE. Next, AIBN was added to the copolymer solution (100 g polymer/1 g AIBN). After degassing, a wire wound rod (wire size 10; Ganico) was used to coat the copolymer solution onto a PS ultrafiltration support membrane (Nanostone PS35). After coating, the copolymer was precipitated onto the support membrane by placing the coated membrane in an 80° C. vacuum oven to rapidly evaporate the solvent. of TFE. The elevated temperatures in the oven also initiated radical polymerization to cross-link the hydrophobic domain using this method. The membrane was stored in DI water prior to further testing.

Method 6: Thermal Cross-Linking without an Added Initiator

Figure 5:
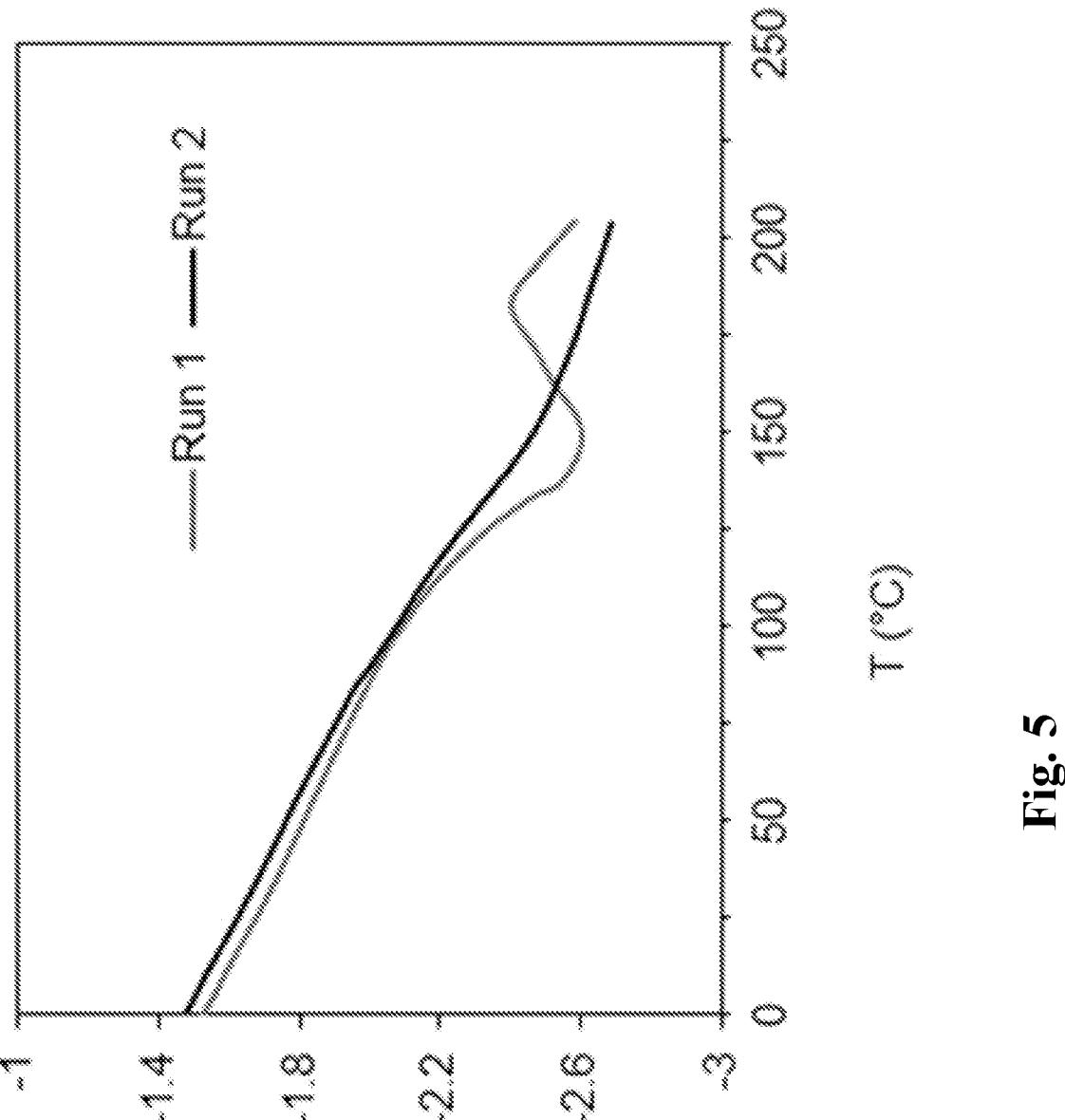
FIG. 5 is a DSC thermogram of the copolymer described in Example 1A. The exothermic peak centered at 186° C. signifies that the copolymer was thermally cross-linked.

The copolymer described in Example 1A was placed in an aluminum differential scanning calorimetry (DSC) pan and heated from ~80° C. to 210° C. by a linear ramp of 20° C./min. Two such heating cycles in total were performed. The DSC thermogram (FIG. 5) shows an exothermic peak centered around 186° C. for the first ramp (Run 1), but not the second ramp (Run 2). This exothermic event was attributed to the thermal cross-linking of the allyl domain. The copolymer was soluble in TFE before this experiment, but insoluble in TFE afterwards, which confirms that cross-linking occurred. This procedure could be adapted for TFC membranes by heating the membrane selective layer to temperatures high enough to commence thermal cross-linking.

Example 3B. Cross-Linking of P(AMA-r-MPC) Membranes Cast with Photoinitiator

The following cross-linking method was developed to cross-link membrane selective layers containing P(AMA-r-MPC) blended with HOMP as a photoinitiator, prepared as described in Example 2B. As mentioned in that example, we added a photoinitiator to the casting solution so that the photoinitiator was still present in the selective layer after the formation of the TFC membrane. Immediately after the TFC membrane was formed, we cut a membrane disk (4.3 cm diameter) from the membrane sheet and placed the disc under a handheld UV light curing lamp (365 nm, 9 W/bulb, one bulb) with the membrane top facing the incoming UV light. The membrane was cured for 15-60 mins and stored in DI water until further use.

Example 4. Changes to Permeance Upon Cross-Linking

In this example, we determined the changes to permeance upon cross-linking. Membranes were prepared as described in Example 2A and cross-linked as described in either Method 1 or Method 2 of Example 3A. Membrane disks (4.3 cm diameter) were tested using stainless steel stirred cells (HP4750; Sterlitech) loaded with DI water. Compressed nitrogen gas was used to pressurize the cell (250-400 psi).

Figure 6B:
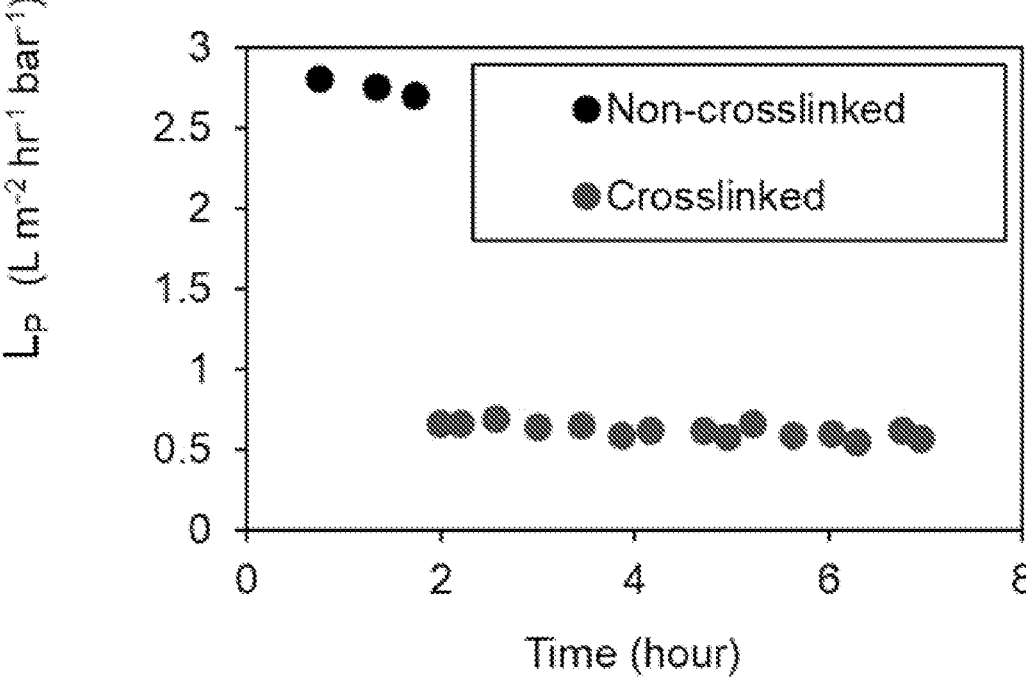
FIG. 6B is a graph that depicts permeance versus time for a membrane prepared as described in Example 3A and cross-linked as described by Method 2.
Figure 7A:
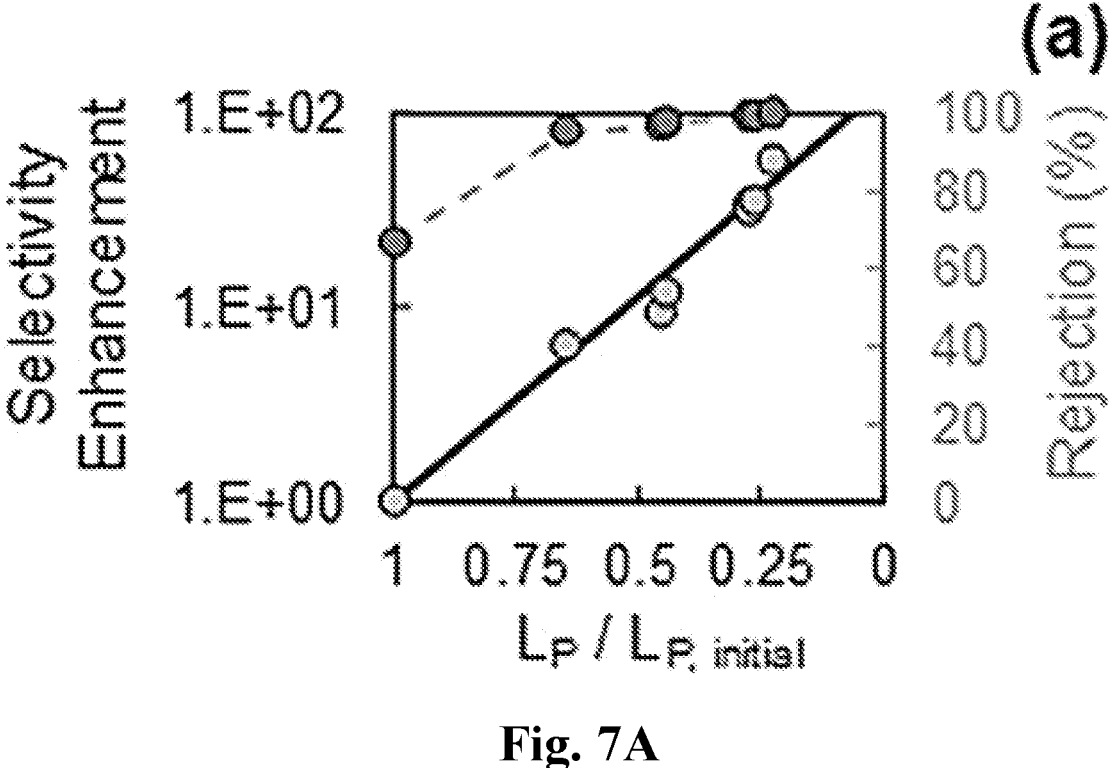
FIG. 7A is a graph depicting selectivity enhancement (left axis) and rejection (right axis) versus permeance/initial permeance for sodium sulfate. The photo-initiator concentration ranged from 0.3-4 wt % and the cure time ranged from 5-20 minutes (see FIG. 6(*a*)). The average initial permeance was 1.5 L m$^{-2}$ hr$^{-1}$ bar$^{-1}$.
Figure 7B:
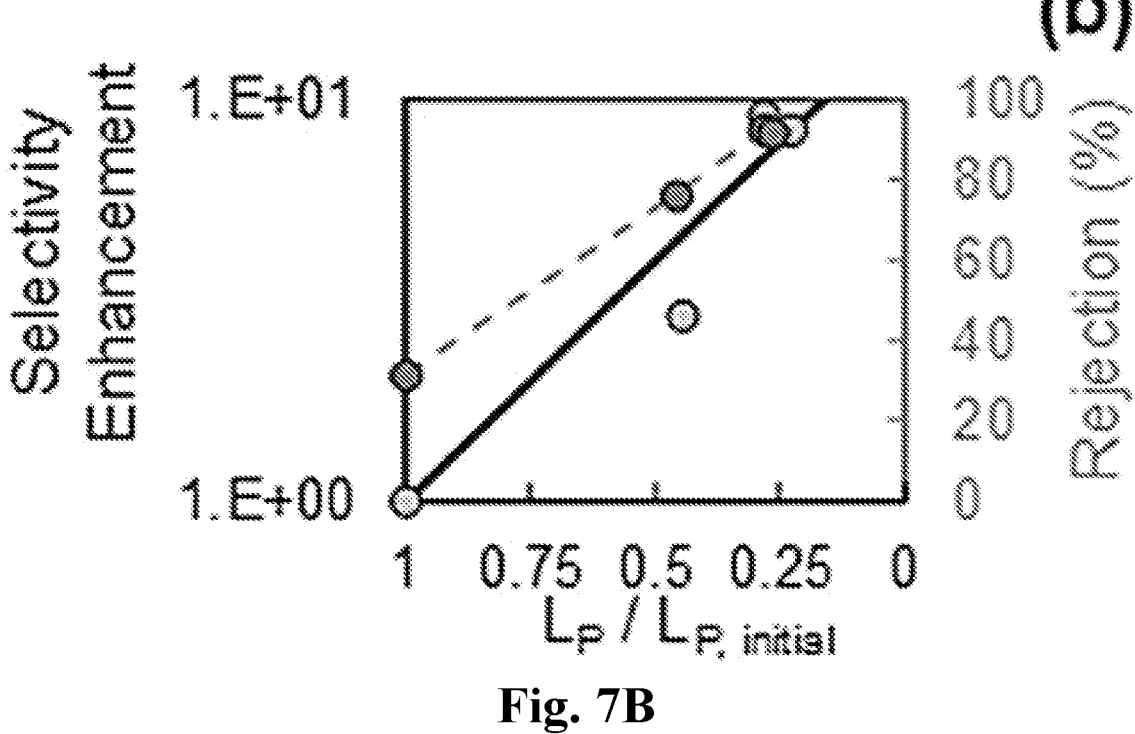
FIG. 7B is a graph depicting selectivity enhancement (left axis) and rejection (right axis) versus permeance/initial permeance for magnesium chloride. The photo-initiator concentration ranged from 0.3-4 wt % and the cure time ranged from 5-20 minutes (see FIG. 6A). The average initial permeance was 1.5 L m$^{-2}$ hr$^{-1}$ bar$^{-1}$.
Figure 7C:
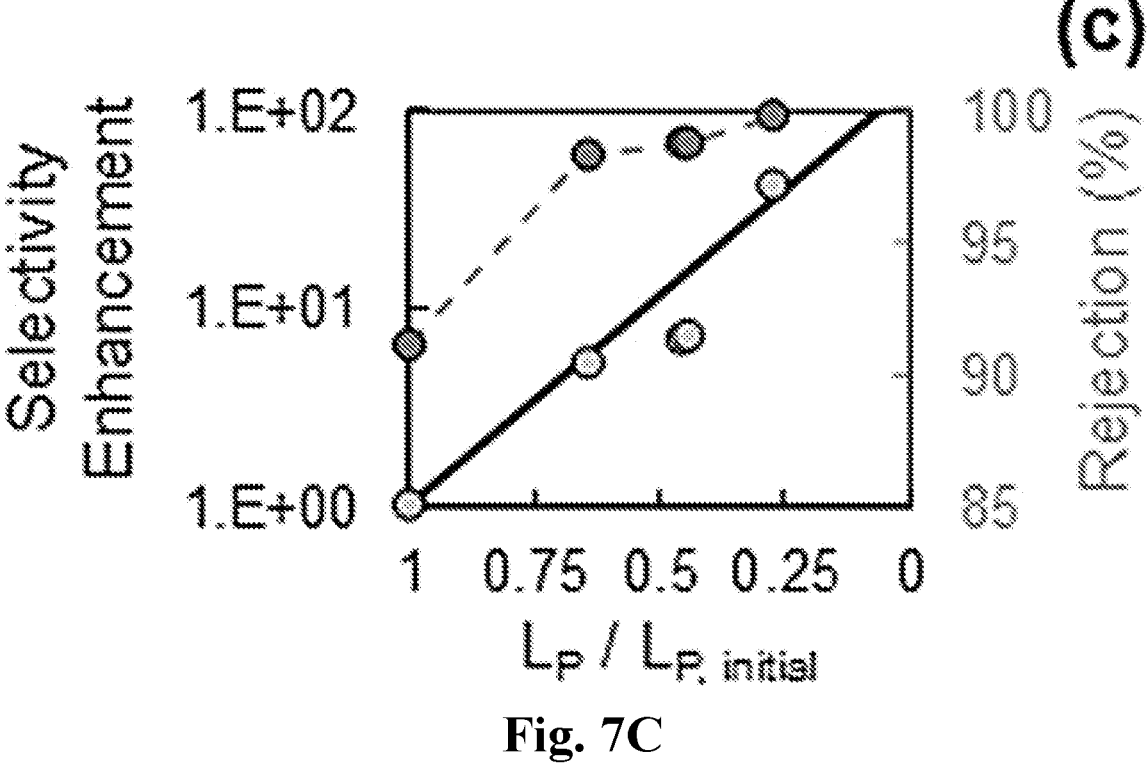
FIG. 7C is a graph depicting selectivity enhancement (left axis) and rejection (right axis) versus permeance/initial permeance for sucrose. The photo-initiator concentration ranged from 0.3-4 wt % and the cure time ranged from 5-20 minutes (see FIG. 6A). The average initial permeance was 1.5 L m$^{-2}$ hr$^{-1}$ bar$^{-1}$.
Figure 7D:
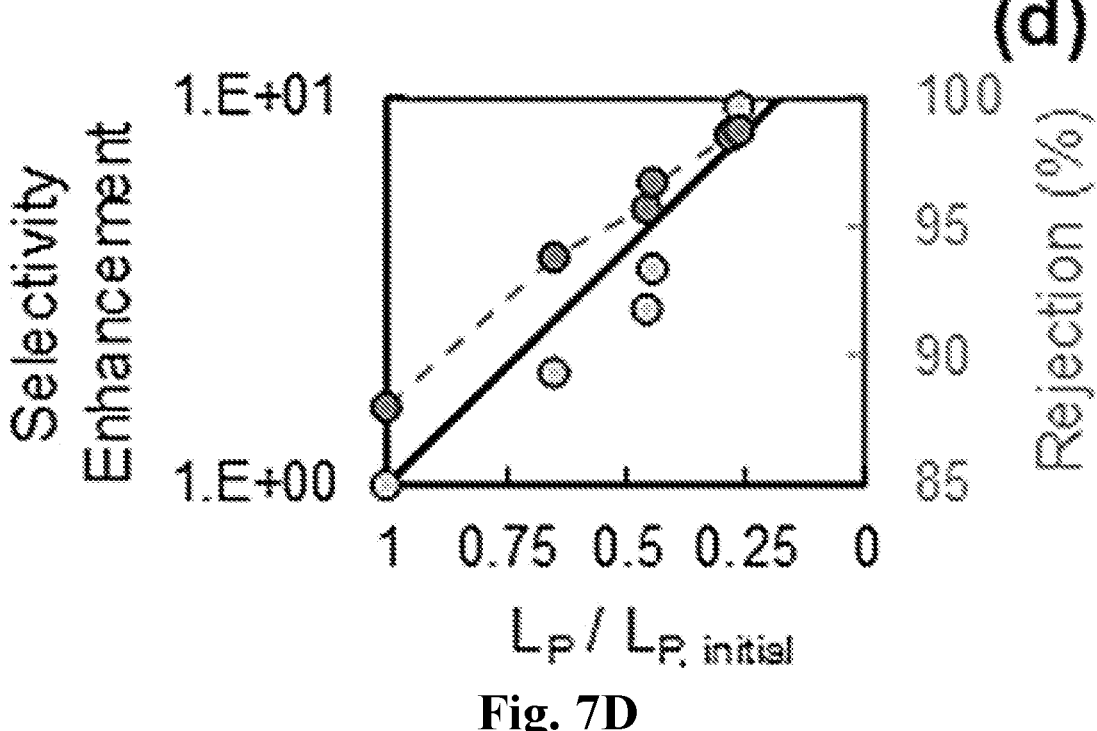
FIG. 7D is a graph depicting selectivity enhancement (left axis) and rejection (right axis) versus permeance/initial permeance for riboflavin. The photo-initiator concentration

Water permeance $L_P$, defined as the volumetric permeate flow rate normalized by the membrane area and the applied pressure difference during the filtration of DI water, was determined by following permeate flow rate versus time and calculating the resultant membrane flux. The average initial permeance was $1.5 \text{ L m}^{-2} \text{ hr}^{-1} \text{ bar}^{-1}$. FIG. 6 shows that the permeance drops significantly upon crosslinking, both using Method 1 (FIG. 6a) and using Method 2 (FIG. 6b). This would be expected for membranes with reduced pore size.

Example 5. Selectivity-Permeance Tradeoff

In this example, the relationship between selectivity and permeance for cross-linked P(AMA-r-SBMA) membranes is explored. Also, the tunability of the separation characteristics of membranes to desired applications is demonstrated. The membranes were prepared as described in Example 2A and cross-linked as described in Method 1 of Example 3A. Membrane disks (4.3 cm diameter) were tested using stainless steel stirred cells (HP 4750; Sterlitech) loaded with 100-125 mL of the feed solution. Pressure (250 psi-400 psi) was applied using compressed nitrogen gas. Concentration polarization was minimized by stirring the cell at 1000 rpm with Teflon stirrers. Permeance was determined by following permeate flow rate versus time and calculating the resultant membrane flux. The average initial permeance was $1.5 \text{ L m}^{-2} \text{ hr}^{-1} \text{ bar}^{-1}$. Solute concentration was measured by either UV visible spectroscopy, conductivity, or chemical oxygen demand (COD). Changes to selectivity were determined by "rejection" and "selectivity enhancement," which are given by the following definitions:

$$\text{Rejection} = 100\% \left( 1 - \frac{C_p}{C_F} \right)$$

$$\text{Selectivity Enhancement} = \frac{C_{P,cross-linked\ membranes}}{C_{P,initial\ membranes}}$$

where $C_P$=permeate concentration and $C_F$=feed concentration. FIG. 7 shows that the rejection increases and that the selectivity enhancement increases exponentially with decreased membrane permeance for sodium sulfate (7a), magnesium chloride (7b), sucrose (7c), and riboflavin (7d). These results indicate that cross-linking leads to reduced effective pore size. The selectivity of the membrane, as evidenced by the rejection of each solute, can be tuned over a reasonably broad range by altering the degree of cross-linking, either by changing the photoinitiator concentration used, and/or by changing the cure time. Decreasing effective pore size (or increasing the rejection of a given solute) is accompanied by a decrease in membrane permeance, as is typical for most membrane systems.

Example 6. Single-Solute Selectivity of Highly Cross-Linked Membranes

In this example, the selectivity of highly cross-linked P(AMA-r-SBMA) membranes for single-solute solutions was evaluated. Membranes were prepared as described in Example 2A and crosslinked as described in Method 2 of Example 3A. Membrane disks were tested as described in Example 5. Table 1 shows the feed concentration and rejection of the various solutes that were tested. A high retention of sugars and sulfate is noted.

TABLE 1

| Rejection of solutes for crosslinked P(AMA-r-SBMA) membranes, measured with feeds containing a single solute. The photo-initiator concentration was 3 w/v % and the cure time was 5 minutes. | | |
|---|---|---|
| Solute | Feed Concentration (mg/L) | Rejection (%) |
| Sucrose | 4000 | 99.0 |
| Glucose | 4000 | 88.7 |
| Glycerine | 2000 | 57.3 |
| NaCl | 2000 | 33.5 |
| CaCl$_2$ | 2000 | 73.3 |
| MgSO$_4$ | 2000 | 98.9 |
| Na$_2$SO4 | 2400 | 98.7 |
| CaSO$_4$ | 2300 | 99.1 |

Example 7. Artificial Seawater Selectivity of Highly Cross-Linked Membranes

In this example, the selectivity of highly cross-linked P(AMA-r-SBMA) membranes for artificial seawater was evaluated. Membranes, which were also described in Example 6, were prepared as described in Example 2A and crosslinked as described in Method 2 of Example 3A. Membrane disks were tested as described in Example 5. Solute concentration was measured using TNTPlus kits (Sulfaver and Water Hardness; Hach) and conductivity measurements. Table 2 shows the feed concentration and rejection of the various solutes that were tested. A high retention of sulfate, moderate retention of calcium, and low retention of monovalent ions is noted.

TABLE 2

| Artificial seawater selectivity for crosslinked P(AMA-r-SBMA) membranes. The photo-initiator concentration was 3 w/v % and the cure time was 5 minutes. | | | |
|---|---|---|---|
| Ion Species | Concentration of Feed (mg/L) | Concentration of Permeate (mg/L) | Rejection (%) |
| Cl | 19,462 | 14,390 | 28 |
| Na | 11,017 | 8,670 | 24 |
| Ca | 2,529 | 589 | 77 |
| SO$_4$ | 2,709 | 29 | 98.9 |

Conductivity Rejection = 36%

Example 8. Fouling Resistance of Cross-Linked P(AMA-r-SBMA) Membranes

In this example, the fouling resistance of highly cross-linked P(AMA-r-SBMA) membranes was evaluated. The membranes were prepared as described in Example 2A and cross-linked as described in Methods 1 and 2 of Example 3A. Membrane disks (4.3 cm diameter) were tested using stainless steel stirred cells (HP 4750; Sterlitech). The permeance in DI water was determined as described in Example 4. Afterwards, the cells were loaded with 300 mL of the foulant solution and pressurized to 250 psi-400 psi using compressed nitrogen gas. Concentration polarization was minimized by stirring the cell at 1000 rpm with Teflon stirrers. Permeance was determined by following permeate flow rate versus time and calculating the resultant membrane flux. After either 12 hours (FIG. 8a) or 24 hours (FIG. 8b), the cells were emptied, briefly rinsed, and permeance was again measured as described in Example 4. Fouling resistance was determined by following normalized flux versus time during the fouling experiment, where normalized flux is defined by $$\text{Normalized flux} = \frac{L_P(t)}{L_{P,DIW}}$$

Where $L_p(t)$ is the permeance at time t and $L_{P,DIW}$ is the permeance of the cross-linked membrane in DI water before the cross-linked membrane was contacted with the fouling solution. The membranes were challenged with organic (FIG. 8a) and protein (FIG. 8b) foulants. In both cases, the membranes demonstrated exceptional fouling resistance by showing no irreversible fouling (defined by a normalized permeance of 1.0 for DI water after the membrane was contacted with the foulant).

Example 9. Organic Solvent Permeance of Crosslinked P(AMA-r-SBMA) Membranes

In this example, the organic solvent permeance of cross-linked P(AMA-r-SBMA) membranes was evaluated. Membranes were prepared as described in Example 2A and crosslinked as described in Method 2 of Example 3A. Membrane disks were tested as described in Example 4, but with organic solvents (methanol and ethanol) instead of DI water. FIG. 9 shows the permeance, which was larger for methanol than ethanol. More polar solvents will be investigated in future studies. The data indicates that the membranes could potentially serve in organic solvent nanofiltration applications.

Example 10. SEM Evidence for P(AMA-r-MPC) Membrane Cross-Linking

In this example, P(AMA-r-MPC) membranes were prepared as described in Example 2B and cross-linked as described in Example 3B. The casting solution was 10 w/v % copolymer in methanol with 1 g HOMP per 10 g copolymer. The cure time was 10-15 minutes. The aim of this experiment was to prove that P(AMA-r-MPC) membranes can be successfully crosslinked using the crosslinking method described in Example 3B.

To do this, it was shown that the P(AMA-r-MPC) selective layer of the TFC membrane becomes insoluble in methanol post-crosslinking. This is proof for crosslinking, because non-crosslinked P(AMA-r-MPC) is soluble in methanol.

We collected SEM images of the support 10(a), un-cross-linked TFC membranes that were not treated with methanol (10b), cross-linked TFC membrane that were cross-linked and not treated with methanol (10c), un-cross-linked TFC membranes that were treated with methanol (10d), cross-linked TFC membrane that were cross-linked and treated with methanol (10e). The images show that the selective layer of the un-cross-linked TFC was dissolved by methanol, whereas the selective layer of the cross-linked TFC was not dissolved by methanol. This is proof that P(AMA-r-MPC) membranes can be successfully cross-linked using the procedure described in Example 3B.

Example 11. Interaction-Based Ion Selectivity Exhibited by Self-Assembled, Cross-Linked Zwitterionic Copolymer Membranes Polymer Synthesis and Membrane Manufacture The cross-linkable r-ZAC, poly(allyl methacrylate-r-sulfobetaine methacrylate) (P(AMA-r-SBMA)) containing 47 wt % SBMA (FIG. 19A), was synthesized using Activators ReGenerated by Electron Transfer Atom Transfer Radical Polymerization (ARGET-ATRP). This copolymer composition was selected as it was expected to microphase separate into a bicontinuous morphology leading to highly permeable yet stable selective layers. The copolymer composition closely matched the monomer ratios in the reaction mixture despite the reaction being stopped at ~10% conversion, implying a roughly random sequence of monomers. Using gel permeation chromatography (GPC), it was determined that the number-averaged molecular weight was $1.8 \times 10^5$ Da with a dispersity of 5.4. This copolymer was rod-coated onto a commercial ultrafiltration membrane support (PS35, Solecta) and dried using a heat gun, resulting in TFC membranes with an ~450 nm-thick selective layer (FIG. 19A). TFC membranes were then soaked in a solution of photo-initiator in isopropyl alcohol, which swells the hydrophobic nanodomain but not the zwitterionic nanochannels. Exposure to UV light for 20 minutes led to the crosslinking of the allyl groups of AMA, reducing the nanochannel diameter to <1.0 nm. The resultant membrane, ZAC-X, exhibited a water permeance of 0.37 L m$^{-2}$ hr$^{-1}$ bar$^{-1}$.

Rejection of Sodium and Chloride Salts.

Water and small solutes permeate r-ZAC TFC membranes through a network of self-assembled zwitterionic nanochannels (FIG. 19B). Unlike previous r-ZAC membranes, however, ZAC-X possesses exceptionally narrow nanochannels (<1.0 nm). Due to confinement, it is expected that permeating ions are forced to intimately interact with the ZI groups lining the nanochannel wall of ZAC-X. This would provide a clear mechanism to achieve interaction-based selectivity, since interactions are known to simultaneously affect partitioning and diffusivity. Experimental and simulation studies indicate that SB groups preferentially bind with weakly hydrated anions (e.g. $ClO_4^-$) over strongly hydrated anions (e.g. $SO_4^{2-}$). SB-cation interactions are comparatively weaker, although they can still disrupt ZI—ZI pairs.

To study the effect of SB-anion and SB-cation interactions on membrane selectivity, the rejection of various sodium (NaX) and chloride (MCl) salts was measured (FIGS. 20A-20B) at 20 mM feed concentration and 250 psi operating pressure. Rejection varied broadly among sodium salts with different anions (NaX). The variation was unusually wide among anions with the same valence, from 21% for NaClO$_4$ to 91% for NaF. This clearly demonstrates the unusual ability of cross-linked r-ZAC membranes to separate ions based on their chemical structure. The rejection sequence followed NaClO$_4$~NaI<NaBr<NaCl<NaF<Na$_2$SO$_4$ (FIG. 20A). This order closely follows ZI-anion interactions, with lower salt rejections corresponding to more favorable ZI-anion interactions. The retention of Na$_2$SO$_4$ was extremely high (99.4%), likely because SB—SO$_4^{2-}$ interactions are highly unfavorable.

In contrast, the rejection of chloride salts with different cations (MCl) appeared to be most heavily influenced by the cation charge and size, with the larger divalent cations Ba$^{2+}$ and Mg$^{2+}$ rejected more than monovalent cations Cs$^+$, Na$^+$, and Li$^+$ (FIG. 20B). The rejections of Ba$^{2+}$ and Mg$^{2+}$ are comparable with that of similarly sized neutral solutes (~90%), implying a size exclusion mechanism. This also explains the similar retentions of $Cs^+$, $Na^+$, and $Li^+$, because non-interactive membranes also demonstrate similar rejections of salts containing these cations.

Sorption and Permselectivity

Figure 20:
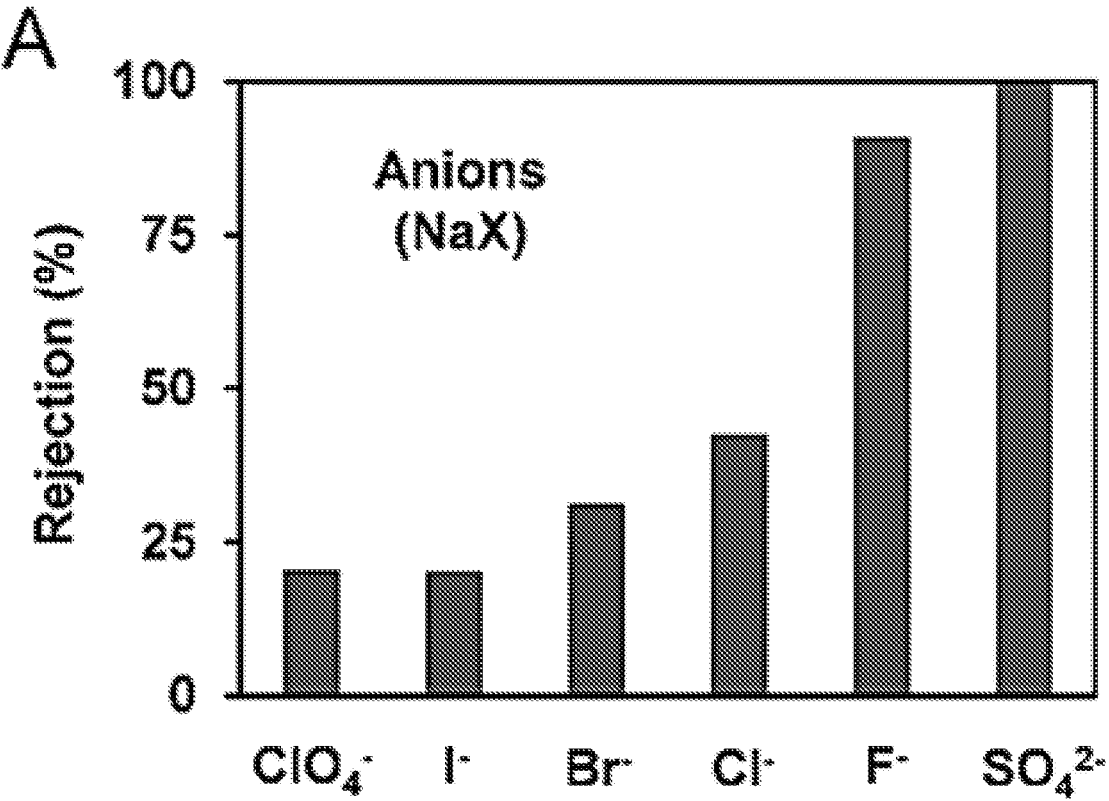
Figure 20:
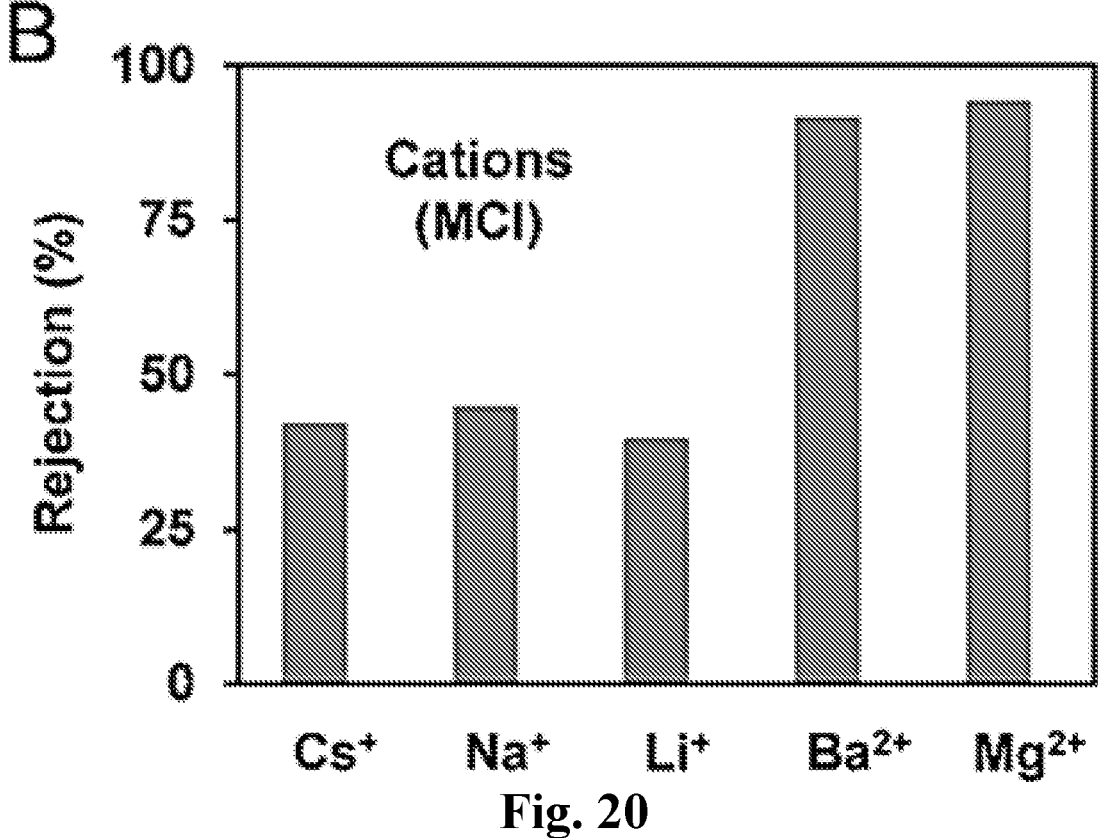

To determine the mechanism for the observed selectivity, the salt partition coefficient ($K_s$) of the sodium salts via salt uptake experiments was measured (FIG. 22A). $K_s$ exactly followed the order of ZI-anion interaction propensity, indicating that favorable ZI-anion interactions lead to enhanced salt partitioning. This result explains why lower retention/faster permeation rates were observed for salts with more favorable ZI-anion interactions (FIG. 20, FIG. 21). Notably, the copolymer demonstrated preferred sorption of $NaClO_4$ and NaI over water, with $K_{NaClO4}$ and $K_{NaI}$ exceeding the analogously defined water sorption coefficient ($K_w$, FIG. 22A). This preference for salt sorption over water sorption is rarely observed in membrane systems, and likely suggests extensive interactions. Furthermore, such high salt partitioning relative to water could only be possible if a large portion of the partitioned ions were favorably interacting with the ZIs. Indeed, $NaClO_4$ was absorbed so extensively that it was enriched in the copolymer phase relative to the bulk solution ($K_{NaClO4}$=1.45).

To further investigate selectivity, the permeability ($P_s$) of $NaClO_4$, NaI, NaBr, NaCl, NaF, and $Na_2SO_4$ over a wide range of feed concentrations was measured (FIG. 22B). For lower salt concentrations (20-60 mM), $P_{NaClO4}{\approx}P_{NaI}{>}P_{NaBr}{>}P_{NaCl}{>}P_{NaF}{>>}P_{Na2SO4}$ was observed. With the exception of $P_{NaClO4}{\approx}P_{NaI}$, this trend of exactly follows the order of ZI-anion interaction propensity. While the effects of size exclusion are difficult to isolate, this result illustrates that excellent interaction-based permselectivity was accessed. For instance, the permeability of $NaClO_4$ was 39 times greater than that of NaF at 20 mM feed concentration, despite the <0.2 Å size difference between $ClO_4^-$ and $F^-$.

Salt permeability appeared to increase with feed concentration for all salts except $NaClO_4$ (FIG. 22B). This reflects a slight increase in salt diffusivity, because the partition coefficients remained constant with external salt concentration for 20-500 mM. For uncharged polymers, salt diffusivity generally remains constant with feed concentration. Poly(ZIs) are known to be salt-responsive, however, undergoing conformational changes through the antipolyelectrolyte effect. This phenomenon may have led to small molecular rearrangements within the nanochannels, causing salt diffusivity and permeability to slightly increase with feed concentration. The exact mechanism underlying this rearrangement is still unclear, however, because stronger ZI-anion interactions did not correspond to a greater dependence of $P_s$ on feed concentration. Interestingly, the order of permeability changed to $P_{NaI}{>}P_{NaClO4}{\approx}P_{NaBr}{>}P_{NaCl}{>}P_{NaF}{>>}P_{Na2SO4}$ at the highest feed concentration (500 mM), despite the dependence of $P_s$ on feed concentration being relatively weak. This change in the $P_s$ sequence occurred because $P_s$ increased for all salts except $NaClO_4$.

Salt diffusivities ($D_s$) were calculated using the measured values for $K_s$ and $P_s$ (Eq. 2, FIG. 22C). In contrast to partitioning, diffusivity is not expected to be enhanced by favorable interactions. For a ZI-complexed ion to execute a diffusion hop, it must first break the transient bond with the ZI. This process contributes to the diffusion energy barrier. The strong dependence of $K_s$ and $P_s$ on ZI-anion interaction propensity suggests that extensive ZI-ion interactions occur within the nanochannels. Therefore, favorable ZI-anion interactions were expected to result in lower diffusivity. Interestingly, $D_{NaBr}{\sim}D_{NaCl}{>}D_{NaI}{>}D_{NaClO4}{\sim}D_{NaF}{>>}D_{Na2SO4}$ was observed over the full range of feed concentrations (FIG. 22C). The anions of the first four salts in this sequence, $I^-$, $Br^-$, $Cl^-$, and $ClO_4^-$, are similarly sized. Therefore, this result suggests that $Br^-$ and $Cl^-$ had similar binding strengths, $I^-$ had slightly stronger binding than $Br^-$ and $Cl^-$, and $ClO_4^-$ had stronger binding than $I^-$. This result agrees well with the salt partition coefficients ($K_s$), because the high values of $K_{NaI}$ and especially $K_{NaClO4}$ suggest extensive and favorable ZI-anion interactions. The lower diffusivity of NaF was likely due to the larger size of $F^-$ compared to $ClO_4^-$, $I^-$, $Br^-$, $Cl^-$.

The diffusivity of $Na_2SO_4$, the salt with the largest and least interactive anion, was substantially lower than that of the other salts (FIG. 22C). While the larger size of $SO_4^{2-}$ likely contributed to its slower diffusion, this may also suggest that $SO_4^{2-}$ binds more tightly to SB within the pores than the other anions. This is not contradicted by the net-unfavorable $SB—SO_4^{2-}$ interactions suggested by the low $K_s$ of $Na_2SO_4$, which simply implies that $SO_4^{2-}$ prefers to occupy the bulk solution instead of the nanochannels. Once in the nanopores and in contact with SB groups, the –2 charge of $SO_4^{2-}$ may lead to stronger Coulombic interactions. Additionally, the greater size of $SO_4^{2-}$ may force the anion to shed water molecules from its second and possibly first hydration shell to squeeze into the nanochannel. This would force $SO_4^{2-}$ to form tight ZI-anion bonds to compensate for dehydration. This phenomenon could possibly apply to $F^-$ as well, although to a much lower extent.

Chloride-Fluoride Separation

Despite the similar size and equal charge of $Cl^-$ and $F^-$, NaCl permeated much faster than NaF through ZAC-X due to favored $ZI—Cl^-$ interactions (FIGS. 22A-22C). This selectivity is ideally suited for the removal of fluoride from drinking water. Excessive NaCl rejection necessitates remineralization, adding to separation cost and complexity. ZAC-X is also highly resistant to membrane fouling. Indeed, ZAC-X, similar to other r-ZAC-based membranes, exhibits no measurable irreversible fouling when exposed to various foulants, fully retaining its performance even with challenging feeds.

While these results are promising, membrane selectivity often declines with complex feeds, equimolar mixtures of NaCl/NaF was filtered (FIG. 23A) to confirm that NaCl does not reduce the $Cl^-/F^-$ selectivity inferred from the single-salt filtration experiments. FIG. 23A shows normalized fluoride flux ($N_F w_m \delta / \Delta C_F$) and fluoride rejection vs. ionic strength (I) for NaF-only (single) and equimolar NaCl/NaF (mixed) solutions. Normalized fluoride flux and fluoride rejection were identical for the single-salt and mixed-salt solutions of matching I, indicating that chloride had a limited apparent effect on fluoride transport beyond contributing to the total ionic strength. The total salinity of the feed solutions ranged from slightly brackish (500 ppm) to heavily brackish (3,000 ppm), demonstrating that ZAC-X can successfully filter fluoride from realistic drinking water sources at a reasonable operating flux (6-7 L $m^{-2}$ $hr^{-1}$). Fluoride rejection ranged between 92.5-88.1%, high enough to reduce the fluoride content to below the WHO limit (1.5 ppm) for problematic water sources from US, Turkey, Germany, China, and possibly India.

ZAC-X exhibits >2× the highest $Cl^-/F^-$ selectivities of state-of-the-art commercial NF (3, 47-50) and layer-by-layer membranes (FIG. 23B) without any attempt to optimize its performance in this regard. In comparison, the uncrosslinked r-ZAC membrane demonstrated low $Cl^-/F^-$ selectivity due to low retention of both NaCl and NaF (FIG. 23B).

Example 12. Zwitterionic Ion-Selective Membranes with Tunable Sub-Nanometer Pores and Excellent Fouling Resistance Cross-Linkable r-ZAC Synthesis and Characterization.

The cross-linkable r-ZAC by copolymerizing cross-linkable allyl methacrylate (AMA) and zwitterionic sulfobetaine methacrylate (SBMA) via activators regenerated was synthesized by electron transfer atom transfer radical polymerization (ARGET-ATRP) (FIG. 25A). AMA contains two reactive sites, but the methacrylic double bonds are more reactive than the allylic double bonds. Most allyl groups are preserved when using a controlled radical polymerization technique such as ARGET-ATRP, particularly when reaction conditions are selected carefully, i.e. ambient temperature, low conversion, and low monomer concentration. Using this approach, linear r-ZACs with extensive allyl functionality was obtained (FIG. 25B). The copolymer composition (53 wt % AMA) closely matched that of the reaction mixture (60 wt % AMA) at ~10% conversion, suggesting a near-random repeat unit sequence. Despite this low conversion and the mild reaction conditions that were employed, the copolymer chains were reasonably large (45-60 nm, corresponding to $2.0\times10^6$-$2.6\times10^6$ g/mol based on polyacrylonitrile standards in dimethylformamide) based on dynamic light scattering (DLS) measurements. Peak integration of the $^1$H-NMR spectra indicates that essentially every allyl group was preserved, corroborated by the absence of gel formation during the synthesis.

The abundant allyl groups enabled facile cross-linking by UV-initiated photo-polymerization (FIG. 25C). In one demonstration, a gel was formed by exposing a solution of copolymer (3 wt %) and photo-initiator (5 wt %) to UV light. In another demonstration, a free-standing copolymer film equilibrated with a 3 w/v % solution of photo-initiator/isopropyl alcohol was exposed to UV light. This treatment rendered the copolymer film insoluble in trifluoroethanol (TFE), confirming cross-linking.

Microphase separation in the copolymer was confirmed by differential scanning calorimetry (DSC, FIG. 25D), which showed a single glass transition temperature ($T_g$) of 154° C. No transitions were observed around the $T_g$ of P(AMA), ~54° C. The measured $T_g$ is significantly higher than 115° C., the value predicted if the copolymer was a homogeneously mixed single phase using Fox equation (eq S1). This implies that the measured $T_g$ is associated with the zwitterion-rich domain. This domain likely limits the mobility of polymer segments in the bordering AMA-rich hydrophobic domain due to the high degree of interconnectivity, thereby obscuring its lower temperature glass transition. This is consistent with the behavior of other r-ZACs that microphase separate to form bicontinuous networks of ~1-2 nm hydrophobic and zwitterion-rich domains. The self-assembled morphology was characterized by transmission electron microscopy (TEM, FIG. 25E). The zwitterionic domains were positively stained by immersion in 2% $CuCl_2$, resulting in the formation of sulfobetaine-copper complexes. It was observed a bicontinuous network of percolated zwitterionic nanochannels (dark regions) surrounded by the hydrophobic/cross-linkable phase (light regions), consistent with previously reported r-ZACs. The fast Fourier transform (FFT) of the TEM image lacked directional features (inset of FIG. 25E), indicating a disordered network. To determine average nanochannel width (D), the periodic intensity from the FFT was plotted against the reciprocal of the corresponding spatial frequency. The characteristic length scale given by the outer ring of the FFT was d=2.8 nm, corresponding to an average nanochannel width of D=1.4 nm, corresponding to zwitterionic domain width in the dry state.

Membrane Fabrication and Cross-Linking.

Un-cross-linked r-ZAC TFCs, termed ZAC-0, were prepared by coating a solution of P(AMA-r-SBMA) in TFE onto a commercial ultrafiltration (UF) membrane as a porous support (PS35, Solecta). Resultant selective layers were ~300-500 nm in thickness (FIG. 26A). The membrane morphology was somewhat irregular, likely due to rapid solvent evaporation. The average permeance, defined as water flux normalized by operating pressure, was 1.5 L m$^{-2}$ hr$^{-1}$ bar$^{-1}$. While this permeance is comparatively low for most NF membranes, it can be drastically enhanced by improved manufacturing methods that decrease coating thickness and enhance the interconnectivity of zwitterionic domains. For instance, the use of ionic liquid additives in the coating solutions used to make r-ZAC membranes have increased the permeance by up to 50 times without loss of selectivity.

The effective pore size of ZAC-0 was estimated to be 1.36 nm based on a fit to the Donnan Steric Pore Model. ZAC-0 exhibited relatively low retentions of $Na_2SO_4$ (67%), $MgCl_2$ (32%), and NaCl (9.1%), similar to that of previously reported r-ZAC membranes and in agreement with previous data indicating hydrophobic domain chemistry has a limited effect on pore size.

To cross-link the copolymer selective layer and thereby tune nanochannel diameter, ZAC-0 or equivalent P(AMA-r-SBMA) films were first equilibrated with a solution of photo-initiator (2-hydroxy-2-methylpropiophenone) in isopropanol (FIG. 26B). UV irradiation then initiated radical polymerization of the allylic double bonds in the hydrophobic phase, cross-linking the membrane selective layer (FIG. 26C). Attenuated total reflectance Fourier transform infrared (ATR-FTIR) spectroscopy of P(AMA-r-SBMA) films showed a reduction in the —CH=C allyl peak intensity upon curing (FIG. 26D), confirming that a large fraction of the allyl groups reacted. UV curing also rendered the P(AMA-r-SBMA) selective layer of TFC membranes insoluble in TFE (FIG. 26E), providing further evidence for cross-linking.

Water uptake measurements indicated that cross-linking reduced the aqueous swelling of P(AMA-r-SBMA) films (FIG. 26F). Since polar solvents such as water preferentially swell the zwitterionic domain of microphase separated r-ZACs, this implies that cross-linking prevents the nanochannels from expanding in water and provides a clear mechanism for pore size reduction. The zwitterionic nanochannels were less swollen when equilibrated with the isopropanol/photo-initiator solution than with water. Hydrophobic plasticizers preferentially swell the hydrophobic domain of microphase separated r-ZACs, minimally penetrating the zwitterionic domain due to unfavorable interactions; SBMA and poly(SBMA) are both insoluble in isopropanol. Upon cross-linking, the membrane was trapped in this low-swelling state, reducing subsequent aqueous swelling and thus resulting in a smaller effective pore size. Higher degrees of cross-linking restrict swelling more, reducing the pore size to a greater extent. The water uptake of the cross-linked films was 24%, which is within the typical range for the selective layer of polyamide NF membranes.

Tuning of Membrane Selectivity.

To determine how cross-linking affects membrane performance, normalized permeance ($L_P^*$) was defined to quantify the decrease in the water flux through the membrane upon cross-linking:

$$L_P^* = \frac{L_P}{L_{P,initial}}$$

(1) where $L_P$ and $L_{P,initial}$ are permeances of the cross-linked membrane and ZAC-0, respectively. Permeance decreased upon cross-linking, resulting in $L_P^* < 1$ (FIG. 27A). Reaction conditions expected to result in higher degrees of cross-linking, specifically longer cure times (5-20 mins) and higher photo-initiator concentrations (0.30-4.0 w/v %), led to greater permeance decreases (FIG. 27A).

To clearly demonstrate permeance decrease upon cross-linking leads to a tunable shift in the effective pore size, a series of neutral solutes using ZAC-0 and membranes cross-linked was filtered to varying extents (FIG. 27B, Table 3). The effective pore size of each membrane was fitted with a single pore diameter using the Donnan Steric Pore Model. Lower permeance corresponded to smaller pores, with the effective pore size ranging from 1.36 nm for ZAC-0 to 0.94 nm for the most highly cross-linked membranes. This result clearly illustrates that the membrane pore size was tuned by the extent of cross-linking. Interestingly, a single pore diameter was successfully fit to each membrane, suggesting that the pore size distribution of these membranes were likely relatively narrow and the pore shrinking process was uniform and well-controlled.

TABLE 3

Estimated pore size obtained from neutral solute rejections. The pressure was 250 psi.

| $L_p^*$ | Solute | Stokes diameter (nm) | Rejection (%) | Fitted pore diameter (nm) |
|---|---|---|---|---|
| 0.23 | Sucrose | 0.958 [a] | 99.7 | n/a [d] |
| | Glucose | 0.73 [b] | 91 | 0.998 |
| | Xylose | 0.654 [b] | 81.1 | 0.991 |
| | Glycerol | 0.47 [b] | 48.3 | 0.838 |
| | Average | | | 0.943 |
| 0.45 | VB12 | 1.48 [a] | 99.8 | n/a [d] |
| | Sucrose | 0.958 [b] | 98.7 | 1.076 |
| | Glucose | 0.73 [b] | 83.3 | 1.1 |
| | Xylose | 0.654 [c] | 70.5 | 1.104 |
| | glycerol | 0.47 [b] | 37.1 | 0.945 |
| | Average | | | 1.06 |
| 0.64 | VB12 | 1.48 [a] | 99.4 | n/a [d] |
| | Sucrose | 0.958 [b] | 98.3 | 1.094 |
| | Glucose | 0.73 [b] | 74.3 | 1.224 |
| | Xylose | 0.654 [c] | 57.9 | 1.266 |
| | Glycerol | 0.47 [b] | 27.2 | 1.114 |
| | Average | | | 1.17 |
| 1.00 (As Cast) | VB12 | 1.48 [a] | 99.8 | n/a [d] |
| | Raffinose | 1.14 [c] | 96.2 | 1.386 |
| | Sucrose | 0.958 [b] | 91.1 | 1.307 |
| | Glucose | 0.73 [b] | 64.9 | 1.365 |
| | Xylose | 0.654 [c] | 50.4 | 1.394 |
| | Glycerol | 0.47 [b] | 22.5 | n/a [e] |
| | Average | | | 1.36 |

[a] Reported by Bowen;[16]
[b] Calculated by Gin[20] using the eq S10;
[c] Calculated using eq S10;[22, 23]
[d] Not calculated because rejection was effectively 100%;
[e] Not calculated because rejection was below 25%.

The data acquired also indicate these membranes can potentially be used to separate sugars based on size, and to separate monosaccharides (e.g glucose, xylose) from disaccharides (e.g. sucrose). For instance, membranes with $L_p^*$ of 0.45 and 0.64 exhibit sucrose rejections of >98%, corresponding to a glucose/sucrose separation factor of 12.8 and 15.1, respectively. Xylose rejections were ~70% and ~58%, corresponding to xylose/sucrose separation factors of 22.5 and 24.8, respectively. This show the potential for use of these membranes for effective mon-/di-saccharide separation.

To further characterize the tuning of selectivity, inverse normalized permeate concentration ($1/C_P^*$) was defined to quantify how the selectivity between solute and water changes upon cross-linking:

$$\frac{1}{C_P^*} = \frac{C_{P,initial}}{C_P} \approx \left(\frac{J_w}{J_{solute}}\right) / \left(\frac{J_{w,initial}}{J_{solute,initial}}\right) \quad (2)$$

Where $C_P$ and $C_{P,initial}$ are permeate concentrations, $J_{solute}$ and $J_{solute,initial}$ are solute fluxes, and $J_w$ and $J_{w,initial}$ are water fluxes through the cross-linked membrane and ZAC-0, respectively. A high $1/C_P^*$ implies an enhancement in water/solute selectivity, likely due to pore size reductions.

$1/C_P^*$ increase exponentially with decreasing $L_P^*$ for both neutral solutes (sucrose, riboflavin) and salts ($Na_2SO_4$, $MgCl_2$), with the full range of cross-linking conditions falling onto a single master curve for each solute (FIGS. 27C-27E). This further confirms that cross-linking leads to a reduction in pore size. $1/C_P^*$ increased much less for NaCl (FIG. 27F). Such precise and simple tuning is not feasible with the state-of-the-art NF membrane chemistry.

Fouling Resistance of Highly Cross-Linked Membranes.

Fouling is a major challenge for membrane treatment of high-organic-content streams, dominating operating costs and significantly impacting the economic and technical feasibility of membrane treatment. Exceptional fouling resistance represents a key feature of previous r-ZAC membranes, which resist foulant adsorption due to the hydrophilicity of the zwitterionic nanochannels.

To determine if this antifouling property is observed in the highly cross-linked r-ZAC membranes with sub-nanometer pores, we challenge the most highly cross-linked membranes, termed ZAC-X, to two fouling experiments (FIGS. 28A-28B). ZAC-X demonstrated exceptional fouling resistance against a solution containing key foulants in surface water, seawater and wastewater streams, comprising humic acid, sodium alginate, and $CaCl_2$) (FIG. 28A). The membrane exhibited only minor flux decline during the experiment, likely due to cake deposition. Flux recovery was complete after a simple water rinse, demonstrating complete resistance to irreversible fouling. NF90, a commercial PA-TFC membrane that was tested as a control, demonstrated greater flux decline during the fouling experiment and suffered from irreversible flux loss.

ZAC-X also demonstrated excellent resistance to fouling by a solution of bovine serum albumin (BSA) and 10 mM $CaCl_2$), a protein system known for its high fouling propensity (FIG. 28B). Minimal flux decline and only 4% irreversible flux loss was observed, consistent with previous investigations of sulfobetaine-based r-ZAC membranes. NP030, a commercial PES-TFC NF membrane that was tested as a control, suffered 45% irreversible flux loss. Collectively, these results illustrate that the exceptional fouling resistance of r-ZAC membranes is not compromised when the nano-channel diameter is reduced to <1.0 nm.

Selectivity of Highly Cross-Linked Membranes.

The most highly cross-linked membranes, termed ZAC-X (FIGS. 27A-27F, FIG. 28A-28B), exhibited extremely small, monodisperse pores (FIG. 27B), a >99% retention of sucrose was observed (FIGS. 27B and 27D), ~1 nm neutral solutes that freely pass through advanced BCP membranes designed for small molecule retention and molecular sepa-rations.

The sub-nanometer effective pore size suggests that ZAC-X can exhibit high selectivity between mono- and divalent ions, because the hydrated diameters of some divalent ions ($SO_4^{2-}$ and $Mg^{2+}$) are in this size range, whereas $Na^+$ and $Cl^-$ are smaller. Such membranes are extremely valuable for energy-efficient removal of divalent ions from saline solutions, with applications in water soft-ening, oil recovery, and the chlor-alkali process. For example, offshore oil production rigs require billions of gallons per day of treated water for enhanced oil recovery. They need to further manage large amounts of produced water recovered along with oil and gas, treating them to sufficient quality for either discharge or reuse. Sulfate ions are undesired in these fluids due to their potential for scaling, and due to the presence of sulfate-reducing bacteria that convert it to toxic, corrosive $H_2S$ down many bore holes. While RO and NF membranes are capable of high sulfate removal, they also reject $Cl^-$, present in much higher con-centrations in seawater and frac water used as feeds. This results in high osmotic pressure differences that necessitate high-pressure operation and energy-intensive processes. A membrane that selectively rejects sulfate while allowing the passage of monovalent ions would enable lower-pressure, more energy-efficient operation.

To investigate ion selectivity, the rejection of various salts was first measured. 20 mM solutions was filtered at a consistent flux (6.3-6.9 L $m^{-2}$ $hr^{-1}$) through ZAC-X and a state-of-the-art commercial NF membrane, NF90 (FIG. 6a). ZAC-X exhibited a 99.4% rejection of $Na_2SO_4$ and $MgSO_4$, higher than NF90 (98.8% for $Na_2SO_4$, 99.2% for $MgSO_4$). Its rejection of chloride salts was lower than that of NF90. This illustrates that ZAC-X has superior selectivity, effec-tively sieving divalent ions while passing monovalent ions. Low NaCl retention significantly decreases the osmotic pressure difference during operation, enabling lower trans-membrane pressures.

For the single salt filtration experiments (FIG. 29A), ZAC-X achieved S(NaCl/$Na_2SO_4$)=101. This selectivity surpasses that of nearly every filtration membrane reported to date, including state-of-the-art polyamide TFCs and TFNs (FIG. 24B). Other self-assembled copolymer membranes show comparatively negligible $Cl^+$/$SO_4^{2-}$ selectivity (FIG. 24B), further distinguishing the performance of cross-linked r-ZAC membranes. This precise $Cl^-$/$SO_4^{2-}$ separation was enabled by the exceptionally small nanopores obtained using our novel cross-linking approach. Interestingly, ZAC-X demonstrated far lower selectivity towards cations (e.g. S(NaCl/$MgCl_2$)=7.9).

ZAC-X was then challenged with artificial seawater, a highly saline mixture containing appropriate amounts of $Na^+$, $Mg^{2+}$, $Cl^-$ and $SO_4^{2-}$, and measured the retention of each ion at the same water flux used for the single salt solutions. The rejection of each ion by ZAC-X closely matched the rejections obtained for the single salt solutions (FIG. 29B). ZAC-X achieved S($Cl^-$/$SO_4^{2-}$)=75 with the artificial seawater, confirming that cross-linked r-ZAC mem-branes can perform highly selective separations with challenging and complex feedstocks (FIG. 24B). In comparison, NF90 showed only S($Cl^-$/$SO_4^{2-}$)=18, due to its lower reten-tion of $SO_4^{2-}$ and higher retention of $Cl^-$.

While filtering artificial seawater, the effective osmotic pressure difference during this experiment for ZAC-X was calculated to be ~170 psi. This value was around 270-290 psi for NF90, due to the higher NaCl rejection. As a result, even though the permeance of ZAC-X (0.40 L $m^{-2}$ $hr^{-1}$ $bar^{-1}$) was substantially less than that of NF90 (7.0 L $m^{-2}$ $hr^{-1}$ $bar^{-1}$), the two membranes required relatively similar pres-sures to filter artificial seawater at 6 L $m^{-2}$ $hr^{-1}$ (400 psi for ZAC-X and 300 psi for NF90).

INCORPORATION BY REFERENCE

All of the U.S. patents, and U.S. and PCT published patent applications cited herein are hereby incorporated by refer-ence.

EQUIVALENTS

The foregoing written specification is considered to be sufficient to enable one skilled in the art to practice the invention. The present invention is not to be limited in scope by examples provided, since the examples are intended as a single illustration of one aspect of the invention and other functionally equivalent embodiments are within the scope of the invention. Various modifications of the invention in addition to those shown and described herein will become apparent to those skilled in the art from the foregoing description and fall within the scope of the appended claims. The advantages and objects of the invention are not neces-sarily encompassed by each embodiment of the invention

We claim:

1. A copolymer, comprising a plurality of zwitterionic repeat units, and a plurality of hydrophobic repeat units;
   wherein at least some of the hydrophobic repeat units each independently comprise a cross-linkable moiety; and
   wherein the copolymer is poly((allyl methacrylate)-ran-dom-(sulfobetaine methacrylate)), poly((allyl meth-acrylate)-random-(2-methacryloyloxyethyl phospho-rylcholine)), or combinations thereof.

2. The copolymer of claim 1, wherein each of the zwit-terionic repeat units independently comprises sulfobetaine, carboxybetaine, phosphorylcholine, imidazolium alkyl sulfonate, or pyridinium alkyl sulfonate.

3. The copolymer of claim 1, wherein each of the zwit-terionic repeat units is independently formed from sulfo-betaine acrylate, sulfobetaine acrylamide, carboxybetaine acrylate, carboxybetaine methacrylate, 2-methacryloyloxy-ethyl phosphorylcholine, acryloxy phosphorylcholine, phos-phorylcholine acrylamide, phosphorylcholine methacrylam-ide, carboxybetaine acrylamide, 3-(2-vinylpyridinium-1-yl) propane-1-sulfonate, 3-(4-vinylpyridinium-1-yl)propane-1-sulfonate, or sulfobetaine methacrylate.

4. The copolymer of claim 1, wherein each of the hydro-phobic repeat units is independently formed from a styrene, an alkyl acrylate, an alkyl methacrylate, an alkyl acrylamide, an acrylonitrile, an aryl acrylate, an aryl methacrylate, and an aryl acrylamide.

5. The copolymer of claim 1, wherein the cross-linkable moiety comprises a carbon-carbon double bond.

6. The copolymer of claim 5, wherein the cross-linkable moiety comprises an allyl (i.e., $CH_2$—$CH$=$CH_2$), a vinyl (i.e., —CH=CH$_2$ or —CH=CH—), a vinyl ether (i.e., —O—CH=CH$_2$), or a vinyl ester (i.e., —CO—O—CH=CH$_2$).

7. The copolymer of claim 1, further comprising a plurality of a second type of hydrophobic repeat units, wherein the second type of hydrophobic repeat units are each independently formed from an alkyl acrylate, an alkyl methacrylate, an alkyl acrylamide, an acrylonitrile, an aryl acrylate, an aryl methacrylate, and an aryl acrylamide.

8. The copolymer of claim 7, wherein the second type of hydrophobic repeat units are formed from 2,2,2-trifluoroethyl methacrylate.

9. The copolymer of claim 1, wherein the copolymer has a molecular weight of about 10,000 to about 10,000,000 Dalton.

10. The copolymer of claim 9, wherein the copolymer has a molecular weight of about 20,000 to about 500,000 Dalton.

11. The copolymer of any one of claim 1, wherein the zwitterionic repeat units and the hydrophobic repeat units each constitute 20-80% by weight of the copolymer.

12. The copolymer of claim 11, wherein the zwitterionic repeat units constitute 25-75% by weight of the copolymer, and the hydrophobic repeat units constitute 25-75% by weight of the copolymer.

13. A copolymer, comprising a plurality of zwitterionic repeat units, and a plurality of hydrophobic repeat units;

wherein at least some of the hydrophobic repeat units each independently comprise a cross-linkable moiety; and wherein the copolymer is poly((allyl methacrylate)-random-(sulfobetaine methacrylate)), the zwitterionic repeat units constitute 25-75% by weight of the copolymer, and the copolymer has a molecular weight of about 20,000 to about 100,000 Dalton.

14. A cross-linked copolymer network, comprising the copolymer of claim 1.

15. A thin film composite membrane, comprising a porous substrate, and a selective layer comprising the cross-linked copolymer network of claim 14, wherein the average effective pore size of the porous substrate is larger than the average effective pore size of the selective layer; and the selective layer is disposed on top of the porous substrate.

16. The thin film composite membrane of claim 15, wherein the selective layer has an average effective pore size of about 0.1 nm to about 2.0 nm.

17. The thin film composite membrane of claim 15, wherein the selective layer has a thickness of about 10 nm to about 10 um.

18. The thin film composite membrane of claim 15, wherein the thin film composite membrane rejects charged solutes and salts.

19. A cross-linked copolymer network, comprising the copolymer of claim 13.

20. A thin film composite membrane, comprising a porous substrate, and a selective layer comprising the cross-linked copolymer network of claim 19, wherein the average effective pore size of the porous substrate is larger than the average effective pore size of the selective layer; and the selective layer is disposed on top of the porous substrate.

* * * * *